United States Patent [19]

Brunius et al.

[11] Patent Number: 4,614,945
[45] Date of Patent: Sep. 30, 1986

[54] AUTOMATIC/REMOTE RF INSTRUMENT READING METHOD AND APPARATUS

[75] Inventors: Robert E. Brunius; Jon R. Nelson, both of St. Paul, Minn.

[73] Assignee: Diversified Energies, Inc., Minneapolis, Minn.

[21] Appl. No.: 703,621

[22] Filed: Feb. 20, 1985

[51] Int. Cl.⁴ ............................................. G08C 17/00
[52] U.S. Cl. ............................. 340/870.03; 340/505; 455/105
[58] Field of Search ................ 340/870.02, 870.03, 340/505, 825.06, 825.07, 825.08, 825.54, 870.28; 455/54, 105

[56] References Cited

U.S. PATENT DOCUMENTS

| | | | |
|---|---|---|---|
| Re. 27,723 | 8/1973 | Stewart, Jr. | 250/219 DD |
| 3,045,903 | 7/1962 | Fleming, Jr. | 235/61 |
| 3,083,357 | 3/1963 | Chapin et al. | 340/204 |
| 3,159,816 | 12/1964 | Tiemann | 340/505 X |
| 3,231,670 | 1/1966 | Lane | 179/2 |
| 3,258,692 | 6/1966 | Jacomini | 324/113 |
| 3,264,633 | 8/1966 | Hellar | 340/310 |
| 3,270,559 | 9/1966 | Gleasman | 73/272 |
| 3,313,160 | 6/1964 | Goldman | 73/432 |
| 3,324,437 | 6/1967 | Heller | 338/129 |
| 3,328,732 | 6/27/67 | Palmer | 335 205 2/28/66 |
| 3,331,046 | 7/1967 | Adair | 338/129 |
| 3,388,388 | 6/1968 | Brown | 340/203 |
| 3,492,649 | 1/1970 | Polillo | 340/151 |
| 3,518,652 | 6/1970 | Dransfield et al. | 340/177 |
| 3,531,771 | 9/1970 | Jaxheimer et al. | 340/151 |
| 3,543,259 | 11/1970 | Klyce | 340/200 |
| 3,566,384 | 2/1971 | Smith et al. | 340/200 |
| 3,582,922 | 6/1971 | Greshel | 340/204 |
| 3,588,357 | 6/1971 | Sellari, Jr. | 340/150 |
| 3,599,194 | 8/1971 | Lipscomb | 340/203 |
| 3,609,691 | 9/1971 | Stewart, Jr. | 340/151 |
| 3,609,726 | 9/1971 | Stewart, Jr. | 340/204 |
| 3,609,727 | 9/1971 | Riebs | 340/204 |
| 3,609,754 | 9/1971 | Riebs | 340/347 |
| 3,654,605 | 4/1972 | Honda et al. | 340/151 |
| 3,656,112 | 4/1972 | Paull | 340/151 |
| 3,688,271 | 8/1972 | Rouse | 340/172.5 |
| 3,705,385 | 12/1972 | Batz | 340/152 R |
| 3,737,858 | 6/1973 | Turner et al. | 340/151 |
| 3,754,250 | 8/1973 | Bruner | 343/6.5 |
| 3,815,093 | 6/1974 | Caretto et al. | 340/505 |
| 3,815,119 | 6/1974 | Finlay, Jr. et al. | 340/310 R |
| 3,852,726 | 12/1974 | Romanelli | 340/188 R |
| 3,878,512 | 4/1975 | Kobayashi et al. | 340/168 R |
| 3,914,757 | 10/1975 | Finlay, Jr. et al. | 340/310 A |
| 3,919,640 | 11/1975 | Simciak | 325/30 |
| 3,962,545 | 6/1976 | Abe | 340/152 |
| 3,967,202 | 6/1976 | Batz | 325/31 |
| 3,992,705 | 11/1976 | Langenfeld | 340/203 |
| 4,013,959 | 3/1977 | Patterson | 325/57 |
| 4,020,477 | 4/1977 | Holland | 340/224 |
| 4,022,977 | 5/1977 | Nomura | 340/151 |
| 4,031,513 | 6/1977 | Simciak | 340/152 T |
| 4,232,392 | 11/1980 | French | 455/105 |
| 4,257,038 | 3/1981 | Rounds et al. | 340/539 |
| 4,296,411 | 10/1981 | Romanelli et al. | 340/870.02 |
| 4,312,072 | 1/1982 | Vogel | 375/1 |
| 4,352,201 | 9/1982 | Miller | 455/58 |
| 4,365,251 | 12/1982 | Miller | 340/870.02 |
| 4,392,125 | 7/1983 | Iwata | 340/518 |
| 4,446,462 | 5/1984 | Ouellette et al. | 340/825.07 |

Primary Examiner—Jerry W. Myracle
Attorney, Agent, or Firm—Kinney & Lange

[57] ABSTRACT

An automatic/remote instrument monitoring system and method are disclosed. RF transponder units are operatively connected to and monitor one or more parameters of a remotely located instrument. The transponders include RF receivers that sample received RF signals at a low duty cycle and look for a common wake-up signal transmitted from a mobile data collection unit. All transponders receiving the common wake-up signal simultaneously energize their respective transmitters and transmit their respective messages over a predetermined RF transmission bandwidth to receivers in the mobile unit. The time and frequency parameters of the transponder transmissions are varied in a manner such that the transmission signals of simultaneously transmitting transponders differ. A plurality of RF receivers in the mobile unit are respectively tuned to collectively receive the transponder transmissions, across the entire transmission bandwidth. Decoding and signal processing circuits in the mobile receiver unit identify transmitting transponders and process their respective messages.

64 Claims, 37 Drawing Figures

TYPICAL FREQUENCY FOR RECEIVER CARDS 36.1 – 36.48

AUTOMATIC/REMOTE RF INSTRUMENT READING METHOD AND APPARATUS

BACKGROUND OF THE INVENTION

1. Field of the Invention

This invention relates generally to remote instrumentation reading systems, and more particularly to an apparatus and method for automatically transmitting information by RF signals from a plurality of remote instrument reading units to a mobile collection center.

2. Description of the Prior Art

The need for automatically communicating from a plurality of instrumentation devices located at fairly remote and inaccessible locations, to a central collection center, has been acutely present for many years. This need is perhaps best exemplified in the use monitoring of "utility" commodities such as gas, water, electricity, and the like. The use of such utility commodities has traditionally been monitored by meters physically located at the situs of entry of such commodity into the user's facility or residence. It is hard to believe that in today's technologically advanced society with the ready availability of complex, relatively inexpensive electronic circuitry, that a ready practical solution to the automatic meter reading problem has not yet surfaced. The reality of the situation is, however, that the overwhelming majority of utility meter readings are still recorded by hand (i.e. by first-hand recording of the accumulated meter information by meter reading personnel, who generally travel on foot to locate and read the respective utility meters at a user's facility). It can readily be appreciated that such procedure is highly inefficient, susceptible to error and requires many employees and entails considerable expense.

Before proceeding with a description of the prior art and of this invention it will be helpful to define certain applicable terminology as used herein. When referring to instrumentation monitoring, and in particular with regard to meter reading the terms "remote" and "automatic" meter reading have acquired separate meanings as used in the art. As used herein, the term "remote" refers to that meter reading situation wherein a person and/or his associated meter reading apparatus is within the general vicinity of the meter, but not necessarily in actual view of the meter when the reading is taken. "Remote", therefore generally implies that a person is directly involved in the meter reading process. The term "automatic" is used herein to refer to that meter reading sitatuion wherein the meter is automatically read by instrumentation, independent of the need for human intervention. As will become apparent from a more detailed description herein, the invention applies equally well to "remote" and to "automatic" (i.e. "automatic/remote") instrumentation reading applications, as above defined. Care should also be taken to distinguish between use of the term "remote" as used to designate a mere location as spaced apart from another entity, and as used in the "remote instrument reading" sense as above defined.

It is desirable, therefore, to have such meters automatically read from a mobile collection unit or from a central station, in a manner that would eliminate the requirement for a meter reading pesonnel's entry onto a user's premises. Such automatic/remote meter reading method and apparatus must be highly reliable and accurate, and above all, relatively inexpensive to install and compatible for retrofitting the large number of meters of varied construction already in operation in the marketplace. Numerous solutions of varying scope and complexity have been proposed for automating in whole or in part the meter reading process. However, for many reasons, including complexity, high cost, servicability impracticality for the general small-user accounts, low reliability, and the like, none of the techniques proposed in the art has yet provided a ready solution to the automation of meter reading.

Most automatic/remote meter systems of the past are similar in design in that they generally include an encoder device attached to the meter to provide an indication of the meter reading, means for storing the accumulated meter reading and a communication link for transmitting the stored information to a central collection station, typically when interrogated by the central collection station. Numerous encoder devices for such systems have been developed, ranging from simple magnetic, optical or capacitive switching elements, to more complex cam activated or electronic switching networks. Similarly, numerous communication links for such systems have appeared in the art. Such communication links have typically used telephone lines, power transmission lines of Radio Frequency (RF) signals for transferring data and/or control information between the remote meter reading units and the central collection station. Each of such techniques has had problems or shortcomings in attempting to provide a practical and effective solution to the automatic/remote meter reading problem.

Those communication links using the telephone lines of the subscriber/commodity user, enable relatively detailed communication between a central collection station and the remotely located meter units, but are limited in the use flexibility of such systems. Further, the installation of such automatic systems requires an undesirable connection of the meter reading apparatus to the user's telephone system. The retrofitting of such systems is generally complex and expensive and is justified primarily only for use with larger commercial accounts. Similarly, those automatic systems which employ the user's power lines as the communication link suffer from the same limited flexibility and installation disadvantages as those which employ the user's telephone lines. Both of the above systems depend upon a secondary hardwired transmission medium which is primarily configured and designed to carry information other than the accumulated data of the meter reading units.

A more practical solution appears to be provided by those automated meter reading systems that employ an RF communication link between the remote meter units and the central collection station. Such systems do not inherently suffer those retrofitting disadvantages associated with incorporating a telephone or power line communication link into the automated system. With an RF communication link system, the central collection station can be made mobile, by placing it in a mobile unit such as a van or the like, which can travel over any desired route in a community for collecting the information from remote meter reading units installed in facilities along that route. Typically, the mobile collection station transmits interrogating enabling signals to the instrument monitoring units, which in turn send RF reply signals back to the mobile collection unit, in the form of an identifier code of the respective remote meter reading unit, along with its encoded information and data. The mobile collection unit processes the received RF information for subsequent billing and repair or maintenance purposes. Typical examples of such RF communication link systems are illustrated is U.S. Pat. Nos. 3,705,385 and 4,031,513. In theory, such remote meter reading structures which employ RF communication principles are simple to retrofit to existing meter installations, require no external connections to either telephone or power lines, and can be structured in self-contained manner to operate from their own battery sources.

While conceptually offering significant advantages over their telephone or power line communication link counterparts, the RF communication link remote meter reading systems of the prior art have not yet been configured in a manner so as to take full advantage of their unique status. A primary reason for the limited success of the RF communication link system to date has been the relatively high cost of the remote meter reading units, as dictated by the circuitry required therein for processing the enable polling signal received from the mobile collection unit. Prior art RF communication link techniques for remote meter reading applications have generally used remote unit polling schemes whereby the mobile collection unit transmits unique remote unit identifier codes in a manner so as to activate or enable for transmission, only one remote meter reading unit at a time. Such schemes necessarily require the remote units to have relatively expensive or complex decoding and comparator circuitry for identifying the polling signal which is unique to that particular remote unit. An alternate approach that has been employed in the art has been to activate more than one meter reading unit at a time, which simultaneously activated remote units have been pretuned for transmitting at identifiably different RF frequencies. Such technique, while requiring less expensive enable decoding circuitry requires generally expensive and accurately tuned circuits in the remote units (due to the relatively narrow frequency range in which such units are permitted to operate), thereby increasing the manufacturing costs of the remote units. Further, the use-flexibility of the remote units of such systems is reduced in that care in installation of such units must be maintained so as not to install two similarily tuned units within an RF interference range of one another. Various other techniques using RF link communication principles have been developed in the art, but have generally suffered from similar low use-flexibility or relatively high remote unit cost disadvantages. Another drawback of such prior art RF communication link systems has been the high power consumption required by the remote units, significantly reducing their battery life, and making systems using such units impractical for extended life, low maintenance applications. Such prior art systems typically require battery replacement at unacceptable, two month intervals.

Therefore, while many automatic/remote instrumentation reading systems have been developed in the art, which utilize one or more of the various communication link techniques generally described above, no one automatic remote instrumentation reading system has yet been designed which affords the capabilities of automatic mass instrumentation data accumulation from, for example, consumer's facilities, which meets the universal needs of utility companies. The present invention addresses the shortcomings of prior art automatic instrumentation reading and transmitting systems. While the invention applies generally to the collection and transmission of data from any type of remotely located instrumentation units, for ease of description, further reference herein will only be made to its applicability to meter reading systems, it being understood that the principles of this invention can be applied more broadly to instrumentation in general. The automatic/remote instrument reading system of this invention provides accurate and reliable transmission of, for example, encoded meter information that can be readily identifiably associated with the remote meter from which such information was transmitted. The automatic/remote instrument reading system of this invention employs a unique remote instrument reading method and associated apparatus that permits a large plurality of remote data collecting instruments to simultaneously transmit their respective encoded data to a mobile collection unit. The instrument monitoring transponder units themselves are relatively inexpensive in that no special or unique polling/decoding circuitry or highly tuned RF circuitry is required. The transmission units are easy to install in existing instrumentation and flexible for use, for example, with virtually any known meter structures. Their unique design provides for high reliability and a small battery with long battery life, typically in excess of five years, with minimal maintenance or servicing. These and other benefits and advantages of the automatic/remote instrumentation reading system method and apparatus of this invention will become apparent from a more detailed description of the invention.

SUMMARY OF THE INVENTION

This invention provides a unique method and apparatus for communicating information between a plurality of instrument monitoring units to a remotely located and preferably mobile data collection unit. The monitoring units are RF transponder circuits that are operatively connected to one or more instruments whose parameters are being monitored. The transponders continuously monitor one or more parameters of the instrument(s) with which they are associated. The transponders collect and (in the application of meter reading) accumulate parameter information and/or data from their associated instruments and continually listen for a "wake-up" signal from a mobile interrogate receiver/data collection unit. The transponder listens for the wake-up signal by using a low duty cycle listening technique that significantly reduces power consumption of the transponder. Upon receipt of a valid interrogation signal from the mobile unit, the RF transponders immediately transmit their accumulated information and/or data, in encoded format to receivers in the mobile data collection unit. Each transponder has a unique identification code associated therewith, and transmits its code identification back to the mobile unit along with its accumulated information/data so that the mobile unit can correlate received signals with the respective transmitting transponders.

A unique feature of this invention, and one which enables simplification and cost reduction of the transponder units is that all transponder units respond (are activated by) the same wake-up signal. The mobile interrogation unit does not uniquely poll (for example by identification code) the individual transponders, but energizes all transponders within range of the RF wake-up signal simultaneously. Therefore, all energized (enabled) transponders simultaneously transmit their respective transponder information back to the mobile receiver unit.

It will be understood that collision interference between signals of simultaneously transmitting transponders depends to some extent upon the spacing in the field between adjacent transponders. However, to minimize interference between transponder signals from simultaneously transmitting transponders, so as to enable clear reception of the transmitted information from each transponder, the transponders change the active time and frequency parameters of their respective RF transmissions. Change of the active transmission parameters by the transponders can be accomplished in random fashion, or according to a predetermined scheme. According to a preferred embodiment of the invention, variation of the transponder transmission parameters is achieved by use of unique identification codes associated with each transponder unit.

Each transponder, when activated, transmits its identification code and accumulated data a plurality of times by means of serially spaced transmission bursts. The number of transmission bursts for each transponder transmission is preferably the same, but need not be, and is referred to herein as the transmission cycle of a transponder. In a preferred embodiment of the invention the entire monitored information/data message accumulated by a transponder, is sent during each transmission burst of a transmission cycle. Those skilled in the art will appreciate that such information may be segmented for transmission, for example, such that different portions of the information would be sent during different transmission cycles of a transponder. According to one embodiment of the invention, the space or time interval between successive transmission bursts of a transponder is determined as a function of the unique identification code of that transponder unit. Each transponder within a physical area having transponders that are likely to be simultaneously activated by a "wake-up" signal is preferably assigned an indentification code that differs from those of other transponders in that area. With such simultaneously activated transponders having unique identification codes, the time intervals between transmission bursts of different transponders will necessarily differ, causing a separation in real time of transmission bursts between the respective transponders. Therefore, over the entire transmission cycle of the activated transponders, overlapping transmission bursts from simultaneously activated transponders is minimized.

In addition to varying the active "time" parameter of the transponder signals, their frequency parameters are also varied. The frequency at which an individual transponder transmits its RF transponder signal is set to vary in time according to a predetermined function such that each RF transmission burst of that transponder during a transmission cycle may occur at a different frequency. In a preferred embodiment of the invention the frequency variation function is associated with the unique identification code of the transponder. According to such embodiment, each transponder unit begins transmission when activated, at a preset transmission frequency. However, successive transmission bursts by that transponder occur at different frequencies, as determined by a formula proportional to the unique identification code of that transponder. Accordingly, as successive transmission bursts are transmitted by a transponder, the frequencies at which such bursts occur have a high probability of differing from the frequencies of transmission bursts of adjacent transponder units, such that at least one transmission burst of each simultaneously transmitting transponder unit will occur at a time and/or frequency different from those of other transponder units, and will therefore avoid collision interference with transmission bursts from the other activated transponders.

The mobile unit, besides having the "wake-up" interrogate transmitter, includes a receiver module for receiving the transmissions from the activated RF transponders. In a preferred embodiment of the invention, the wake-up signal is transmitted at a frequency different from the transmission frequencies of the RF transponders, to prevent overloading of the mobile receive module by the wake-up signal. The receiver module of the mobile unit may comprise any appropriate means for receiving the RF transponder signals, for isolating transmission bursts from individual transponders so as to enable clear reading of such isolated transmission bursts, and for decoding and handling the information contained within the received RF transmission bursts.

According to a preferred embodiment of the invention, the receiver module of the mobile unit includes a plurality of RF receiver circuits, each tuned to a different center frequency and having bandwidths selected so as to collectively cover the entire transmission bandwidth occupied by the plurality of transmitting RF transponders. According to a preferred embodiment of the invention, each of the plurality of RF receiver circuits is tuned in a manner such that its receiving bandwidth partially overlaps with the bandwidth of at least one other receiver circuit, wherein a transmission burst of an RF transponder is simultaneously received by at least one, and preferably by at least two RF receiver circuits in the mobile unit. RF signals received by the receiver circuits are verified as proper RF transponder signals, and are then processed. Such processing can include any processing functions such as simple storage of the information or print-out thereof, or further processing by a data processing unit within the mobile unit.

In a preferred embodiment of the invention, the information included within an RF transmission from a transponder includes identification code information which enables identification of the transmitting transponder. Once a "clear" transmission burst from a transponder is received by the receiver module of the mobile unit, the information contained within the transmission burst is decoded and sent to a data processing computer along with the identification code of its associated transponder. In a preferred embodiment of the invention, the transfer of information between the receiver module of the mobile unit and its data processor is performed by a controller network under microprocessor control, which accepts information from the receiver module by means of a parallel bus interface, and transmits such information to a data processing computer by means of a serial interface network.

Thus, according to a preferred embodiment of the invention there is provided an RF transponder suitable for use with an automatic/remote instrument monitoring system wherein the transponder is one of a plurality of such transponders configured to operate with at least one of a plurality of instruments remotely located from an interrogate/receiver means which transmits an RF energizing signal to the transponders and which receives and process RF signals from the transponders, wherein the transponder comprises:

(a) means suitable for operative connection with a parameter sensing instrument for providing a sensed instrument signal responsive to a condition of a parameter being sensed by said instrument;

(b) encoding means operatively connected to receive the sensed instrument signal for providing an encoded data signal in response thereto;
(c) RF receiving means for receiving an RF energizing signal and for providing a transponder enable signal in response thereto;
(d) RF transmitter means operatively connected to receive the transponder enable and the encoded data signals for transmitting in response thereto an RF transponder signal, wherein the RF transponder signal comprises a plurality of spaced RF transmission bursts each containing encoded information from the encoded data signal; and
(e) means operatively connected with the transmitter means for varying the frequency of the RF transponder signal according to a predetermined function such that the transmission bursts thereof may occur at a different frequency within a predetermined frequency bandwidth.

The invention also includes an automatic/remote instrument monitoring system for monitoring a plurality of instruments and for simultaneously transmitting data from the monitored instruments when energized by an RF wake-up signal to a remotely located interrogate receiver means, comprising:
(a) interrogate transmitter means for providing an RF wake-up signal, for initiating simultaneous read-out from a plurality of remotely located RF transponders;
(b) a plurality of RF transponders each configured for operative connection with at least one of the instruments to be monitored, wherein each transponder comprises:
  (i) data collection means operatively connected to collect parameter data from at least one of the instruments being monitored;
  (ii) transponder receiver means for receiving the RF wake-up signal and for enabling and initiating transmission of the collected parameter data from the transponder in response thereto;
  (iii) transponder transmitter means operatively connected with the data collection means and the transponder receiver means for transmitting an RF transponder signal to an interrogate receiver, the RF transponder signal is characterized by active time and frequency parameters and includes a plurality of RF transmission bursts, each containing the collected instrument parameter data; and
  (iv) means operatively connected with the transponder transmitter for determining at least one of the active parameters of the RF transponder signal in a manner such that the RF transponder signal of each transponder differs from that of the other transponders in a manner that enables the plurality of simultaneously transmitted RF transponder signals to be distinguished from one another; and
(c) interrogate receiver means remotely located from the transponders and cooperatively operable with the interrogate transmitter means for receiving and processing the plurality of simultaneously transmitted RF transponder signals from the remotely located transponders.

The invention also includes a method of providing communication between an interrogate/receiver and remotely located RF transponders in an instrument monitoring system of the type having a plurality of RF transponders operatively connected to automatically monitor parameters of instruments and which transmit such monitored information to the remotely located interrogate/receiver in reply to an RF interrogate signal from the interrogate/receiver. The method comprises:
(a) transmitting an RF interrogate signal from an interrogate/receiver to simultaneously activate a plurality of remotely located RF transponders;
(b) simultaneously transmitting signals from each of the activated RF transponders in serial, spaced RF transmission bursts, wherein the transmitted signals include at least in part the monitored parameter information from the instruments from which the transponders are operatively connected; and
(c) varying the spacing between successive transmission bursts of a transponder such that the spacings of at least two simultaneously activated transponders differ.

While the present invention will be described in association with a preferred embodiment configuration thereof, and a preferred application of the invention to the reading of meters, it will be understood that the invention is not limited to the particulars of either the preferred embodiment described or to its meter reading application. The transponder units of the preferred embodiment disclosed herein make extensive use of semiconductor integration principles in integrating most circuitry of the transponder unit, other than the radio frequency circuits, within a single integrated circuit. Such use of integrated circuit technology is not intended to limit the scope of the invention. Further, while particular logic circuits and types of logic are used to implement various functions of the preferred embodiment, such circuits and types of circuits are not to be construed in a limiting fashion. While the invention will be described with regard to a meter reading application wherein specific frequencies and bandwidths are used for transmitting information by radio frequency waves, such frequencies and bandwidths are not to be construed as limitations upon the scope of this invention. It will be understood, by way of example only, by those skilled in the art, that the frequencies and bandwidths available for use by applications to which this invention may be put, are typically determined and limited by or are under government control. It will also be understood by those skilled in the art, that the various power levels used by circuitry of the preferred embodiment can readily be varied to meet design or system needs. In this regard, while a wake-up signal of fixed power level is illustrated in the preferred embodiment, those skilled in the art will understand that the power level of the wake-up signal could be varied in order to limit or selectively limit the number of transponders activated at any one time. It will also be understood that while particular techniques for varying the time and frequency parameters of the RF transponder signals are disclosed, that the invention is not limited to such techniques. Further, while particular control circuitry and information processing circuits will be disclosed herein with respect to the preferred embodiment of the invention, it will be understood that such signal handling functions could widely vary as dictated by the particular system design needs. These and other design variations will be readily apparent to those skilled in the art in view of the following description of a preferred embodiment of the invention, which is not to be read or interpreted in a limiting manner.

BRIEF DESCRIPTION OF THE DRAWING

Referring to the Drawing, wherein like reference numerals represent like elements throughout the several views.

DESCRIPTION OF THE PREFERRED EMBODIMENT

General

Figure 1:
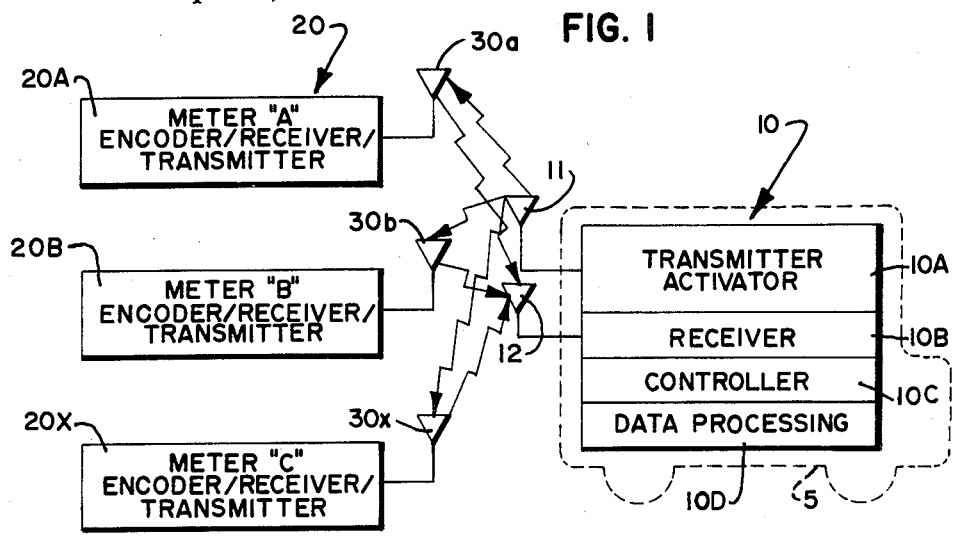
FIG. 1 is a block diagram representation illustrating the general interaction between a Mobile Data Collection unit and a plurality of remotely located Encoder/Receiver/Transmitter units as constructed according to the principles of the invention.

The following description and reference to the Drawings will describe a specific preferred embodiment application of the invention to the art of meter reading, and more particularly to the art of remote gas meter reading. As previously stated, it will be understood that the invention is not limited to the application being described with respect to the preferred embodiment of the invention, but that such description merely provides description of a specific means for implementing the invention in association with a use. Accordingly, it will be understood the the descriptions of particular features and functions and applications which follow herein are directed specifically to the preferred embodiment of the gas meter reading application being disclosed, and are not intended to be read in a limiting manner as applied to the invention as a whole. Those skilled in the art will readily appreciate the much broader application of the principles of this invention to instrumentation monitoring and control, in general.

Before proceeding with a detailed description of functional blocks and circuits, a brief overview of the operation of the invention as applied to the preferred meter reading embodiment may help the reader to place later description in the proper prospective. Individual Encoder/Receiver/Transmitter units (hereinafter referred to by their abbreviated designation "ERT's") are polled by transmitting a modulated RF signal from a transmitter located in a mobile unit such as a van or the like. The ERT replaces the standard index portion of the meter, or can be configured to attach to a modified version of the standard meter index. The ERT unit has circuitry for accumulating a digital log of the meter reading. As described in more detail hereinafter, this portion of the ERT circuitry counts the rotation of the meter index shaft, passes the shaft rotation information through a debounce circuit and stores the accumulated count corresponding to the meter reading in a meter data storage register. The ERT of the preferred embodiment also has a tamper detection network that is configured to detect movement of or unauthorized entry into the meter to which the ERT is attached.

The ERT unit is battery operated, and includes RF receiver and transmitter circuitry as well as digital logic and control circuitry. The RF receiver is configured to receive the RF signal transmitted by the mobile unit transmitter. Digital circuitry within the ERT constantly monitors the receipt of signals by the Receiver. Upon receipt of a valid transmission polling signal, the ERT responds by disabling the receiver input and transmitting the current digital message stored in the memory portion of the ERT, back to the mobile transmitter unit. The polling technique employed does not specifically identify or address each individual ERT unit, but is the same for all ERT units. Accordingly, individual ERT units, upon receiving a valid polling signal automatically transmit their respective information back to the mobile unit, totally independent of the operation of other ERT units which may simultaneously be transmitting their respective information back to the mobile unit in response to receipt of the same polling signal. As applied to the preferred embodiment, the information transmitted by the ERT includes a message preamble, its identification number, its accumulated meter reading data, the status of its tamper detection circuit, and whatever. other information may be selected for storage or transmission. To avoid confusion and to allow discrimination between simultaneously transmitting ERT units, each unit transmits its message a plurality of times (in the preferred embodiment, eight times) with the time internal between successive transmissions being determined by the unique ERT identification number. In addition, each successive transmission by an ERT unit is, or may be performed at a different frequency. Therefore, while many ERT units may be simultaneously transmitting their information in response to a single polling signal, there is a very high probability that no two units will begin their respective initial or subsequent transmissions at exactly the same time or at exactly the same frequency. This unique mode of transmission enables the mobile receiver unit to differentiate enough of the multiple transmissions of a respective ERT unit from those of others so as to enable a high probability of insured reception of the information transmitted by the respective ERT units. These features of the invention will be described in more detail hereinafter.

Figure 19:
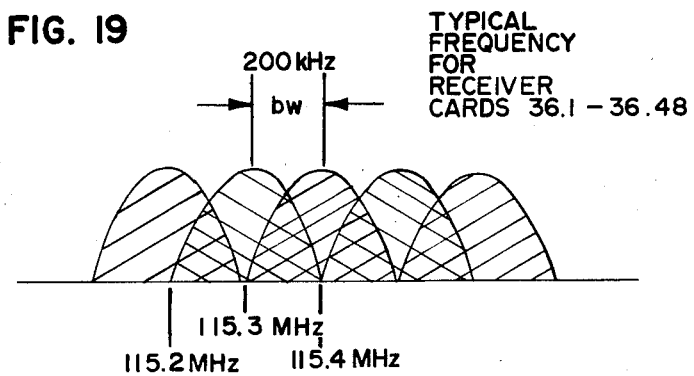
FIG. 19 is a diagrammatic representation of the overlapping bandwidth relationship that exists for a typical tuning configuration of receiver card 36 circuits as employed in the preferred embodiment of the invention.

The mobile unit, besides transmitting the initial polling signal includes a receiver system uniquely designed to receive the multiple and simultaneous transmissions of the plurality of ERT units which have been activated. The receiver unit generally includes a front end amplifier approximately tuned to 915 MHz with a passband of 910–920 MHz, a down-converter having an output of 110–120 MHz, and an intermediate frequency (IF) amplifier centered about 115 MHz. The IF amplifier output is split into a plurality of channels (in the preferred embodiment, into 48 channels) with each output from the splitter being applied to a narrow bandwidth IF receiver. Each receiver is tuned for a different frequency within the IF passband so that the frequency bandwidth segments preferably overlap (as illustrated in FIG. 19), to cover the entire desired ERT transmission frequency band. Each receiver encodes and buffers two complete messages received from the ERT units. The decoded information is transferred to a controller by means of a bus, along with a status byte containing information about the receiver's performance. If a particular receiver malfunctions, the controller unit can disable it to prevent interference with other receptions.

The controller reads information from the bus and performs various functions thereon such as chronological sorting and elimination of duplicate messages. The controller can also poll individual receivers and can respond to status inquiries from a data processing computer, to which the data is eventually forwarded. In the preferred embodiment, the controller passes oldest data to the data processing computer first. The computer performs the record keeping, manipulation and handling of the received data, and other functions applicable to the handling of meter reading information (functions which while obvious to those skilled in the art, do not form a part of this invention).

Referring to FIG. 1, application of the invention to a meter reading use is conceptually illustrated. A mobile unit, generally illustrated at 10 is depicted as being carried by a vehicle 5 such as a van or the like. The mobile unit 10 is generally illustrated as having a Transmitter/Activator functional portion 10A, a Receiver portion 10B, a Controller portion 10C and a Data Processing portion 10D. The Transmitter/Activator portion 10A transmit polling signals by means of an antenna 11 as the vehicle 5 proceeds down a roadway or the like in proximity to those premises in which meters to be polled are located. In the preferred embodiment of the invention, it is anticipated that the Transmitter/Activator 10A will have power sufficient to activate or poll remote ERT units that are located as far as 1,000 feet from the Mobile Unit 10 when the polling signal is transmitted. It will be understood, however, that the transmission power levels may be varied as dictated by design constraints, and are generally determined by and are under government control. Likewise, the Receiver 10B circuitry of the Mobile Unit 10, in combination with the energy of transmission afforded by the individual ERT units is such that accurate transmissions from the ERT units will be received by the Receiver 10B for subsequent decoding and processing over the designed ERT to Receiver 10B separation distance. The Mobile Unit 10 is further designed such that the data collection process afforded by the Mobile Unit 10 can be accurately achieved in a normal residential application, while the vehicle 5 is traveling at normal traffic speeds.

The polling signal from the Transmitter/Activator 10A is received by individual ERT units (generally illustrated at 20) installed in, on, or in association with the meters with which they are used. The specific ERT units are illustrated in FIG. 1 at 20A, 20B and 20X. The polling signal transmitted from the Mobile Unit 10 is received by the respective ERT units by means of a common receiver/transmitter antenna, generally illustrated at 30. As will be described in more detail hereinafter, the antenna 30 function to receive a polling signal transmitted by the Mobile Unit 10, when its associated ERT is in a "receive" or "listening" mode of operation, and also functions to transmit information from the respective ERT units when those units are functioning in a "transmit" mode. The information transmitted from the ERT unit 20 is collected by an antenna 12 operatively connected with the Receiver portion 10B of the Mobile Unit 10.

Encoder/Receiver/Transmitter

Figure 2:
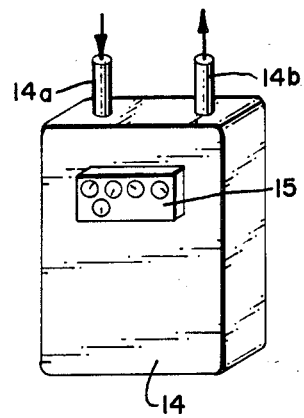
FIG. 2 illustrates a typical gas meter unit of the type with which the present invention can be employed for remotely recording gas meter readings.
Figures 3A, 3B:
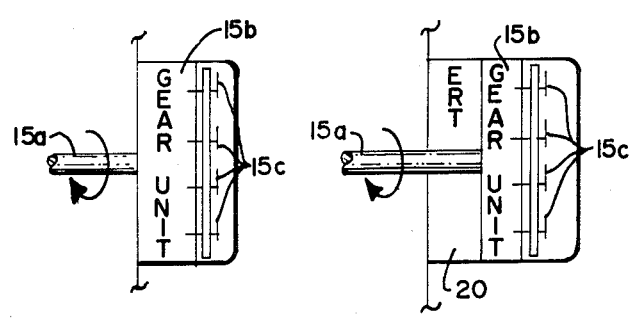
FIG. 3A is a diagrammatic cross-sectional view of the index portion of a meter of the type illustrated in FIG. 2.
FIG. 3B is a diagrammatic cross-sectional view of the meter index of FIG. 3A illustrating physical correlation of a typical Encoder/Receiver/Transmitter portion of this invention in association therewith.

As described above, the preferred embodiment of the invention will be described in association with its use for automatic/remote meter reading, and in particular, for the remote monitoring of gas meter readings. A typical construction of such a meter is diagrammatically illustrated at 14 in FIG. 2. The meter 14 generally has an inlet port 14a through which the gas commodity to be monitored enters, and an exit port 14b through which the metered gas commodity leaves the meter. The gas volume passing through the meter activates a consumption monitoring apparatus, the output of which is illustrated on appropriate dials or the like on what is generally referred as an index (15). A typical index 15 monitors gas consumption by means of a rotating index shaft 15a which moves in response to motion of gas volume through the meter. A typical index shaft is illustrated in FIG. 3A. The shaft rotation is processed, typically, by a mechanical gear unit 15b which is operatively connected to display a visual indication of the output reading on index dials 15c. Heretofore, conventional meter reading operations required physical reading of the output indication from the index dials by a meter reading individual.

FIG. 3 illustrates how a conventional index unit 15 can be modified to physically accept an ERT unit 20 constructed according to the principles of this invention. With minor modifications, the ERT circuitry and power supplying materials can be packaged directly behind the gear unit 15b, as illustrated, allowing rapid retrofitting of existing meter structures to accommodate this invention. While one technique for mounting the ERT 20 circuitry to a meter 14, and in particular to a meter index 15 thereof, has been illustrated, it will be understood that many alternate configurations can be envisioned by those skilled in the art. Further, while the present embodiment of the invention employs a mechanical technique for counting rotations of a meter index shaft to obtain an accumulated gas usage record, it will be understood that other techniques known in the art or generally applicable to the sensing of meter usage quantities, are equally applicable. It will also be understood that general principles of the invention, while being described with respect to a particular type of gas meter, are not limited to such applications, but extend equally well to all types of utility and instrumentation metering and control systems.

Figure 4:
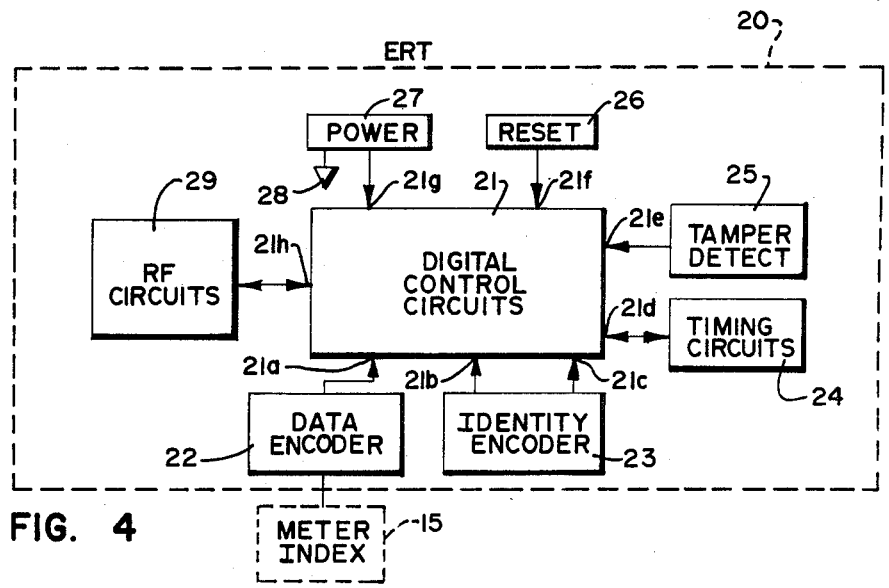
FIG. 4 is a functional block diagram representation of typical circuits comprising an Encoder/Receiver/Transmitter portion of the invention for an application of the invention as disclosed in FIG. 1.

A functional block diagram representation of the various functions of an ERT 20 configured according to the principles of this invention, is illustrated in FIG. 4. Referring thereto, the control and operation of the various functions of the ERT are primarily controlled by circuits physically housed within a single digital integrated circuit, generally referred to at 21. In the preferred embodiment, the Digital Control Circuit 21 is a custom CMOS integrated circuit, the use of which enables increased reliability, significantly reduced size and significant cost reduction of the ERT unit 20. The Digital Control Circuit 21 includes numerous logic circuits and gates which form portions of nearly all of the functional control features of the ERT unit 20. Those portions of particular "functions" performed by the ERT 20 which could not be integrated into the custom chip 21 are physically housed in discrete components, generally as illustrated in FIG. 4. Due to the fact, however, that the Digital Control Circuit 21 contains portions of all functions performed by the ERT 20, it will be difficult to maintain true functional identity continuity in numbering based on ERT "functions" only. Wherever practical, however, numbering continuity between the functional circuit representation of FIG. 4 and the following schematic representations will be maintained.

Information obtained from the meter index 15 is supplied to a Data Encoder functional block 22. The Data Encoder functional block 22 communicates with the Digital Control Circuits 21 by means of the input port 21a. It will be understood that the terminology "port" and "signal flow paths" refer to general connections or signal paths for accommodating data transfer, and may in reality comprise a plurality of terminals or circuit lines for effecting the data or signal transfer. Each ERT unit 20 has unique identity information associated therewith which is provided by means of the Identity Encoder functional block 23, which communicates with the Digital Control Circuit 21 by means of the input ports 21b and 21c. Extraneous timing circuits, not otherwise contained within the Digital Control Circuit 21 are illustrated within the Timing Circuits functional block 24, and communicate with the Digital Control Circuit 21 by means of the input port 21d.

A Tamper Detect functional block 25 includes circuits for detecting unauthorized tampering with the ERT 20 or meter 14 with which it is associated. These circuits communicate with the Digital Control Circuit 21 by means of an input port 21e. A Reset functional block 26 provides reset capabilities to the Digital Control Circuits by means of the input port 21f, and power is provided to the entire ERT unit 20 generally by means of the Power functional block 27, generally illustrated as communicating with the Digital Control Circuit 21 by means of the input port 21g. It will be understood throughout the remaining description, that all logic gates and other circuits requiring attachment to a power supply for their proper operation do in fact have such power connections even though individual power supply connections may not be illustrated in the respective schematic diagrams. In general, power capability is provided to the system by means of a long-life lithium chloride battery. While not specifically illustrated herein, it will be understood that appropriate voltage dividing networks are provided within the Power functional block 27 to achieve the various bias and other power source requirements of the individual circuits. Similarly, while "reference" or "ground" terminal connections will not be always identified throughout the circuit schematics, and in particular when referring to functional circuits, it will be understood by those skilled in the art that such "reference" connections are present in order to effect proper operation of the circuits as disclosed. The "reference" terminal is generally illustrated in FIG. 4, at 28.

Figure 5:
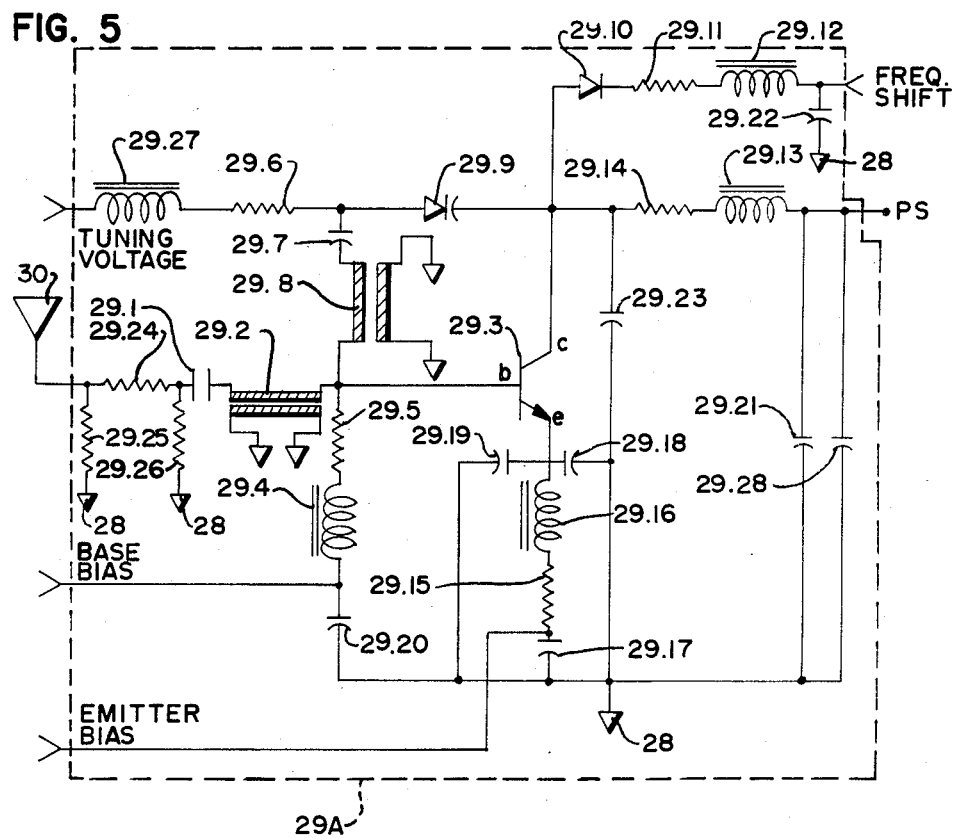
FIG. 5 is a schematic representation of a first portion of the RF Circuit functional block of FIG. 4, illustrating RF Receiver and Transmitter circuits thereof.

The RF Circuit portion of the ERT is functionally illustrated at 29 in FIG. 4, and generally communicates with the Digital Control Circuits 21 by means of the input/output port 21h. The RF Circuits 29 of the preferred embodiment include in combination, those circuits illustrated in FIGS. 5 and 6. The network in FIG. 5 represents the actual high frequency circuits used in the "receive" and "transmit" operations. Both of these operations share a common antenna 30, and rely upon control circuitry, hereinafter described, to determine whether the circuits will operate in a "receive" or a "transmit" mode. When operating in a "receive" mode, the RF Circuits 29 operate as a superregenerative detector network with an external squelch with a 0.1% active duty cycle that samples the received RF signal with a sample frequency of 500 Hz. Use of this technique significantly reduces the power consumption of the RF Circuits 29, allowing significant battery size reduction and extended battery life. In the preferred embodiment of the RF Circuits 29 hereinafter described, the power drain on the battery is less than 10 microamps with an active period of receive detection of less than 1 microsecond. The sensitivity of the receiver circuits of the RF Circuits 29 is better than −90 dbm to the wake-up transmitter signal of 955 MHz. The external squelch is provided at the NSUPGEN terminal of the FIG. 6 circuit. It will be understood, that while a particular configuration of the RF Circuits 29 will be described, those skilled in the art could readily conceive of other alternately acceptable configurations.

Referring to FIG. 5, the antenna 30 output is connected by means of a resistor 29.24 in series with capacitor 29.1 and a transmission line 29.2 to the base (b) of an RF npn transistor 29.3. A pair of resistors 29.25 and 29.26 are connected respectively between either end of resistor 29.24 and the reference bus 28. External bias is provided to the base (b) of the transistor 29.3 through an input terminal labeled BASE BIAS, which passes through a microstrip choke inductor 29.4 in series with a resistor 29.5. The base (b) of transistor 29.3 is also connected to an external input TUNING VOLTAGE by means of a microstrip choke inductor 29.27 connected in series with resistor 29.6, a capacitor 29.7 and a transmission line 29.8. The TUNING VOLTAGE input is also connected by means of the inductor 29.27 and resistor 29.6 and a varactor diode 29.9 to the collector (c) of transistor 29.3. The collector (c) of transistor 29.3 is also connected by means of a diode 29.10 in series with a resistor 29.11 and a microstrip choke inductor 29.12 to receive a FREQ SHIFT input terminal. The FREQ SHIFT terminal has a capacitor 29.22 connecting it to the reference bus 28. Power is provided to the network from the Power functional block 27 by means of a P.S. terminal which is connected through a microstrip choke inductor 29.13 and a resistor 29.14 to the collector (c) of transistor 29.3. An external EMITTER BIAS terminal is connected to the emitter (e) of transistor 29.3 through a resistor 29.15 and a microstrip choke inductor 29.16. The EMITTER BIAS terminal is also connected to the reference 28 bus by means of a capacitor 29.17. A pair of capacitors 29.18 and 29.19 also connect the emitter (e) of transistor 29.3 to the reference bus 28. The BASE BIAS input terminal is also connected to the reference bus by means of a capacitor 29.20. A capacitive path from the P.S. input terminal and the reference bus 28 is provided by capacitors 29.21 and 29.28. A capacitor 29.22 is also connected between the FREQ SHIFT and the P.S. terminals. A capacitor 29.23 is also connected between the collector (c) of transistor 29.3 and the reference bus 28. The antenna 30 comprises a ¼ wave length dipole member, and the RF network illustrated in FIG. 5 is tuned for oscillation at 955 MHz. A table of the values of the circuit elements used in the preferred embodiment implementation of the FIG. 5 circuit appears in Table 1. Microstrip parameters are provided for the inductor valves based on use of a Teflon ®-type 020 dielectric material, 0.020 inches thick with a dielectric constant of 2.5, and for a 1 ounce tin plated copper conductor imprinted thereon.

TABLE 1

| CIRCUIT VALUES FOR FIG. 5 | |
|---|---|
| 29.1 | 150 picofarads |
| *29.2 | 0.147 × 1.203 |
| 29.3 | npn transistor (NE 85637) |
| 29.4 | 0.018 × 1.502 |
| 29.5 | 180 ohms |
| 29.6 | 10 kohms |
| 29.7 | 4.7 picofarads |
| 29.8 | 0.044 × (1.199 to 1.813) |
| 29.9 | Varactor diode (MMBV2101) |
| 29.10 | Pin diode |
| 29.11 | 680 ohms |
| 29.12 | 0.013 × 2.483 |
| 29.13 | 0.013 × 2.375 |
| 29.14 | 4.7 ohms |
| 29.15 | 10 ohms |
| 29.16 | 0.018 × 1.071 |
| 29.17 | 150 picofarads |
| 29.18 | 7 picofarads |
| 29.19 | 4.7 picofarads |
| 29.20 | 150 picofarads |
| 29.21 | 150 picofarads |
| 29.22 | 150 picofarads |
| 29.23 | 4.7 picofarads |
| 29.24 | 18 ohms |
| 29.25 | 300 ohms |
| 29.26 | 300 ohms |
| 29.27 | 0.013 × 1.186 |
| 29.28 | 0.001 microfarads |

*(inductor values given in inches)

The "square" designation for an input or output terminal will refer to an input or output signal designation for the Digital Control Circuits 21. Input and output designations not containing such "square" identifiers will be assumed to originate or to be destined for other locations within the Digital Control Circuit network 21 itself or have originated and continued to travel in circuitry external of the Digital Control Circuit network 21.

Figure 6:
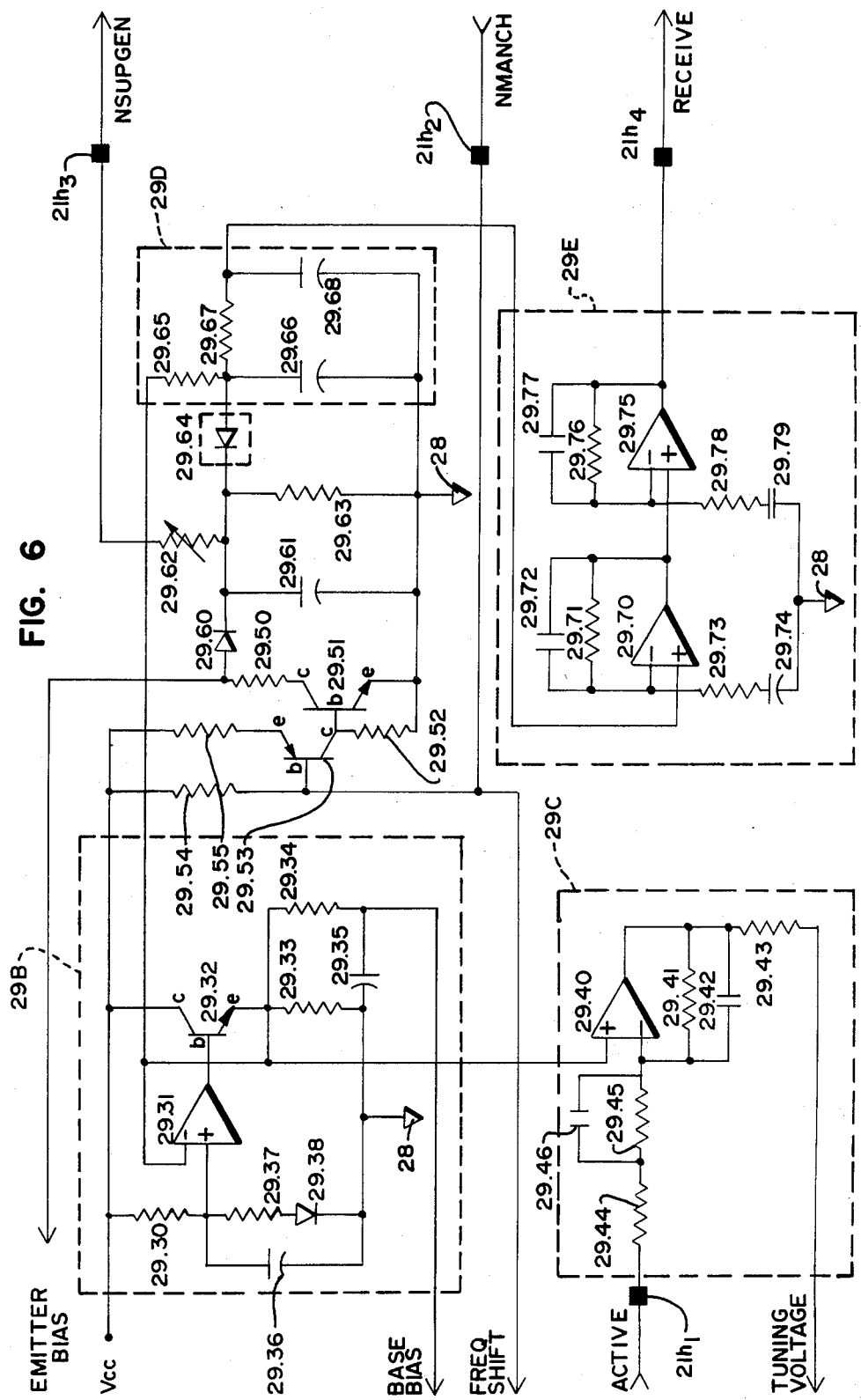
FIG. 6 is a schematic representation of a second portion of the RF Circuit functional block of FIG. 4, illustrating complementary control and peripheral circuits for those illustrated in FIG. 5.

Referring to FIG. 6, the BASE BIAS signal is provided by those circuits contained within the dashed block 29B, which serves as a fixed bias temperature compensated voltage source. Bias voltage is supplied to the circuits by means of a $V_{cc}$ input terminal operatively connected to the Power Source 27 (not illustrated). The $V_{cc}$ input terminal is connected by means of a resistor 29.30 to the noninverting input terminal of an amplifier 29.31. The signal output of the amplifier 29.31 is connected to the base (b) of an npn transistor 29.32. The emitter (e) of transistor 29.32 is connected to the inverting input of the amplifier 29.31 and is also connected by means of a resistor 29.33 to the reference bus 28. The emitter (e) of transistor 29.32 is also connected by means of a resistor 29.34 in series with a capacitor 29.35 to the reference bus 28. The collector (c) of transistor 29.32 is directly connected to the supply bus $V_{cc}$. The noninverting input of amplifier 29.31 is connected by means of a capacitor 29.36, connected in parallel with the series combination of a resistor 29.37 and a diode 29.38 to the reference bus 28. The BASE BIAS output signal is provided from the emitter (e) of transistor 29.32 through the 29.33–29.35 resistor and capacitor combination.

The circuitry which provides in part the capability for changing the frequency of transmission of signals from the ERT 20 during a transmission sequence, is primarily illustrated at 29C in FIG. 6. Referring thereto, the emitter (e) of transistor 29.32, as well as the inverting input of amplifier 29.31 are directly connected to the noninverting input terminal of an amplifier 29.40. A parallel feedback combination of a resistor 29.41 and a capacitor 29.42 are connected between the output and inverting input terminals of amplifier 29.40. The signal output terminal of amplifier 29.40 is further connected by means of a resistor 29.43 for providing a signal output to the TUNING VOLTAGE terminal of the RF network 29A. The inverting input terminal of amplifier 29.40 is also connected by means of a resistor 29.44 in series with the parallel combination of a resistor 29.45 and a diode 29.46 to the ACTIVE output terminal 21$h$1 of the Digital Control Circuit network 21.

The EMITTER BIAS terminal of network 29A is connected (see FIG. 6) by means of a resistor 29.50 to the collector (c) of an npn transistor 29.51. The emitter (e) of transistor 29.51 is directly connected to the reference bus 28, and its base (b) is connected by means of a resistor 29.52 to the reference bus 28. An output terminal 21$h$2 from the Digital Control Circuit network 21 is directly connected to the base (b) of a pnp transistor 29.53. The base (b) of transistor 29.53 is also connected by means of a resistor 29.54 to the supply bus $V_{cc}$. The supply bus $V_{cc}$ is also connected by means of a resistor 29.55 to the emitter (e) of transistor 29.53. The collector of transistor 29.53 is directly connected to the base (b) of transistor 29.51. The base (b) of transistor 29.53 is also connected to form the FREQ SHIFT signal input for the 29A RF circuits of FIG. 5.

The EMITTER BIAS signal line is also connected by means of a diode 29.60 and a capacitor 29.61 to the reference bus 28, and is connnected by means of the resistor 29.60 and a variable resistor 29.62 to the NSUP-GEN input terminal 21$h$3 of the Digital Control Circuit 21. The juncture of resistors 29.60 and 29.62 is also connected by means of a resistor 29.63 to the reference bus 28. The signal appearing at the juncture of resistors 29.60, 29.62 and 29.63 passes through a peak detection diode 29.64 and through a filter network, generally designated at 29D to an amplifier, generally designated at 29E. The filter 29D includes a resistor 29.65 connnected between the inverting input terminal of the amplifier 29.31 and the anode of detector diode 29.64. The anode of diode 29.64 is also connected by means of a capacitor 29.66 in parallel with the series combination of a resistor 29.67 and capacitor 29.68 to the reference bus 28. The signal output from the filter 29D is directly applied to the noninverting input terminal of a first amplifier 29.70 of the amplifier network 29E.

A parallel feedback resistor 29.71 and capacitor 29.72 network are connected between the signal output and the inverting input terminals of the amplifier 29.70. The inverting input terminal of amplifier 29.70 is also connected by means of a resistor 29.73 in series with a capacitor 29.74 to the reference bus 28. The signal output of amplifier 29.70 is directly connected to the noninverting input terminal of a second amplifier 29.75, having a parallel feedback resistor 29.76 and capacitor 29.77 network connected between its signal output and inverting input terminals. The inverting input terminal of amplifier 29.75 is further connected by means of a resistor 29.78 in series with a capacitor 29.79 to the reference bus 28. The signal output of amplifier 29.75 is directly connected to the RECEIVE input terminal 21$h$4 of the Digital Control Circuit 21. The component values for the preferred embodiment circuit of FIG. 6 are provided in Table 2.

TABLE 2

| CIRCUIT VALUES FOR FIG. 6 | | | |
|---|---|---|---|
| 29.30 | 2.7 Megohm | 29.54 | 10 Kohms |
| 29.31 | Amplifier | 29.55 | 470 Ohms |
| 29.32 | NPN Transistor (MPS-A18) | 29.60 | Diode |
| 29.33 | 1 Megohm | 29.61 | .001 Microfarad |
| 29.34 | 100 ohm | 29.62 | 1 Kohm variable |
| 29.35 | 6.8 Microfarad | 29.63 | 330 Kohm |
| 29.36 | 1 Microfarad | 29.64 | Diode (MBD-101) |
| 29.37 | 1 Megohm | 29.65 | 10 Megohm |
| 29.38 | Diode (1N4148) | 29.66 | .001 Microfarad |
| 29.40 | 1 Amplifier | 29.67 | 2.7 Megohm |
| 29.41 | 1 Megohm | 29.68 | .001 Microfarad |
| 29.42 | .47 Microfarad | 29.70 | Amplifier |
| 29.43 | 10 Kohm | 29.71 | 2.7 Megohm |
| 29.44 | 2.7 Megohm | 29.72 | 0.01 Microfarad |
| 29.45 | 1.8 Megohm | 29.73 | 47 Kohm |
| 29.46 | .47 Microfarad | 29.74 | 68 Microfarads |
| 29.50 | 33 Ohms | 29.75 | Amplifier |
| 29.51 | NPN Transistor (MPS-H10) | 29.76 | 2.7 Megohm |
| 29.52 | 3.3 Kohms | 29.77 | 0.01 Microfarad |
| 29.53 | PNP Transistor (2N4403) | 29.78 | 47 Kohm |
| | | 29.79 | 6.8 Microfarad |

Figure 7:
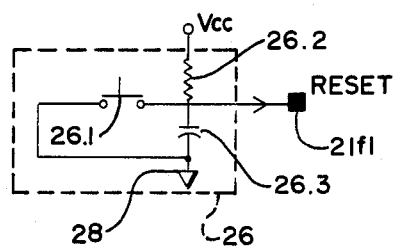
FIG. 7 is a schematic representation of the Reset functional circuits portion of the network illustrated in FIG. 4.

Referring to FIG. 7, the reset function (referred to at 26 in FIG. 4) is simply provided by means of a normally open switch 26.1 connecting the RESET input terminal 21$f$1 of the Digital Control Circuit 21 to the reference bus 28. The RESET terminal is normally connected by means of a resistor 26.2 to the bias voltage $V_{cc}$ of the Power Source 27. A capacitor 26.3 is also connected between the RESET terminal and the reference bus 28. The logic and control circuits of the ERT units 20 can also be reset initially simply by disconnecting momentarily the bias voltage terminal from the battery source.

Figure 8:
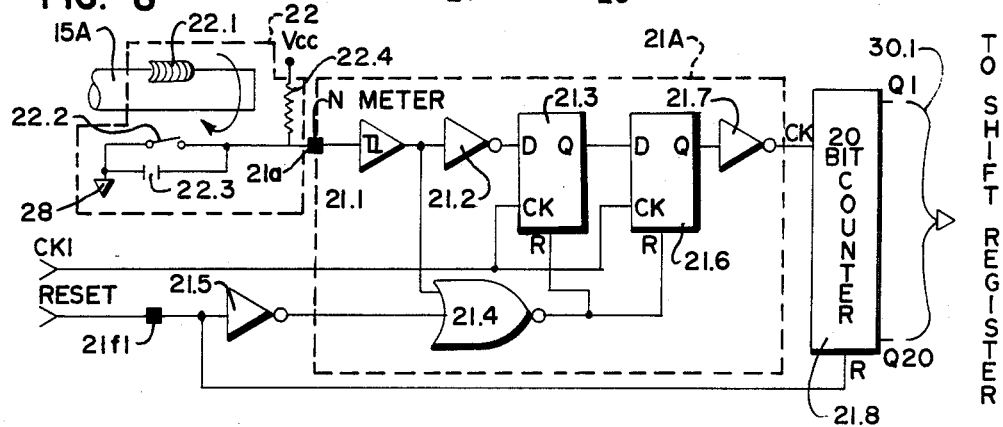
FIG. 8 is a schematic representation of the Data Encoding and associated logic circuit portions of the network illustrated in FIG. 4.

The Data Encoder functional network 22 is illustrated in more detail in FIG. 8. Referring thereto, the meter index shaft 15a is illustrated with a magnet 22.1 connected for rotation therewith. Aligned with the shaft and for activation by the magnet 22.1 is a reed switch 22.2. A capacitor 22.3 is connected across the switch 22.2. One terminal of the switch 22.2 is directly connected to the reference bus 28, and the other terminal is connected through a resistor 22.4 to the voltage supply terminal $V_{cc}$. The supply-connected terminal of the switch 22.2 is also directly connected to the NMETER input terminal 21a of the Digital Control Circuit 21. The NMETER input terminal 21a provides the input terminal to a debounce network 21A as used herein.

The signal applied to the NMETER input terminal 21a passes through a Schmitt trigger 21.1 and is applied by means of an inverter 21.2 to the data (D) input terminal of a delay flip-flop 21.3. The output signal from the Schmitt trigger 21.1 is also applied to a first input terminal of a NOR gate 21.4. The second input to the NOR gate 21.4 is provided from the RESET input terminal 21f1 by means of an inverter 21.5. A clock input signal is provided to the clock (CK) input terminal of the flip-flop 21.3 from a CK1 input terminal. The signal appearing on CK1 originates in the timing circuit networks to be described in more detail hereinafter. It should be noted here, and throughout the descriptions to follow, that no designation is being made herein as to whether the flip-flops described are negative or positive logic. The output signal from the NOR gate 21.4 is applied to the reset (R) input terminal of the flip-flop 21.3, and is also applied to the reset (R) input terminal of a flip-flop 21.6. The Q output terminal of flip-flop 21.3 is directly connected to the data (D) input terminal of flip-flop 21.6, and the CK1 input terminal signal is directly applied to the clock (CK) input terminal of flip-flop 21.6. The signal from the output teminal Q of flip-flop 21.6 is applied by means of an inverter 21.7 to the clock (CK) input terminal of a 20 bit counter 21.8. A reset signal is applied to the reset (R) input terminal of the counter 28.8 by means of the RESET input terminal 21f1. The counter 21.8 provides a 20 bit output count at its output terminals (Q1 through Q20) which is carried by means of a signal flow path, generally designated at 30.1 to input terminals of a shift register to be described in more detail with respect to FIG. 14. The activating signal provided to the input terminal 21a from the reed switch 22.2 as the shaft 15A and its associated magnet 22.1 rotate is shaped by the debounce circuit 21A to provide a clean clock pulse to the counter 21.8 for each revolution of the index shaft 15A. Accordingly, Counter 21.8 maintains a running log or count of the revolutions of the meter index shaft 15A, which can be correlated to the volume of gas passing through the meter 14.

Figure 9:
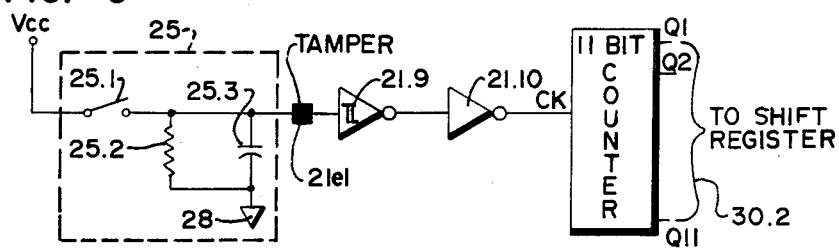
FIG. 9 is a schematic representation of the Tamper Detect and associated logic circuit portions of the network illustrated in FIG. 4.

The Tamper Detect network circuitry 25 is illustrated in more detail in FIG. 9. Referring thereto, a motion sensitive switch or other sensing member such as the mercury switch 25.1 is connected to the voltage supply bias $V_{cc}$ and is operative when activated by an unauthorized disturbance to provide an output signal to the TAMPER input terminal 21e1 of the Digital Control Circits 21. The TAMPER input terminal connection to the switch 25.1 is also connected by means of a resistor 25.2 connected in parallel with a capacitor 25.3 to the reference terminal 28. An input signal applied to the TAMPER input terminal 21e1 is applied by means of a Schmitt trigger 21.9 and an inverter 21.10 to set the clock (CK) input of an 11 bit counter 21.11, having reset capability. The 11 output terminals Q1–Q11 of counter 21.11 are connected to provide an 11 bit input signal to the data collection shift register of the Digital Control Circuits 21, as hereinafter described, by means of the signal flow path 30.2.

Figure 10:
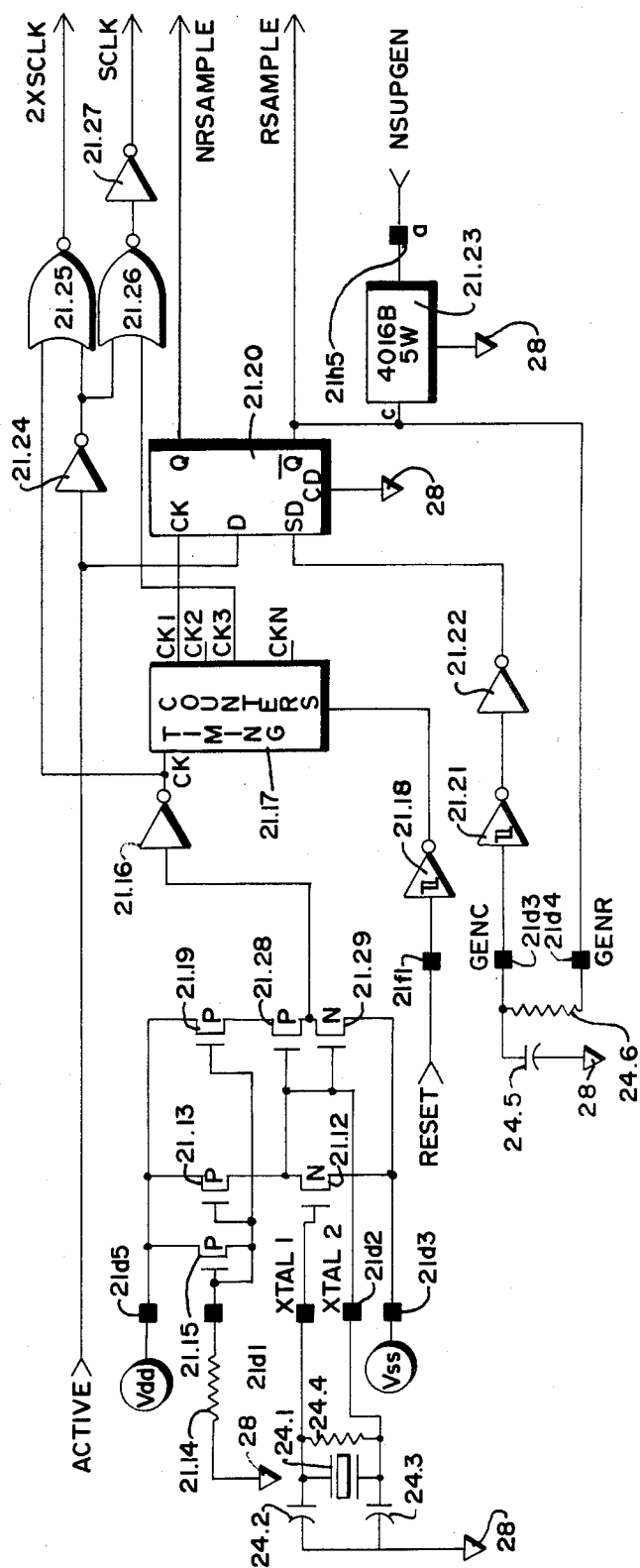
FIG. 10 is a schematic representation of circuits comprising the Timing Circuit and associated logic functional portions of the network illustrated in FIG. 4.

Timing functions within the circuitry originate with the timing Circuits 24 (FIG. 4) and are refined by digital timing circuits located within the Digital Control Circuit 21, as primarily illustrated in FIG. 10. Referring thereto, the primary timing signals originate within the Timing Circuits 24 with a 32 KHz crystal oscillator 24.1. The oscillator has a pair of capacitors 24.2 and 24.3 connecting its respective terminals to the reference terminal 28 and is connnected in parallel with a resistor 24.4 to provide a primary oscialltor signal between input terminals 21d1 and 21d2 of the Digital Control Circuit network 21. The signals appearing at these input terminals are respectively labeled as XTAL1 and XTAL2. Another pair of timing components forming a portion of the Timing Circuits 24 are a capacitor 24.5 and a resistor 24.6. The capacitor 24.5 is connected between an input terminal GENC and the reference bus 28. The resistor 24.6 is connected between the GENC terminal 23D3 and the GENR terminal 21d4.

The XTAL1 input signal (terminal 21d1) is applied to the gate terminal of an n-channel CMOS gate 21.12. The source of the gate 21.12 is connected by means of a terminal 21d3 to the $V_{SS}$ supply voltage. The drain of gate 21.12 is connected to the XTAL2 (21d2) terminal and is also connected to the source of a p-channel CMOS gate 21.13. The drain of gate 21.13 is connected by means of a terminal 21.d5 to the $V_{DD}$ supply voltage. The gate terminal of the p-channel gate 21.13 is connected by means of a terminal 21d4 and a resistor 21.14 to the reference bus 28. The terminal 21d4 is also connected to the gate terminal of a p-channel CMOS gate 21.15. The drain of gate 21.15 is connected to the terminal 21d5, and its source is connected to its gate terminal. The terminal 21d5 is also connected to the gate terminal of a p-channel CMOS gate 21.19. The drain of gate 21.19 is connected to the terminal 21d5, and its source is connected to the drain of a p-channel CMOS gate 21.28. The gate terminal of the p-channel device 21.28 is connected to the drain of gate 21.12 and is also connected to the XTAL2 (21d2) terminal. Terminal 21d2 also is connected to the gate terminal of an n-channel CMOS gate 21.29. The source of gate 21.29 is connected to the terminal 21d3, and its drain is connected to the source terminal of gate 21.28, to form the signal output from the CMOS gate configuration comprising gates 21.12, 21.13, 21.15, 21.19, 21.28 and 21.29. The signal output from the CMOS gate network is applied by means of an inverter 21.16 to the clock (CK) input terminal of a Timing Counter functional block 21.17. The Timing Counter block 21.17 comprises a plurality of counter circuits clocked by the signal from the crystal 24.1 and provides a plurality of timing output signals at its clock output terminals, referred to in the figures as: CK1, CK2, CK3, ... CKN. The timers within the Timing Counter block 21.17 are reset by means of a reset input terminal (R). The RESET signal from the RESET functional block 26 as provided by means of the input terminal 21f1 and a Schmitt trigger 21.18 to the reset (R) input terminal of the Timing Counter network 21.17.

The timing output signal provided by the Timing Counters 21.17 are used for sychronizing and coordinating timing functions throughout the entire ERT 20 unit.

The primary timing signals used throughout the network are the CK1 output signal having 1953.1 microsecond pulse rate, the CK2 timing signal having a 976.6 microsecond timing rate and the CK3 timing signal having a 61.0 microsecond rate. Referring to FIG. 10, the CK1 timing signal is directly applied to the clock (CK) input terminal of a flip-flop 21.20. The data (D) input terminal of the flip-flop 21.20 is directly connected to receive the ACTIVE signal. The GENC signal applied by means of the input terminal 21d3 is applied by means of a Schmitt trigger 21.21 and an inverter 21.22 to the SD input terminal of the flip-flop 21.20. The CD input terminal of flip-flop 21.20 is directly connected to the reference bus 28. The Q output terminal of the flip-flop 21.20 provides an output signal designated as NRSAMPLE, and the $\overline{Q}$ output terminal of flip-flop 21.20 provides an output signal designated as RSAMPLE. The $\overline{Q}$ output terminal of flip-flop 21.20 is also directly connected to the GENR input terminal 21d4 of the Digital control Circuit 21 and is also connected to the control (c) input terminal of a bilateral switch newtork 21.23. The input terminal of the bilateral switch 21.23 is directly connected to the signal input terminal 21h5 of the Digital Control Circuit functional block 21 and is designated as NSUPGEN. This signal originates from the RF circuits 29. The output terminal of the bilateral switch 21.23 is directly connected to the reference bus 28. The ACTIVE signal is also applied by means of an inverter 21.24 to a first input terminal of a NOR gate 21.25. The second input terminal of the NOR gate 21.25 is connected to receive the crystal oscillation signal from the output of the inverter 21.16. The output of the NOR gate 21.25 provides an internal signal designated as 2XSCLK. The first input terminal of the NOR gate 21.25 is also connected to a first input terminal of a NOR gate 21.26. The second input of NOR gate 21.26 is directly connected to receive the CK3 timing signal. The signal output from NOR gate 21.26 is connected by means of an inverter 21.27 to form the internal timing signal designated as SCLK.

Figure 11:
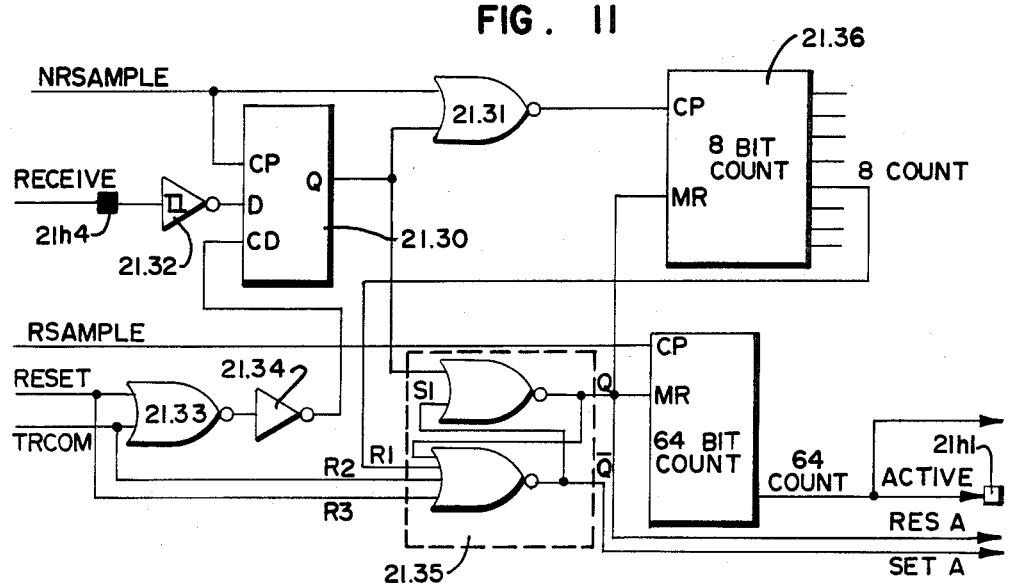
FIG. 11 is a schematic representation of that portion of the Digital Control Circuits illustrated in FIG. 4 which analyze an incoming RF signal received by an Encoder/Receiver/Transmitter unit.

That portion of the Digital Control Circuit network 21 which analyzes a received RF signal to determine whether it is receiving a proper polling signal is illustrated in FIG. 11. Referring thereto, the NRSAMPLE input signal generated by the timing circuits of FIG. 10 is directly applied to the clock pulse input terminal (CP) of a flip-flop 21.30, and is also directly applied to a first input terminal of a NOR gate 21.31. The RECEIVE signal input applied by means of the Digital Control Circuit input terminal 21h4 is applied by means of a Shcmitt trigger 21.32 to the D input terminal of the flop-flop 21.30. RESET and TRCOM input signals to a NOR gate 21.33 provide a reset signal through the NOR gate 21.33 and an inverter 21.34 to the CD input terminal of flip-flop 21.30. The signal output from the Q output terminal of flip-flop 21.30 is directly applied to the second input terminal of the NOR gate 21.31 and is also directly applied to the set (S) input terminal of a latch network 21.35. The latch has three reset input terminals (R1, R2 and R3). The RESET and TRCOM input signals are directly applied to reset input terminals R3 and R2 respectively of latch 21.35. The third reset input (R1) of latch 21.35 is activated by the signal output from an 8 Counter 21.36. Clock pulses to the Counter 21.36 are provided by the NOR gate 21.31. Counter 21.36 has a reset input terminal (MR) directly connected to the Q output terminal of the latch 21.35.

The counter 21.36 is a standard binary counter with the output of which is connected such that when the counter has been clocked eight times, the output signal appearing at its connected output terminal will provide a reset signal to the R1 terminal of the latch 21.35. The output signal appearing at the Q terminal of the latch 21.35 is also directly connected to the reset (MR) input terminal of a 64 bit Counter 21.37. The RSAMPLE is connected to provide a clocking input signal to the clock input terminal (CP) of the counter 21.37. Only that output terminal of the counter 21.37 which indicates an accumulated count of 64 is connected, and provides an output signal referred to as ACTIVE. As previously described, the ACTIVE signal also is provided as an output signal for the Digital Control Circuit 21 at output terminal 21h1. The signal appearing at the Q output terminal of latch 21.35 is also provided under the designation RES A for use by other circuits within the Digital Control Circuit functional block 21, as is the signal output from the $\overline{Q}$ output terminal of the latch 21.35, which is denoted as SET A. A more detailed description of operation of the FIG. 11 circuitry will be described later.

Figure 12:
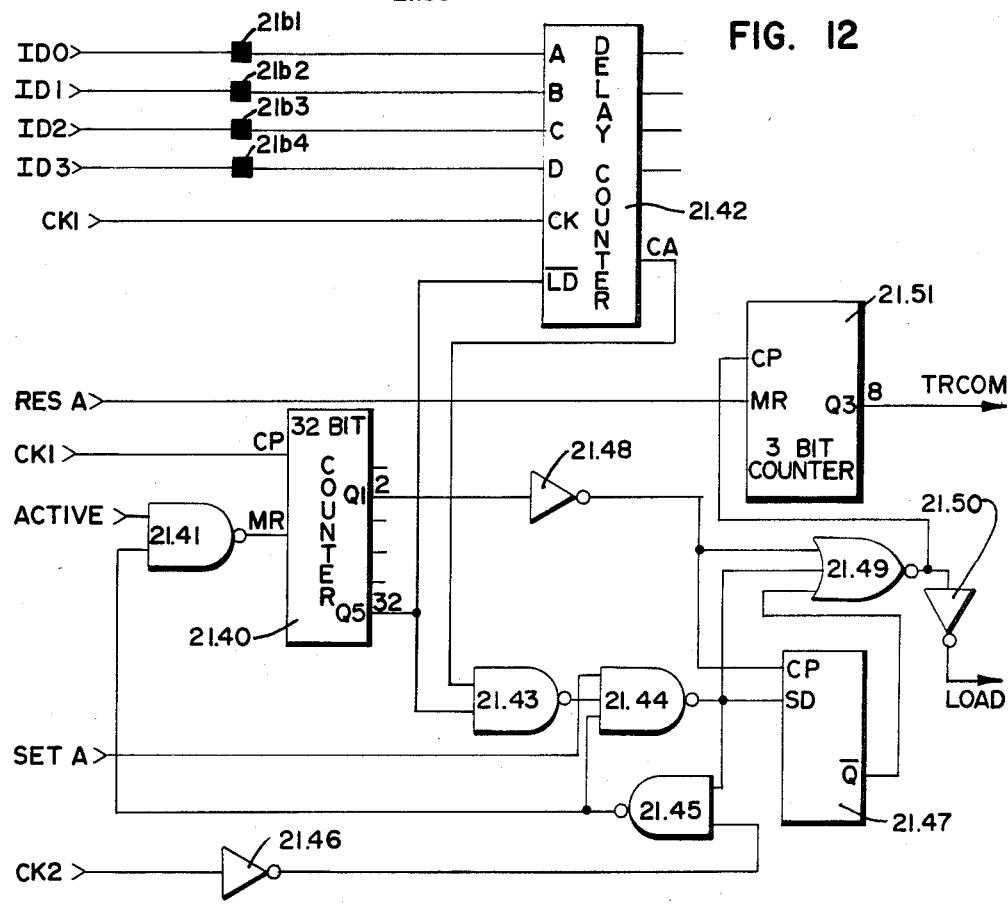
FIG. 12 is a schematic representation of that portion of Digital Control Circuits of FIG. 4 which control the RF transmission of signals from an Encoder/Receiver/Transmitter unit.

The circuit of FIG. 12 illustrates that portion of the Digital Control Circuit network 21 which controls the RF transmission of signals from the ERT 20, to the Mobile Unit 10. The CK1 timing signal (see FIG. 10) is directly applied to the clock pulse (CP) input terminal of a 32 bit counter 21.40. The ACTIVE signal generated by the FIG. 11 circuit is applied to a first input terminal of a NAND gate 21.41, the output of which is applied to the reset (MR) input terminal of the counter 21.40. The counter 21.40 is a typical 32 bit counter having signal outputs Q0–Q5 with the Q1 output terminal representing a count of 2 and the Q5 output terminal representing a count of 32. Only these two output terminals are connected to provide output signals. The Q5 output terminal of counter 21.40 is connected to provide an input signal to the delay input terminal ($\overline{LD}$) of a Delay Counter 21.42. The Delay Counter 21.42 has a clock input terminal directly connected to receive the CK1 timing signal and has a plurality of delay set input terminals (A, B, C and D). The delay set input terminals A-D respectively are directly connected to the Digital Control Circuit input terminals 21b1–21b4 respectively, and are wired to receive the first four bits of a 24 bit unique identifier code established for that particular ERT 20 unit. The first four bits are respectively identified in FIG. 12 as ID0, ID1, ID2, and ID3. The Delay Counter 21.42 functions to delay providing an output signal at its CA output terminal when data is present at its ($\overline{LD}$) terminal and after a clock pulse is received at its (CK) input, for a period of time corresponding to the information being applied to its delay set input terminals (A–D).

The signal output from the CA output terminal of the delay counter 21.42 is applied to a first input terminal of a NAND gate 21.43. The second input terminal of NAND gate 21.43 is connected to receive the signal output from the Q5 output terminal (representing an accumulated count of 32 clock pulses) of the counter 21.40. The signal output from NAND gate 21.43 is connected to a first input terminal of a three input NAND gate 21.44. A second input terminal of NAND gate 21.44 is connected to receive the SET A signal (from FIG. 11). The signal output terminal of NAND gate 21.44 is connected to a first input terminal to input NAND gate 21.45. The second input terminal of NAND gate 21.45 is connected to receive the CK2 clock pulse timing signal through an inverter 21.46. The signal output from NAND gate 21.45 is applied to the third input terminal of NAND gate 21.44 and to the second input terminal of NAND gate 21.41. The signal output terminal of NAND gate 21.44 is also directly connected to the set (SD) input terminal of a flip-flop 21.47. The Q1 (i.e. two count) signal output terminal of Counter 21.40 is connected by means of an inverter 21.48 to apply clock pulses to the clock (CP) input terminal of flop-flop 21.47 and also to a first input terminal of a three input NOR gate 21.49. The second input terminal of NOR gate 21.49 is connected to receive the signal output from NAND gate 21.44, and the $\bar{Q}$ signal output from flip-flop 21.47 is connected to provide a signal input to the third input terminal of NOR gate 21.49. The output signal from NOR gate 21.49 is connected by means of an inverter 21.50 to provide a LOAD signal for initiating RF transmission from the ERT (as described hereinafter in more detail). The signal output from NOR gate 21.49 is also provided to the clock (CP) input terminal of a 3 bit counter 21.51. The reset (MR) input terminal of counter 21.51 is connected to receive the RES A signal generated by the FIG. 11 circuitry, and the Q3 output terminal of counter 21.51 (representing a count of 8) is connected to provide the TRCOM (Transmission Complete) signal for use within the Digital Control Circuit logic 21.

Figure 13:
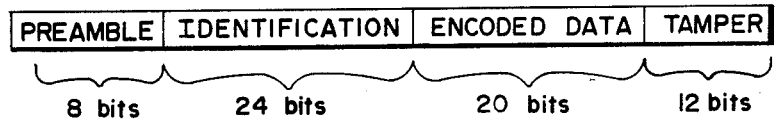
FIG. 13 is a diagrammatic representation illustrating the sequence and typical content of information transmitted by an Encoder/Receiver/Transmitter unit of the type illustrated in FIG. 4 for a preferred embodiment application of the invention, as used in meter reading.
Figure 14:
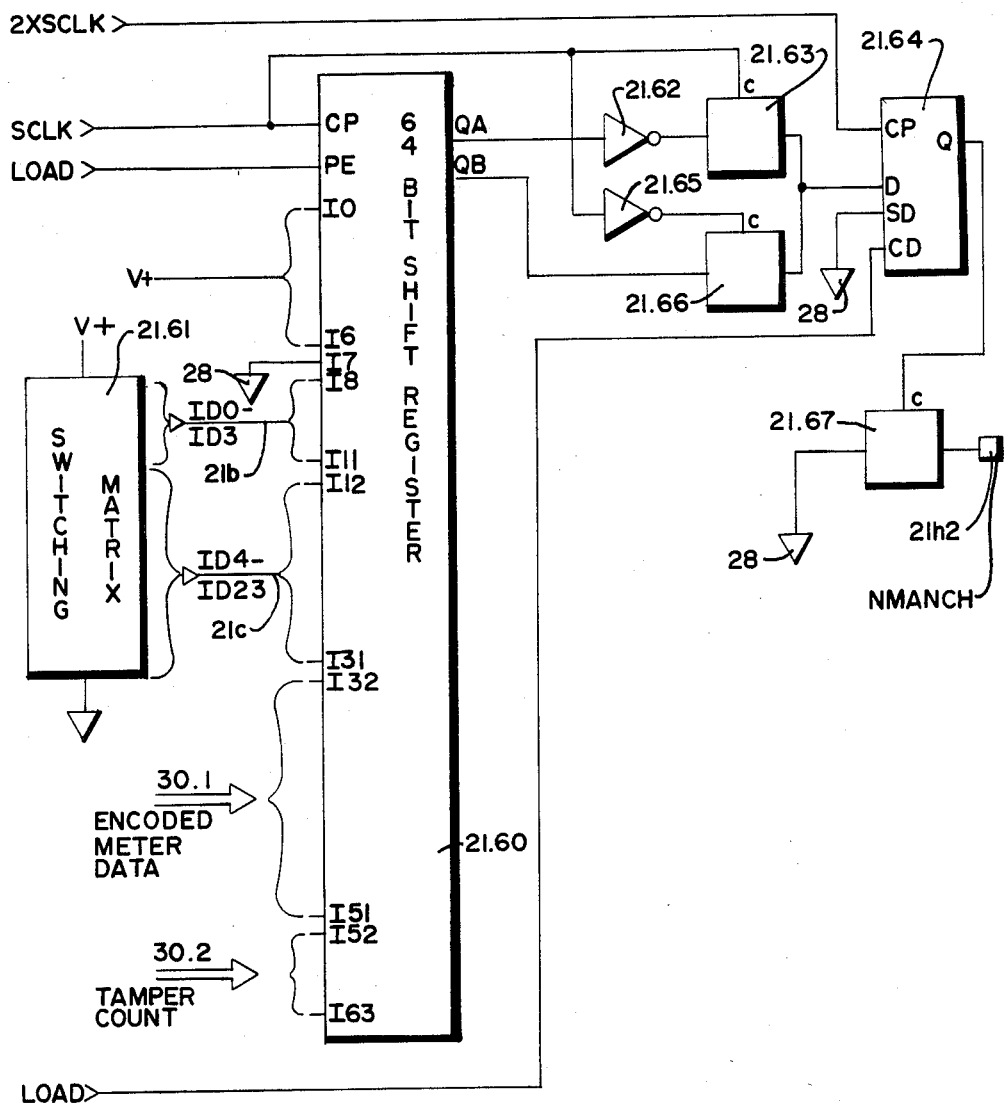
FIG. 14 is a schematic representation of that portion of the Digital Control Circuits of FIG. 4 which store the information depicted in FIG. 13 for subsequent transmission by an Encoder/Receiver/Transmitter unit.

The circuitry for storing and loading information for subsequent transmission by the RF circuits of the ERT 20 is illustrated in FIG. 14. In the preferred configuration of the invention, the information to be transmitted is simply stored in a 64 bit shift register 21.60. The shift register 21.60 is a 64 stage parallel input/serial output static shift register, wherein information stored therein can be serially shifted out of the register at the rate of the clock pulses applied to its clock pulse (CP) input terminal, whenever the enable input terminal (PE) is enabled. The clock pulse input terminal is connected to receive the SCLK signal generated by the timing circuits of FIG. 10. The enable (PE) input terminal of the register 21.60 is connected to receive the load signal generated by the circuitry of FIG. 12. When the LOAD signal goes "high" the information stored in the 64 bits of the shift register is serially transferred to the output terminals of the shift register and is clocked into the output circuitry for generating a Manchester Code format for transmission. The first eight bits ($I_0$–$I_7$) contain preamble information used by the Mobile receiver Unit 10 to identify a valid incoming transmission by an ERT unit 20. Bits $I_0$ through $I_6$ are connected to the positive voltage supply, while bit $I_7$ is connected to the common or referenced bus 28. The next 24 bits ($I_8$–$I_{31}$) contain a digital representation of the unique identifier code designation for a particular ERT 20 unit. These bits are set, in the preferred embodiment, by making or deleting physical switch connections on the printed circuit board circuitry of the ERT, generally referred to in FIG. 14 as the Switching Matrix 21.61, which forms the functional identity Encoder 23 of FIG. 4. Alternatively, actual switching networks or circuits or logic could be used to implement or program the identifier code bits. The first four, least significant bits ID0–ID3 are also used, as previously described in relation to the circuits of FIG. 12, to set a delay function for the delay counter 21.42. As hereinafter described in more detail, this delay function determines the unique interval of time between successive transmissions of information by an ERT unit 20. The next 20 bits of information, apply to input terminals $I_{32}$–$I_{51}$ contain the encoded accumulated meter information provided by the signal flow path 30.1 (see FIG. 8) from the counter 21.8. The final 12 bits of information stored in the shift register by means of input terminals ($I_{52}$–$I_{63}$) contain information provided by the signal flow path 30.2 (see FIG. 9) on the tamper status of the ERT 20. The information stored within the 64 bit shift register 21.60 is diagrammatically illustrated in FIG. 13 wherein the least significant bit of the register is located at the left hand side of the figure and the most significant bit being positioned to the right hand side of the figure.

Referring to FIG. 14, the QA output terminal of the shift register 21.60 is connected by means of an inverter 21.62 to an input terminal of a bilateral switch 21.63. The switch 21.63 has a control input terminal (c) connected to receive the SCLK input timing signal. The signal output of the bilateral switch 21.63 is connected to the (D) input terminal of a flip-flop 21.64.

The SCLK timing signal is also provided by means of an inverter 21.65 to a control input terminal (c) of a bilateral switch 21.66. The input terminal of the switch 21.66 is connected to receive the signal output from the QB output terminal of the shift register 21.60, and the signal output from the switch 21.66 is connected to the data (D) input terminal of the flip-flop 21.64. The clock pulse input terminal (CP) of the flip-flop 21.64 is connected to receive the 2 XSCLK signal generated by the timing circuits of FIG. 10. The set data (SD) input terminal of the flip-flop is connected to the reference bus 28, and the clock data (CD) terminal is connected to receive the LOAD signal generated by the transmission control circuits of FIG. 12. The Q signal output terminal of the flip-flop 21.64 is connected to the control input terminal (c) of a bilateral switch element 21.67. The switch 21.67 has a first signal terminal connected to the terminal 21h2 of the Digital Control Circuit network 21 and provides the NMANCH signal for the RF circuits. The switch 21.67 has a second signal terminal directly connected to the reference bus 28. While actual signal flow through the bilateral switch element 21.67 is from the terminal 21h2, through the switch 21.67 and to the reference terminal 28, the direction of signal flow is indicated as being to the RF circuits, since the NMANCH signal is actually an open drain signal used to enable the RF transmitter circuits for providing inverter Manchester encoded signals.

Operation of the ERT 20 is relatively simple and requires relatively little power drain from the power source. The unit identification information (i.e. bits $I_9$–$I_{32}$) of the shift register 21.60 is in the preferred embodiment a hard-wired function built into the circuit board containing the ERT, and requires no updating information or logic throughout the life of the ERT. The encoder circuits for entering commodity consumption information (i.e. the FIG. 8 circuits) maintain an accumulated count of total meter consumption readings, that are not destroyed upon transmission of information by the ERT. The debounce network 21A filters out encoder chatter and reacts to the encoder's positive contact transition to increment the count of the counter 21.8, which corresponds to the meter reading. The counter 21.8 is only reset by an external RESET signal upon installation of an ERT 20 or during a maintenance function thereof.

The Tamper detection circuit (FIG. 9) only provides a signal to the shift register bits indicating that the associated ERT 20 has been tampered with, when the tamper switch 25.1 is activated. In such event, the count of tamper counter 21.11 will be incremented as well as the associated tamper bits (I53–I63 of the shift register 21.60).

The RF receiver/transmitter network of FIG. 5, "listens" for a "wake-up" signal from the Mobile Unit 10 on a 0.1% duty cycle basis. A signal proportional to that received by the antenna 30 of the RF circuit 29A is reflected at the cathode of the detector diode 29.64 of FIG. 6. This signal, after detection by the diode 29.64 and subsequent filtering by the filter 29.D and amplification by the amplifier 29E is presented at the RECEIVE input terminal 21h4 of the Digital Control Circuit 21. The RECEIVE signal is sampled every 1.953 milliseconds at the trailing edge (i.e. positive transition) of the NSUPGEN signal appearing at terminal 21h3. The duration of the NSUPGEN signal is set by the resistor 24.6 and capacitor 24.5 connected to the GENR and GENC (21d4 and 21d3 terminals at approximately two microseconds. In other words, the RECEIVE signal is sampled approximately every two milliseconds for a two microsecond sampling period. When the RF circuits are operating in a "receive" mode, the RF transistor 29.3 (FIG. 5) is off. The base of the transistor is at a fixed bias as determined by the Base Bias signal. When sampled, the base-emitter junction of the transistor 29.3 is slowly forward biased until the transistor breaks into oscillation. The diode 29.64 (FIG. 6) detects the bias point of the transistor 29.3 just before it goes into oscillation. Since that bias joint is a function of the RF level received by the antenna 30, the actual RF energy signals being received by the antenna 30 are analyzed. The signal level of the RECEIVE line is normally at a logic low level when a transmission from the Mobile Unit 10 is not being received. When a transmission from the Mobile Unit 10 is being received, the amplified signal applied to the RECEIVE line rises to a logical high.

The circuit of FIG. 11 decides whether a received transmission is a proper "wake-up" transmission from the Mobile Unit 10. The circuit of FIG. 11 recognizes a received transmission as a proper "wake-up" signal if in a series of 64 samples of the RECEIVE signal, and after the RECEIVE signal made a low transition, no more than seven of such samples detected the RECEIVE signal in a high state. The sampling signals (i.e. NRSAMPLE and RSAMPLE) are provided by flip-flop 21.20 of FIG. 10. With the CD input terminals of flip-flop 21.20 grounded, the input signal from GENC triggers the signal at the $\overline{Q}$ output to a logical low and waits for the clock pulse signal from CK1 to turn it back on. During this time, the GENR and RSAMPLE signals are oscillating at a two microsecond rate. Referring to FIG. 11, the NRSAMPLE signal toggles the flip-flop 21.30 to provide a logical high signal at its Q output terminal. When gated with the NRSAMPLE signal in the NOR gate 21.31, a pulse is provided to the clock input of counter 21.36 whenever the NRSAMPLE signal drops, thereby incrementing the count of counter 21.36. Counter 21.36 keeps a count of time periods when the RECEIVE signal is not indicating receipt of a valid signal during a sample period. If the count and counter 21.36 attains a count of eight, the output connection to the counter 21.36 resets the latch 21.35, which in turn resets counters 21.36, 21.37 and 21.51 (FIG. 12). When the next high RECEIVE signal is detected, the output of flip-flop 21.30 will reset the latch 21.35, allowing the counters to increment again. Counter 21.37 increments each time the RSAMPLE oscillates. If the count of counter 21.37 reaches 64 without being reset by an eight count signal from counter 21.36, the circuit determines a valid "wake-up" signal has been received and provides a logical high output signal on the ACTIVE line when the signal level on the ACTIVE line attains a logical high, further sampling of the "RECEIVE signal is disabled by setting flip-flop 21.20 (FIG. 10) through its D input terminal, thereby "freezing" the status of the Q and $\overline{Q}$ output signals of flip-flop 21.20. Therefore, a valid "wake-up" transmission from the Mobile Unit 10 must have a duration of at least 128 msec to enable 64 valid samples to be accumulated by the Receive Validation circuits of FIG. 11.

Upon receipt of a valid "wake-up" activation signal, the ERT 10 assumes a "transmission" mode of operation. As stated above, a logical high signal on the ACTIVE line indicates that a transmission state is in progress. During a transmission state, both the RECEIVE sampling and NSUPGEN are disabled. Transmission of information from the ERT 10 begins 2.930 msec after the transmission state is entered (i.e. after the ACTIVE line goes high). A transmission burst lasts for 3.906 msec, after which time the transmitter is disabled by the NMANCH line (see FIGS. 14 and 6). There are a total of 8 separate transmission bursts (i.e. one transmission access) once the transmission state is entered. Spacing between successive transmissions follows the formula: $T = 62.5 + 1.953 (15 - x)$ msec, where T equal the transmission period from the beginning from one transmission burst to the beginning of the next transmission burst, and where "x" is a number between 0 and 15 equal to the binary representation of the four least significant bits of the identification code (i.e. ID0–ID3) of the transmitting ERT 20 unit. The transmission control timing circuits are illustrated in FIG. 12. Referring thereto, when the ACTIVE line goes "high" it turns off the reset (MR) input of counter 21.40, allowing counter 21.40 to increment and to provide output pulses at its Q1 output terminal every $(2 \times 1.9531$ msec) and at its Q5 output terminal every $(32 \times 1.9531$ msec). When the Q5 output terminal of counter 21.40 sends out its first output signal to the $(\overline{LD})$ input terminal of the Delay Counter 21.42, counter 21.42 initiates its delay timing. The counter delays for a time period of $(X \times 1.9531$ msec), where X is equal to the lower four bit count of the identification code being applied to the Delay input terminals A–D of the counter 21.42, and then provides an outout signal at its CA output terminal. The signal output from the CA output terminal of the counter 21.42, when combined with the signal from the Q5 output terminal of the counter 21.40 tuns off NAND gate 21.44, thereby providing a "set" input to the SD input terminal of flip-flop 21.47. The set signal applied to the SD input terminal of flip-flop 21.47 corresponds to the spacing between LOAD signals which identically corresponds with the spacing between transmit pulse bursts. Each time that the flip-flop 21.47 is "set", its $\overline{Q}$ signal output causes the counter 21.51 to increment at a rate of $(2 \times 1.9531$ msec). Therefore, when the counter 21.51 has incremented eight times, corresponding to 8 transmission bursts, the transmission access is complete causing the TRCOM signal to go "high" indicating that a transmission cycle has been completed. During RECEIVE sampling, NMANCH and internal clock distribution are disabled. In the preferred embodiment circuit of ERT 20 described above, immediately following a transmission access of 8 transmission bursts, there is a dead or recovery time of the ERT 20 during which the ERT will not operate in the "Receive" mode. This time is determined by a combination of: the transmitter voltage overshoot of the emitter of the oscillator transistor 29.3 (FIG. 5); the gain of the amplifier stages following the oscillator; and the low frequency roll-off values of the oscillator following amplifiers. For the circuitry described above, the "inactive" time is approximately 4 seconds.

Transmission of information from the ERT 20 during any particular transmission burst comprises transmission of 64 bits of Manchester encoded data. According to the Manchester data encoding method employed in the preferred embodiment, a positive transition (i.e. 0 modulation to full modulation) at the center of a bit cell implies a "∅", and a negative transition (full modulation to zero modulation) at the center of a bit cell implies a "1". The bit rate is 1.6384 bits per second, or approximately a bit time of 61.0 microseconds. The data transmitted follows the format as illustrated in FIG. 13 with transmission time progressing from left to right as illustrated in the figure. Timing is arranged in the circuitry in a manner such that the meter reading (i.e. the count of counter 21.28) will always remain at a valid accumulated value. It is possible for the meter encoding counter 21.8 to increment between transmission in accordance with the normal operation of the data encoder 22 circuitry.

The actual transmission of data from the shift register 21.60 and by the RF circuits of FIG. 5 and FIG. 6 is accomplished by changing the mode of operation of the shift register 21.60 from a parallel mode to a serial mode when the LOAD signal goes to a logical "high" level. Data is serially shifted from the shift register 21.60 through the NMANCH signal which modulates the transmitter transistor 29.3 according to the SCLK timing signal.

Not only is the time interval between successive transmission bursts different for each ERT 20 unit, as determined by the least significant bits of its respective identifier code number, but the frequency of transmission during one transmission access period shifts as well. This feature of the invention is provided by the ramp signal generating circuit generally illustrated at 29c in FIG. 6. The RF circuits of each ERT unit 20 are initially tuned to a center frequency of approximately 915 MHz. It should be noted that the ERT unit 20 "receives" at a frequency of 955 MHz but transmits at a frequency of 915-919 MHz. This difference is achieved by switching on a bias current into the RF circuit (FIG. 5) by means of FREQ SHIFT line, during transmit. When the ACTIVE signal changes to a logical "high" level, indicating that a transmission state is in progress, the input signal provided to the amplifier 29.40 (FIG. 6) causes the amplifier output signal applied through the TUNING voltage signal path to RF transistor 29.3 to change according to a slope as determined by the RC time constants associated with the amplifier 29.40. This change in turning voltage applied to the RF transistor 29.3 causes a shift in tuning frequency of the RF transistor over the time period of the transmission access period. The frequency shift values are set such that the tuning frequency change is limited so as to keep the tuning frequency of the RF circuits within a 915-919 MHz range. However, as will become apparent upon a more detailed description of the receiver circuits within the Mobile Unit 10, the combination of changing frequency of transmission and varied time intervals between successive transmission bursts in any one transmission cycle, provide a high probability that no two ERT units 20 which are simultaneously transmitting to Mobile Unit 10 in reply to the same "wake-up" signal, will be transmitting exactly at the same time or at the same frequency—thereby allowing the receiver networks within the Mobile Unit 10 to more clearly distinguish between simultaneous transmissions from a large plurality of ERT units. This will be true, even though all of the ERT units 20 are simultaneously transmitting within the relatively narrow 915-919 MHz transmission band.

Figure 20:
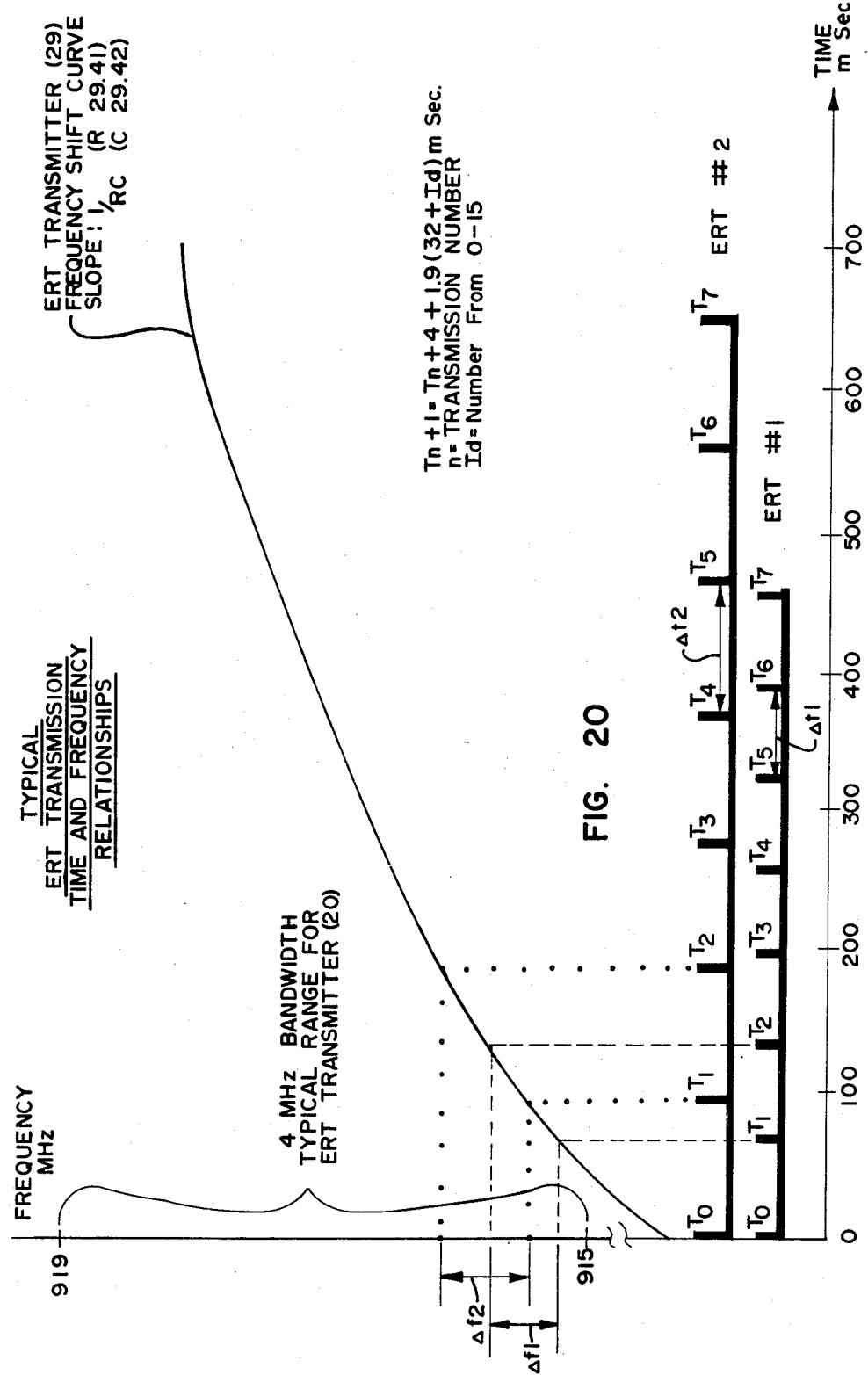
FIG. 20 is a graphic illustration of the timing and frequency shifts during transmission of data by a typical Encoder/Receiver/Transmitter unit.

A graphic illustration of "time" and "frequency" relationships for the transmission by two typical ERT 20 units, is illustrated in FIG. 20. It is emphasized that the information depicted if FIG. 20 is "typical" only and is not to be construed in a limiting sense. The timing equation listed divides the time at which any particular transmission by an ERT unit occurs within a transmission access period of eight such transmission bursts. The numbers in the equation have been rounded off for simplicity, and the resultant number provides the time (as measured from the initial transmission) at which the particular ERT transmission burst will begin. The spacing differences between the transmission times for "ERT #1" and "ERT #2" have been exaggerated in FIG. 20 to illustrate the point being made. Referring thereto, it will be noted that the time interval (i.e. Delta t1) between successive transmissions for "ERT #1" is relatively shorter than the time interval between successive transmission (i.e. Delta t2) for "ERT #2". Since the Delta t1 and Delta t2 time intervals are determined by the particular identification code of the respective ERT units, as represented by the four least significant bits of their respective identifier numbers, as illustrated in FIG. 20, the lower four identifier bits of ERT #2 are significantly larger than the lower four identifier bits of ERT #1. As a result, even though the likelihood that in this example both ERT #1 and ERT #2 begin their respective transmission bursts at exactly the same, due to their different identifier code numbers, their successive transmissions (i.e. T1, T2, etc.) during a transmission burst (T0-T7) will most probably occur at different times, thereby enhancing identifiable reception thereof by the Receiver units in the Mobile unit 10. Therefore, the timing relationship between successive transmission bursts provides a first means for randomly staggering transmission from simultaneously activated ERT 20 units to enhance reception and detection thereof by the mobile receiver networks.

The second means for providing unique detectable identification to transmissions from the ERT 20 units, so as to enable differentiation of those transmissions by one ERT unit from those of another, is provided by the frequency shift previously discussed. Referring to FIG. 20, the frequency relationship for those typical ERT #1 and ERT #2 units depicted, is graphically portrayed. A 4 MHz frequency range is illustrated on the vertical axis, which represents a typical frequency range for the AM Receiver network 32 in the Mobile Unit 10. Conversely, the ERT units are designed and tuned such that their transmissions will all occur within a 4 MHz bandwidth. The Frequency Shift Curve illustrated in FIG. 20 is presented for illustration purposes only, and diagrammatically represents the (1/RC) timing curve provided by resistor 29.41 and capacitor 29.42 of the Timing Circuit network 29C (FIG. 6). As previously discussed, when the ACTIVE signal energizes the amplifier 29.40, the RC network associated therewith begins charging and establishes the Frequency Shift Curve of FIG. 20, which thereafter establishes the frequency of transmission of subsequent transmissions (i.e. T1, T2, ..., T7) of an ERT unit. It will be noted that the change of transmission frequency (i.e. Delta f1 and Delta f2) between successive transmissions T1 and T2 is not a linear function, but is a function of the slope of the Frequency Shift Curve. Furthermore, the change in frequency between successive transmissions of one ERT will be different from those of another ERT due to the fact that the time interval between successive transmissions of the two ERT units is different as described with respect to the timing relationship. This is illustrated in FIG. 20 by the difference between "Delta f1" and "Delta f2" which represent respectively the frequency shifts for ERT #1 and ERT #2 for their respective T1 and T2 transmissions. Therefore, besides the random timing relationship between successive transmissions, the random frequency shifts between successive transmissions provides a high probability that no two ERT units will always be transmitting at identical times and frequencies. Further, due to minor tuning variances that will automatically occur between factory tuning of any two ERT units, it is unlikely that any two ERT units will be initially tuned to exactly the same frequency. It will be understood that while a fairly straight-line frequency change function has been used in the preferred embodiment (as illustrated in FIG. 20) that the invention does not limit the frequency change function to that illustrated, but that any frequency change timefunction can be used.

Mobile Collection Unit

Figure 15:
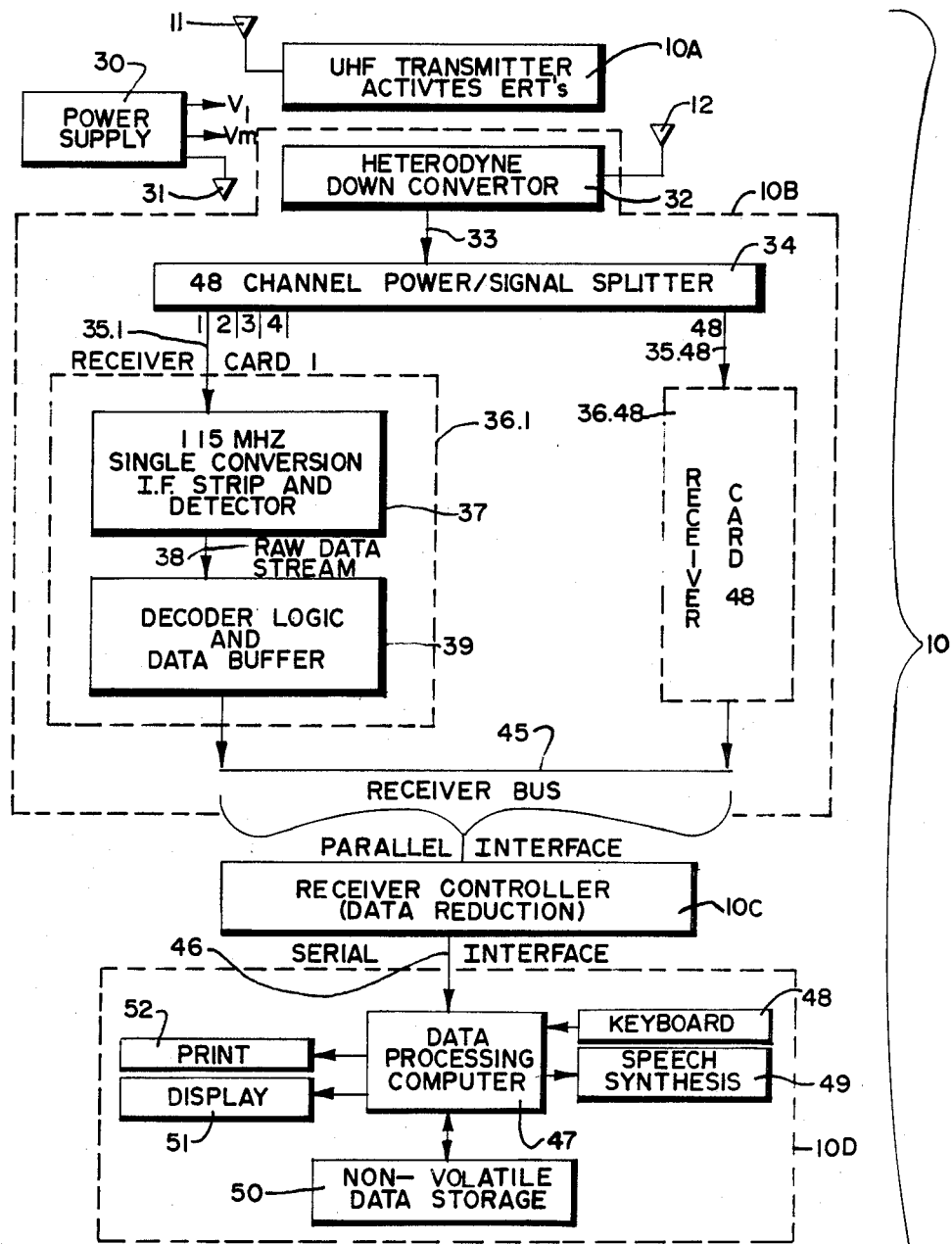
FIG. 15 is a block diagram presentation of typical circuits comprising the Mobile Data Collection unit for that application of the invention disclosed in FIG. 1.

A more detailed description of the Mobile Data Collection unit 10 portion of the systm disclosed in FIG. 1 is illustrated in FIG. 15. Referring thereto, a Power Supply 30 is generally illustrated for supplying required power to the various electrical circuits within the Mobile Unit 10. The power supply is indicated as generally having a plurality of available voltage output terminals designated as "$V_1$-$V_n$", and further has a ground or reference terminal 31. While not specifically illustrated in the following discussion, as was the case with the description of the ERT units 20, it will be understood that appropriate power supply and reference connections are made to the circuits hereinafter described so as to render such circuits operable.

The Transmitter Activator 10A with its output antenna 11 is depicted in FIG. 15 as a UHF Transmitter. In the preferred embodiment, the Transmitter 10A transmits the "wake-up" signal to the remotely located ERT units 20 for initiating transmission by the remotely located ERT units 20. When activated (by control means not illustrated), the Transmitter 10A transmits an unmodulated RF signal of 955 MHz. The transmitter 10A may be of any configuration well-known in the art suitable for generating the described RF wake-up signal. In the preferred embodiment, the transmitter is controlled by a simple switching circuit (not shown) or could be hand controlled, to transmit a wake-up signal of 200 msec duration, once every second. As previously mentioned, the power of such wake-up signal can be varied to accomodate the use application.

The Receiver 10B portion of the Mobile Unit is illustrated in more detail in FIG. 15, as containing a heterodyne down-convertor network 32 which initially picks up the transmissions from the remotely located ERT unit 20 by means of its antenna 12. The convertor 32 does not distinguish between transmissions from a plurality of simultaneously transmitting ERT units 20, but passes all of the received signal on, by means of a signal flow path 33, to a Power/Signal Splitter unit 34 having a single input and, in the preferred embodiment, 48 output terminals. The RF signal appearing at each of the 48 output terminals of the Power Splitter 34 is identical to that received from the converter 32 by means of the signal flow path 33. The RF signals from the 48 output terminals of the Power/Signal Splitter 34 is applied by means of signal flow paths 35 (i.e. 35.1-35.48) to circuitry contained on 48 different Receiver Circuit Cards, designated in FIG. 15 as 36.1-36.48. Each of the Receiver Cards 36 contains a separate narrow bandwidth Intermediate Frequency (IF) Receiver. Each such IF receiver operates independently of the remaining 47 Receivers and is tuned for a different frequency. The frequencies and bandwidths of the 48 Receivers are selected such that each receiver accepts only a small segment of the desired frequency band, as described in more detail hereinafter. However, the frequency segments overlap so that the entire band of frequencies applied to the Power/Signal Splitter 34 from the convertor 32 is covered. Any frequency received within such band will be received by at least one of the Receivers on the 48 Receiver Cards 36. Since the 48 receiver circuits operate independently, signals arriving simultaneously to the convertor 32 will be received, without interference, by the 48 receiver circuits. If one of the 48 receivers should malfunction, only a very narrow range of frequencies would not be received. If the transmitted frequency is swept, a malfunctioning receiver would only minimally degrade the performance of the entire system. As illustrated in FIG. 15, each of the 48 Receiver Card 36 circuits includes a 115 MHz Single Conversion IF Strip and Detector network 37 which receives the RF signals directly from the signal flow path 35, and applies a raw data stream by means of a signal flow path 38 to a Decoder Logic and Data Buffer network 39.

While the preferred embodiment illustrates a system using only 48 such Receiver Cards 36, it will be understood that any number of such independent Receiver Card units could be employed within the scope of this invention. The signal output from the Decoder Logic and Data Buffer functional blocks 38 is applied to a Receiver Bus 45 for subsequent analysis and storage by a data processing computer as hereinafter described. In the preferred embodiment, the Receiver Bus 45 can accomodate up to 128 individual Receiver Units; however, it will be understood that any number of such receiver units could be used. The Receiver Bus 45 has 15 parallel lines which interconnect all of the receiver circuits on the Receiver Cards 36 with the Receiver Controller 10C. In the preferred embodiment, two of the Receiver Bus 45 lines provide power and common ground, eight are bi-directional data lines, four are handshaking and control lines and one supplies timing pulses for synchronizing to the received data.

To assist in understanding later descriptions of the receiver circuits, a general overview of the receiver operation may be helpful at this point. The circuitry of each Receiver Card 36 includes logic for interpreting and buffering two complete messages from the ERT transmitter units 20, including error detection. The Receiver Card circuitry 36 accepts 56 bits of Manchester encoded data. Since the ERT 20 transmitter data rate is fixed, synchronous receiving and error detection methods may be used. To begin detection of a message, three or more "1"'s" must be received for synchronization, followed by a "0" to indicate a start of the message. Exactly 56 bits of data follow. When a message is complete, the Receiver Card circuitry 36 waits to be polled by the Receiver Controller 10C network. Meanwhile, another message may be received by the Receiver Card Network 36.

The data thus collected by the Receiver Card 36 circuitry is transferred to the Receiver Controller 10C by means of the Receiver Bus 45, along with a status byte containing information about the receiver's 36 performance. If the circuitry of a Receiver Card 36 should malfunction, all of its RF circuitry may be disabled or turned off by the Controller 10C to prevent interfernce with the other operational Receiver Card Networks 36.

The Receiver Controller 10C buffers the information received from the Receiver Card circuits 36 and serves as the interface between the Receiver Bus 45 and the Data Processing circuits 10D. In general, the Receiver Controller 10C functions to transfer data from the Receiver Bus to the Data Processing network 10D so as to pass the oldest data on to the Processor first. The Controller 10C also can perform a chronological sort and eliminates duplicate messages. The controller 10C of the preferred embodiment, can also poll the Receiver Card 36 networks and can respond to status inquiries from the Data Processing circuits 10D. The Receiver Controller network 10C provides signals by means of the signal flow path 46 to a Data Processing Computer 47. The signal flow path 46 is a serial interface connection. The Data Processing network 10D typically may also include processing and peripheral networks such as a Keyboard 48, a Speech Synthesis unit 49, Non-Volatile Data Storage 50, output display units 51 and possibly print units 52, as well as other such equipment of which those skilled in the art are well aware.

Figure 16:
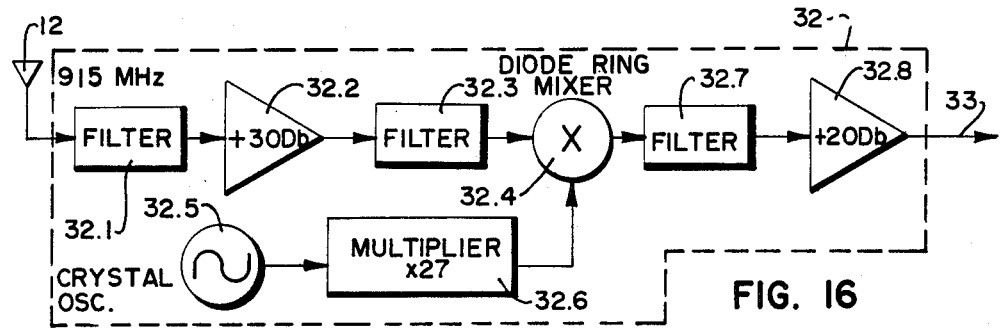
FIG. 16 is a block diagram representation of the RF Receiver portion of the network illustrated in FIG. 15.

The down-convertor 32 is a superheterodyne convertor having a low noise front end amplifier, tuned to 915 MHz. A functional block diagram of the convertor 32 is illustrated in FIG. 16. Referring thereto, the signal from antenna 12 is applied to an input filter 32.1 and then into a Linear Amplifier 32.2 tuned at 915 MHz with a 6 MHz bandwidth (912 MHz–918 MHz), and has a 30 db gain. The signal from amplifier 32.2 is applied through a filter 32.3 to a Diode Ring mixer 32.4. The second input signal to the Mixer 32.4 is provided by a Crystal Oscillator 32.5 oscillating at approximately 39.148 MHz, which signal is applied through a 27× Multiplier 32.6 to provide a 1030 MHz, on to the Mixer 32.4. The output from the Mixer 32.4 is filtered by a filter 32.7 to provide a down-converted first IF output of 115 MHz with a bandwidth of 6 MHz (112 MHz–118 MHz), and is amplified by a Linear Amplifier 32.8 to provide the signal output for signal flow path 33 to the Power/Signal Splitter 34.

Figure 17:
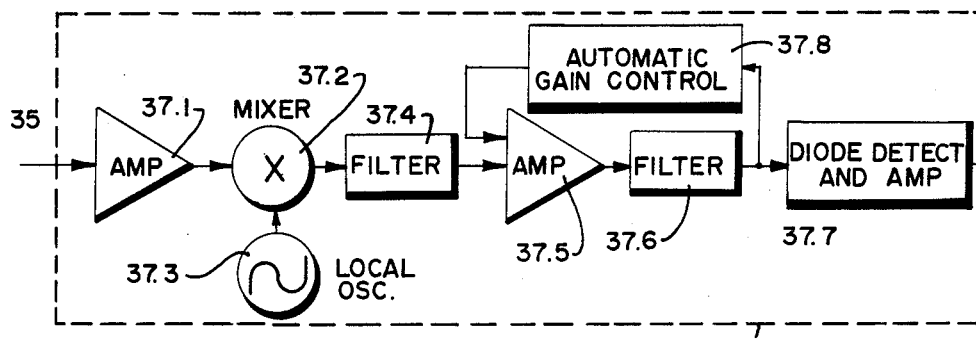
FIG. 17 is a block diagram representation of the 115 MHz Single Conversion I.F. Strip and Detector functional block of the network illustrated in FIG. 15.

A functional block diagram representation of the 115 MHz Single Conversion IF Strip and Detector network 37, that provided a second IF signal is illustrated in more detail in FIG. 17. Referring thereto, the signal output from the Power/Signal Splitter 34 (i.e. from signal flow path 35) is applied to the input of the network 37, which basically comprises a superheterodyne receiver circuit as illustrated in FIG. 17. Each of the networks such as illustrated in FIG. 17, is, as described above, tuned for a narrow bandwidth (200 kHz in the preferred embodiment) and preferably so as to overlap for approximately 50% of its bandwidth with the bandwidth of the Conversion and Detector network 37 of the adjacent Receiver Card 36. This is diagrammatically illustrated in FIG. 19. The signal from signal flow path 35 is amplified by an amplifier 37.1 and applied to a Mixer 37.2 where it is mixed with the output frequency of a Local Oscillator 37.3 to provide the desired center frequency. The output of Mixer 37.2 passes through a filter 37.4 which sets the bandwidth for its associated Receiver Card 36, and is then applied to the input of an amplifier 37.5. The signal output from amplifier 37.5 is filtered by a filter 37.6 and is applied to the input terminal of a Diode Detect and Amplifier network 37.7. The output signal from filter 37.6 is also monitored by an Automatic Gain Control network 37.8 which provides feedback input signals back to the Amplifier 37.5. The Diode Detector and Amplifier network 37.7 conditions the received signal such that the signal output appearing at the signal flow path 38 either contains no signal at all, indicating the receipt of "noise" by the network 37, or a "raw data" stream which is in the Manchester encoded format.

Figure 18:
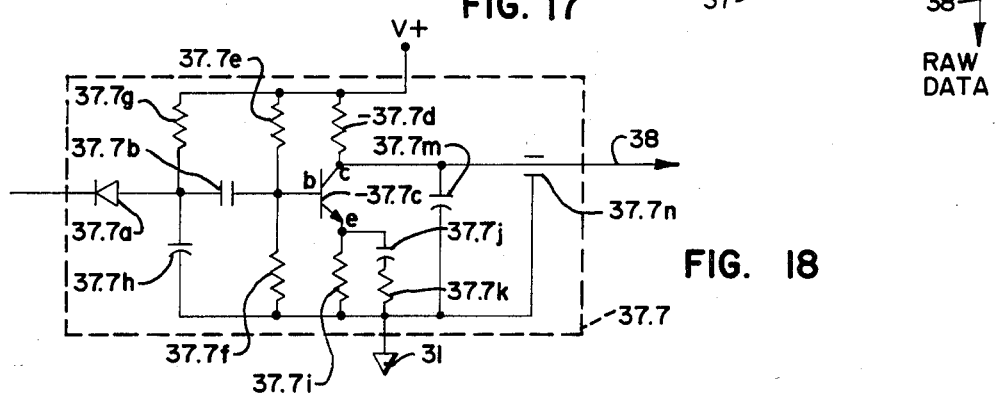
FIG. 18 is a schematic representation of the Diode detector and Amplifier portion of the network illustrated in FIG. 17.

A schematic diagram of the Diode Detector and Amplifier network 37.7 as configured in the preferred embodiment is illustrated in FIG. 18. Referring thereto, the output signal from Filter 37.6 is applied to the cathode of a detector diode 37.7a. The anode of diode 37.7a is connected by means of a capacitor 37.7b to the base (b) of an npn transistor 37.7c. The collector of the transistor is connected by means of a resistor 37.7d to the supply voltage V+. The base (b) of transistor 37.7c is also connected by means of a resistor 37.7e to the supply V+, and is connected by means of a resistor 37.7f to the reference bus 31. A resistor 37.7g is connected between the supply V+ and the anode of diode 37.7a, and a capacitor 37.7h is connected between the diode anode and the reference bus 31. The emitter (e) of transistor 37.7c is connected by means of a resistor 37.7i and connected in parallel with a capacitor 37.7j connected in series with a resistor 37.7k to the reference bus 31. A capacitor 37.7m is connected between the transistor collector and the reference terminal. The signal output is taken from the transistor collector and passes through a feed-through capacitor 37.7n to the signal flow path 38.

Figure 21:
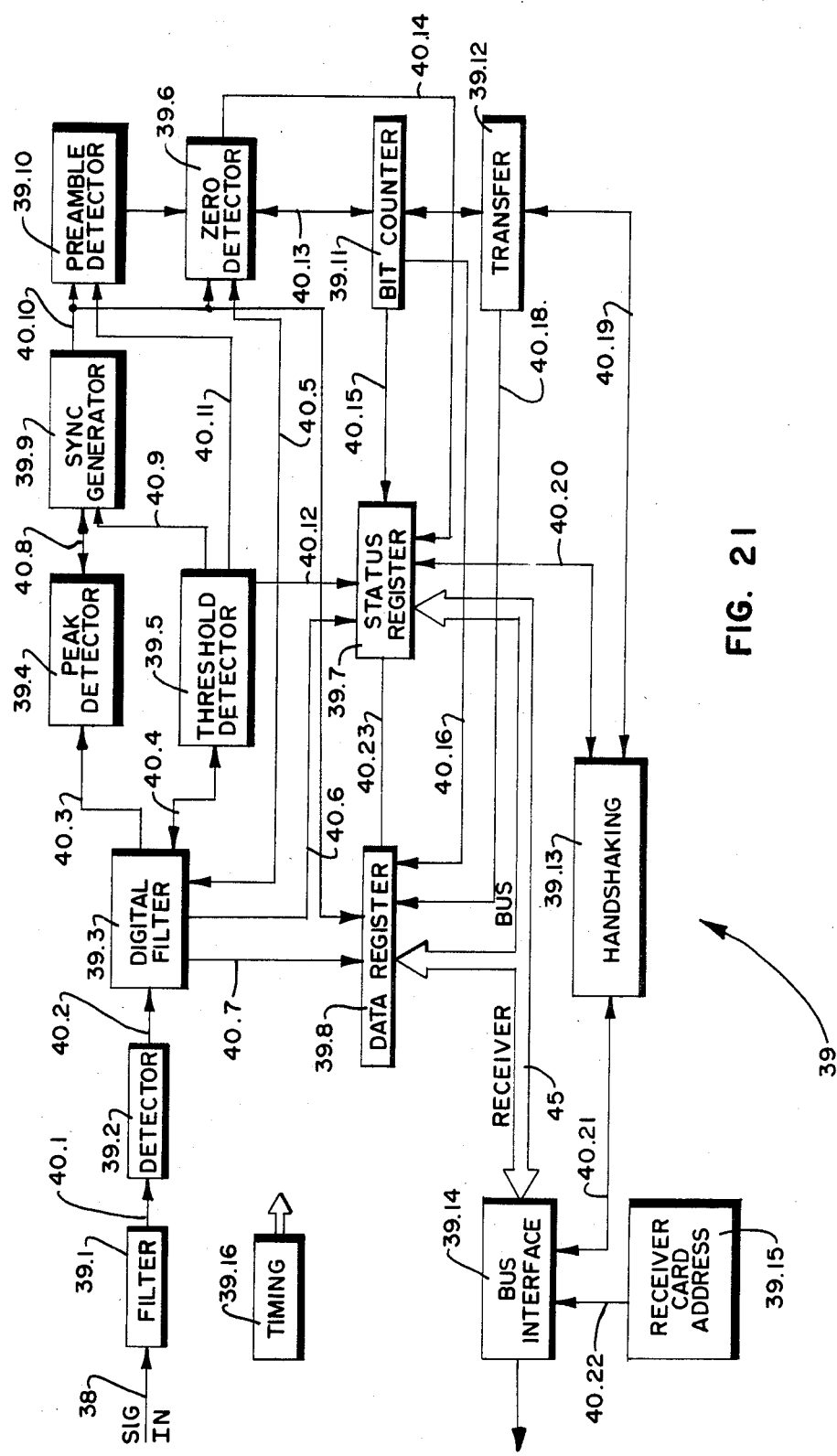
FIG. 21 is a functional block diagram representation of the circuit networks comprising the Decoder Logic and Data Buffer network 39 of FIG. 15, as applied to a preferred embodiment of the invention.

Referring to FIG. 21, the general functional blocks comprising the Decoder Logic and Data Buffer network 39 (of FIG. 15) are illustrated as applied to a preferred embodiment configuration of the invention, and as they communicate with one another. The signal input in the form of a raw data stream is applied by means of the signal flow path 38 (from the Single Conversion IF Strip and Detector network 37) to input of a high-pass filter 39.1. The output of filter 39.1 is applied by means of a signal flow path 40.1 to a zero crossing detector network 39.2. The detected signal passes from the Detector 39.2 by means of a signal flow path 40.2 to a Digital Filter network 39.3, where the decoding process is initiated. The Digital Filter network 39.3 communicates with circuits of a Peak Detector network 39.4 by means of a signal flow path 40.3, with circuits of a Threshold Detector network 39.5 by means of a signal flow path 40.4, with circuits of a Zero Detector network 39.6 by means of a signal flow path 40.5, with circuits of a Status register 39.7 by means of a signal flow path 40.6 and with a Data Register 39.8 by means of a signal flow path 40.7. The Peak Detector network 39.4 communicates with a Sync Generator network 39.9 by means of a signal flow path 40.8. The Sync Generator network 39.9 communicates with the Threshold Detector network 39.5 by means of signal flow path 40.9 and with circuits of a Preamble Detector network 39.10, with a Data Register 39.8 and with the Zero Detector network 39.6, by means of a signal flow path 40.10. The Threshold Detector network 39.5 communicates with the Preamble Detector 39.10 circuits by means of a signal flow path 40.11, and also communicates with the Status Register 39.7 by means of a signal flow path 40.12. The Zero Detector network 39.6 communicates with a Bit Counter network 39.11 by means of a signal flow 40.13, and with the Status Register 39.7 by means of a signal flow path 40.14. The Bit Counter network 39.11 communicates with the Status Register 39.7 by means of a signal flow path 40.15, and further communicates with the Data Register 39.8 by means of a signal flow path 40.16. The Bit Counter 39.11 also communicates with a Transfer network 39.12 by means of a signal flow path 40.17. The Transfer network communicates with the Data Register 39.8 by means of a signal flow path 40.18 and with a Handshaking network 39.13 by means of a signal flow path 40.19. The Status register 39.7 also communicates with the Handshaking network 39.13 by means of signal flow path 40.20. The Receiver Bus network 45 is operatively connected with the Data Register 39.8, the Status Register 39.7 and with a Bus Interface network 39.14. The Handshaking network 39.13 communicates with the Bus Interface network 39.14 by means of a signal flow path 40.21. A Receiver Card Address network 39.15 communicates with the Bus Interface network 39.14 by means of a signal flow path 40.22. The output of the Bus Interface network 39.14 is directly applied to the input ports of the Receiver Controller network 10C (FIG. 15). While not specifically identified in the functional representation of FIG. 21, timing circuits, generally designated by the Timing functional block 39.16 are present and operatively connected with the circuits comprising the various functional blocks illustrated (as hereinafter described in more detail) for providing timing control functions to the circuits.

Figure 22:
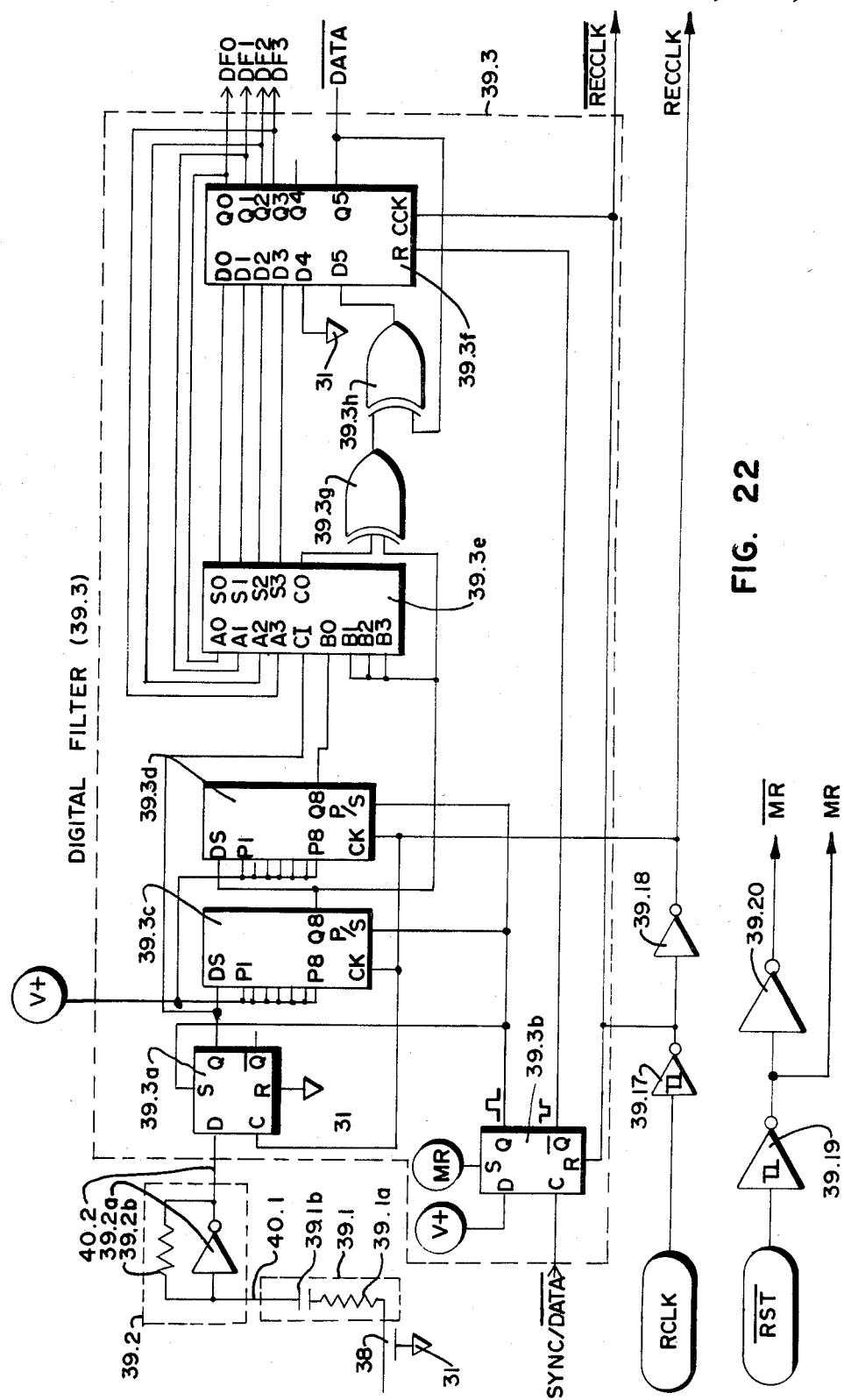
FIG. 22 is a schematic representation of the Filter, Detector and Digital Filter portions of the Decoder Logic network of FIG. 21.

The Filter Detector, and Digital Filter networks 39.1, 39.2 and 39.3 are illustrted in more detail in the schematic representation of FIG. 22. Referring thereto, the input signal applied by signal flow path 38 to the high-pass filter 39.1 passes through a resistor 39.1a and a capacitor 39.1b to the input of the Zero Crossing Detector network 39.2. The detector 39.2 has an inverter 39.2a with a resistor 39.2b connected across its input and output terminals. The signal output from the detector 39.2 is supplied by means of the signal flow path 40.2 to the data (D) input terminal of a D-type flip-flop 39.3a of the Digital Filter network 39.3. It will be understood throughout this description that appropriate power and reference connections are made to all of the electrical circuits herein described in order to effect proper operation thereof. Further, the circuits illustrated herein are CMOS circuits; however, it will be understood that other circuit implementation means can be provided and that the circuits and functional blocks represented herein are merely exemplary of a means for implementing a particular preferred embodiment of the invention. Other approaches to the circuit implementation and functions employed to decode and buffer and handle the data received by the Receiver Networks can readily be devised by those skilled in the art, and are within the scope of this invention. The reset (R) input terminal of the flip-flop 39.3a is connected to the reference 31.

An RCLK timing signal, hereinafter described, derived from a crystal oscillator, passes through a Schmitt trigger 39.17 to provide the timing signal identified as $\overline{\text{RECCLK}}$, which signal is also inverted by means of an inverter 39.18 to provide the timing signal RECCLK. In the preferred embodiment RCLK signal is a 262.144 mHz timing pulse signal used in synchronizing the receivers to the received data. A reset signal received from the Receiver Controller network 10C and identified as $\overline{\text{RST}}$, passes through a Schmitt trigger 39.19 to form the reset signal MR. The MR signal also passes through an inverter 39.20 to form the inverted reset signal $\overline{\text{MR}}$. The Receiver Controller 10C forces the $\overline{\text{RST}}$ line "low" so as to place all of the Receiver Card 36 circuits in a known initial state. The reset signals MR and $\overline{\text{MR}}$ will be used throughout the circuitry for resetting various networks. As with power supply connections (when illustrated), these designations are placed within a circle to indicate their origination from the FIG. 22 circuitry, without requiring specific illustration of interconnecting lines on the schematic diagrams.

The Digital Filter 39.3 has a second flip-flop 39.3b, also of the D-type. The data (D) input of flip-flop 39.3b is connected to the supply voltage (V+) and the set (S) input terminal is connected to receive the MR reset signal. The clock (C) input terminal of flip-flop 39.3b is connected to receive a signal identified as SYNC-/$\overline{\text{DATA}}$ which is generated elsewhere within the Decoder Logic 39 network. The reset (R) input terminal of flip-flop 39.3b is connected to receive the $\overline{\text{RECCLK}}$ signal. The Q output terminal of flip-flop 39.3b provides an input signal to the set (S) input terminal of flip-flop 39.3a. The clock (C) input terminal of flip-flop 39.3a is connected to receive the RECCLK timing signal.

The signal output from the Q terminal of flip-flop 39.3a is connected to a DS input terminal (serial data in) of a eight-stage static shift register 39.3c. The P1–P8 input terminals of the shift register 39.3c are connected to the supply voltage (V+) and its Q8 output terminal is connected to the DS input terminal of a second shift register 39.3d, of like configuration. The P1–P8 input terminals of shift register 39.3d are also connected to the supply (V+). The clock (CK) input terminals of shift registers 39.3c and 39.3d are connected to receive the RECCLK timing signal, and the parallel/serial control (P/S) input terminals of the shift registers are connected to receive the output signal from the Q output terminal of flip-flop 39.3b. The Q8 output terminal of shift register 39.3d is connected to the B0 input terminal of a 4 bit full Adder network 39.3e.

The Adder network 39.3e has four input terminals designated as A0–A3, four input terminals designated as B0–B3 and four output terminals designated S0–S3. The Adder also has carry-in (CI) and carry-out (CO) terminals and functions to add the respective signals appearing at its two sets of input terminals. The B1–B3 input terminals are connected to receive the output signal from the Q8 output terminal of shift register 39.3c. The CI input terminal is connected to receive the signal from the Q output terminal of the 39.3a flip-flop. The S0–S3 output terminals of the adder 39.3e are directly respectively connected to input terminals D0–D3 of a Hex D flip-flop 39.3f. The Q0–Q3 output terminals of flip-flop 39.3f are directly connected to the A0–A3 input terminals respectively of the Adder 39.3e. The D4 input terminal of flip-flop 39.3f is connected to the reference potential.

The carry-out (CO) output terminal of adder 39.3e is connected to a first input terminal of an XOR gate 39.3g. The second input terminal of the XOR gate 39.3g is connected to receive the signal output from the Q8 output terminal of shift register 39.3c. The signal output from the XOR gate 39.3g is connected to a first input terminal of an XOR gate 39.3h. The second input terminal of the XOR gate 39.3h is connected to receive the signal appearing at the Q5 output terminal of the flip-flop 39.3f which is also designated as $\overline{DATA}$. The signal output from XOR gate 39.3h is directly applied to the D5 input terminal of register 39.3f. The reset (R) input terminal of flip-flop 39.3f is connected to receive the signal appearing at the $\overline{Q}$ output terminal of flip-flop 39.3b, and the clock (CLK) input terminal shift register 39.3f is connected to receive the $\overline{RECCLK}$ signal. The signal designations for the signals applied to the Q0–Q3 output terminals of register 39.3f are respectively designated as DF0–DF3.

Figure 23:
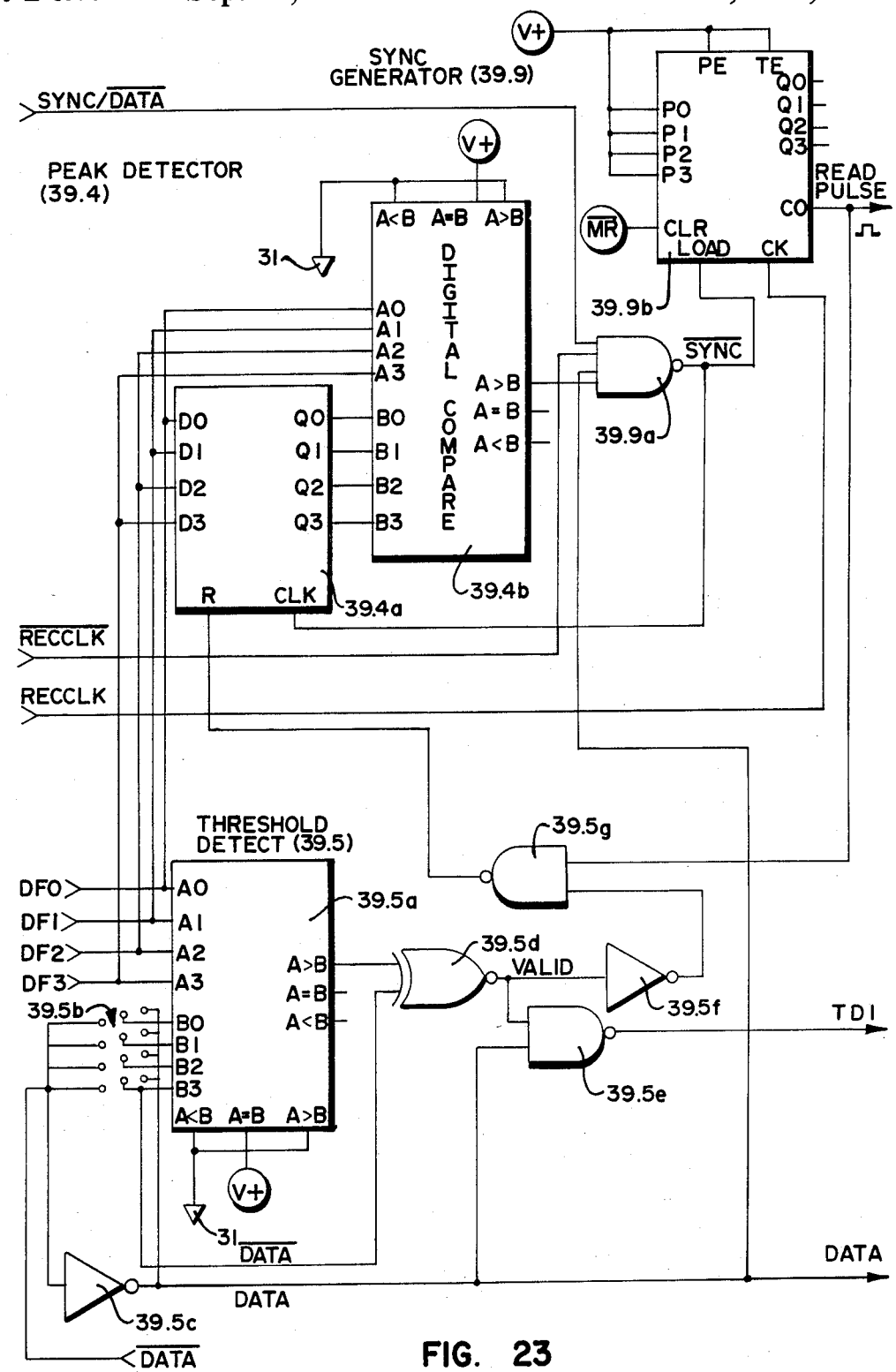
FIG. 23 is a schematic representation of the Peak Detector, Sync Generator and Threshold Detector circuit portions of the Decoder Logic network of FIG. 21.

The DF0–DF3 signal outputs from register 39.3f are applied by means of the signal flow path 40.4 (FIG. 21) to the input terminals A0–A3 respectively of a 4 bit magnitude comparator network 39.5a of the Threshold Detector network 39.5 (FIG. 23). The comparator network 39.5a further has a second set of input terminals B0–B3 connected to receive the $\overline{DATA}$ input signal as modified by a set threshold value determined by the switch/jumper arrangement illustrted at 39.5b. The $\overline{DATA}$ signal is inverted by an inverter 39.5c to provide bias for one set of terminals of the switching network 39.5b, as illustrated in FIG. 23. The A=B enable terminal of comparator 39.5a is connected to the supply (V+), and the less than and greater than enable terminals are connected to the reference bus 31. The A (greater than) B output terminal of comparator 39.5a is connected to a first input terminal of an XOR gate 39.5d. The second inputer terminal of the XOR gate 39.5d is connected to receive the $\overline{DATA}$ signal. The signal output from XOR gate 39.5d is designated as VALID, and is applied to a first input terminal of a NAND gate 39.5e and through an inverter 39.5f to a first input terminal of a NAND gate 39.5g. The second input terminal of NAND gate 39.5e is connected to receive the DATA signal. The signal output from NAND gate 39.5e is used elsewhere in the Decoder Logic 39 circuitry and is designated as TD1. The signal output from NAND gate 39.5g is connected to the reset (R) input terminal of a Quad D-type flip-flop 39.4a within the Peak Detector 39.4 network.

The DF0–DF3 signals are directly respectively applied to the D0–D3 input terminals of the flip-flop 39.4a and also are respectively applied to the A0–A3 input terminals of a four bit magnitude comparator 39.4b. The Q0–Q3 output terminals of flip-flop 39.4a are respectively directly connected to the B0–B3 input terminals of the comparator 39.4b. The A=B enable input of comparator 39.4b is connected to the supply (V+) and the less than and greater than bias inputs are connected to the reference bus 31. The A (greater than) B signal output terminal of comparator 39.4b is connected to a first input terminal of a four input NAND gate 39.9a of the Sync Generator network 39.9.

The SYNC/$\overline{DATA}$ input signal is applied to a second input terminal of NAND gate 39.9a and the $\overline{RECCLK}$ signal is applied to a third input terminal of the NAND gate 39.9a. The DATA signal from the output of inverter 39.5c is applied to the fourth input terminal of NAND gate 39.9a. The signal appearing at the output of NAND gate 39.9a is designated $\overline{SYNC}$, and is directly applied to the clock (CLK) input terminal of flip-flop 39.4a as well as to the LOAD input terminal of a four bit synchronous binary counter 39.9b. The RECCLK signal is applied to the clock (CK) input terminal of the counter 39.9b. The P0–P3 input terminals as well as the counting enable P and T (PE and TE) input terminals of the counter 39.9b are directly connected to the supply (V+). The Carry-out (CO) signal output of counter 39.9b provides a READ PULSE output signal which is directly applied to the second input terminal of NAND gate 39.9g. Counter 39.96 also has an asynchronous clear (CLR) input terminal that is connected to receive the master reset ($\overline{MR}$) signal.

Figure 24:
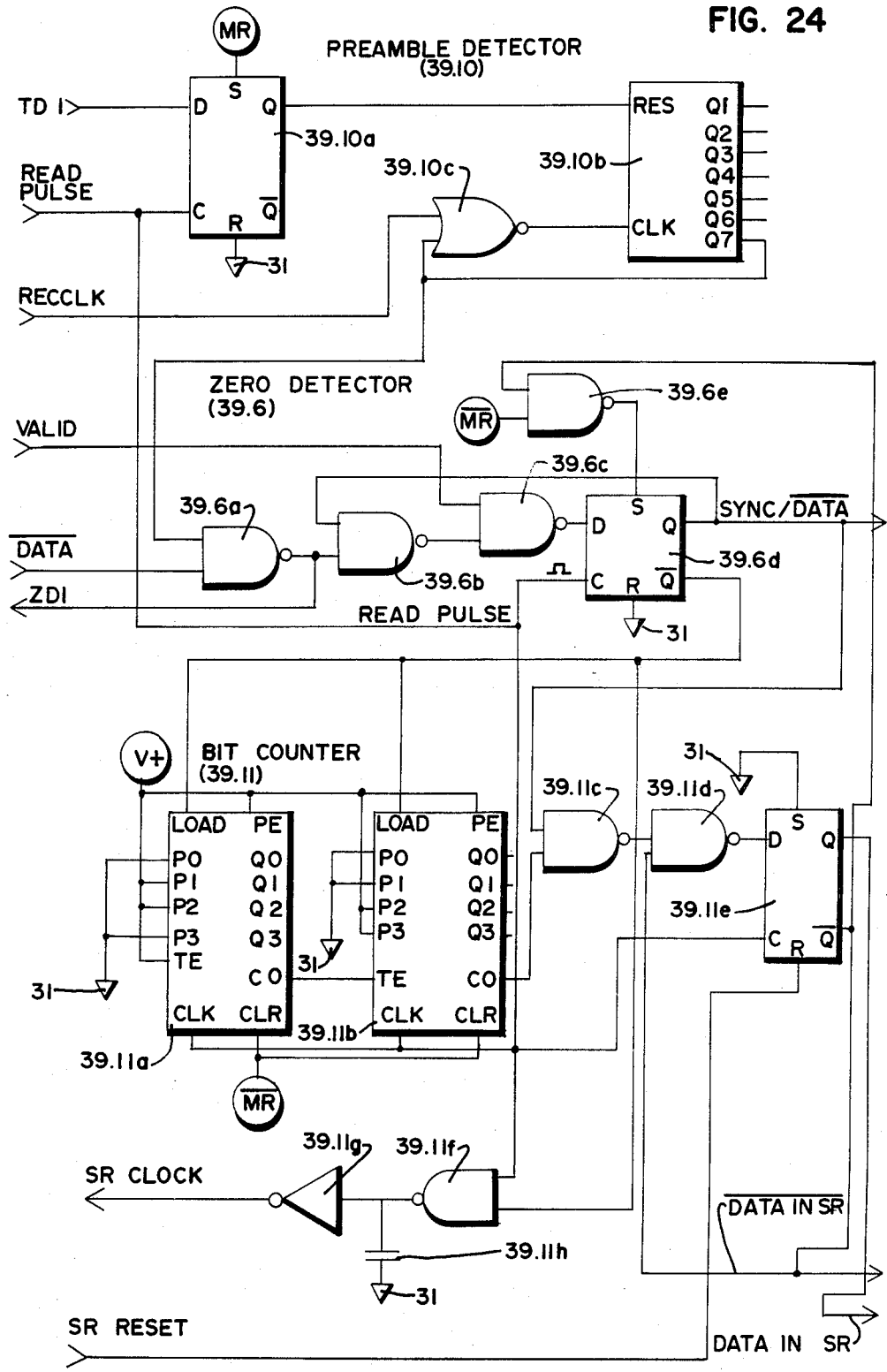
FIG. 24 is a schematic representation of the Preamble Detector, Zero Detector and Bit Counter circuit portions of the Decoder Logic network of FIG. 21.

Referring to FIG. 24, the READ PULSE signal from the Sync Generator 39.9 is applied by means of the signal flow path 40.10 to the clock (C) input terminal of a D-type flip-flop 39.10a, and is also connected to the second input terminal of NAND gate 39.5g to provide a reset signal to flip-flop 39.4a. The data (D) input terminal of flip-flop 39.10a is connected to receive the TD1 signal generated by the Threshold Detect network 39.5. The MR reset signal is applied to the set (S) input terminal of flip-flop 39.10a, and its reset (R) terminal is connected to the reference bus 31. The Q output terminal of flip-flop 39.10a is connected to the reset (RES) input terminal of a seven stage ripple counter 39.10b, which starts counting negative clock pulses (CLK).

The RECCLK signal is applied to a first input terminal of a NOR gate 39.10c. The only connected output terminal (Q7) (indicating a count of 64) of the ripple counter 39.10b is connected to the second input terminal of NOR gate 39.10c. The signal output from NOR gate 39.10c is applied to the clock (CLK) input terminal of the counter 39.10b.

The signal appearing at the Q7 output terminal of ripple counter 39.10b is also applied to a first input terminal of a NAND gate 39.6a of the Zero Detector network 39.6. The second input terminal of NAND gate 39.6a is connected to receive the $\overline{DATA}$ signal (from FIG. 22). The signal output from NAND gate 39.6a is connected to the first input terminal of a NAND gate 39.6b and also provides a output signal for further use within the Decoder Logic 39 circuitry, identified as ZD1. The signal output from NAND gate 39.6b is applied to a first input terminal of a NAND gate 39.6c. The second input terminal of NAND gate 39.6c is connected to receive the VALID signal. The output signal of NAND gate 39.6c is applied to the data (D) input terminal of a D-type flip-flop 39.6d. The clock (C) input terminal of flip-flop 39.6d is connected to receive the READ PULSE signal, and the reset (R) input terminal of the flip-flop is connected to the reference bus 31. The Q output terminal of flip-flop 39.6d provides the SYNC/$\overline{DATA}$ signal which is also fed back to the second input terminal of NAND gate 39.6b. Activation of the set (S) input terminal of flip-flop 39.6d is provided by the output of a NAND gate 39.6e, having one signal input connected to receive the $\overline{MR}$ reset signal and its second input terminal connected to receive the $\overline{DATA}$ $\overline{IN SR}$ signal generated by the Bit Counter 39.11 circuitry described below.

The $\overline{Q}$ signal output of flip-flop 39.6d is connected to the LOAD input terminals of two four bit synchronous binary counters 39.11a and 39.11b of the Bit Counter network 39.11. The PE input terminals of both counters are connected to the positive supply (V+) as well as the P1, P2 and TE input terminals of counter 39.11a and the P2 and P3 input terminals of Counter 39.11b. The P0 and P3 input terminals of counter 39.11a and the P0 and P1 input terminals of counter 39.11b are connected to the reference bus 31. The Carry-out (CO) output terminal of counter 39.11a is connected to provide an input signal to the TE terminal of counter 39.11b. The clear (CLR) input terminals of counters 39.11a and 39.11b are connected to receive the master reset ($\overline{MR}$) reset signal, and the clock (CLK) input terminals of both counters are connected to receive the READ PULSE signal. The carry-out (CO) signal output from counter 39.11b is applied to a first input terminal of a NAND gate 39.11c. The second input terminal of NAND gate 39.11c is connected to receive the SYNC/$\overline{DATA}$ signal from the Zero Detector network 39.6. The signal output from NAND gate 39.11c is applied to a first input terminal of a NAND gate 39.11d. The signal output from NAND gate 39.11d is applied to the data (D) input terminal of a D-type flip-flop 39.11e. The clock (C) input terminal of flip-flop 39.11e is connected to receive the READ PULSE signal and the set (S) input terminal is connected to the reference bus 31. The reset (R) input terminal is connected to receive the SR RESET signal. The $\overline{Q}$ output terminal provides the $\overline{DATA\ IN\ SR}$ signal, and the Q output terminal provides the DATA IN SR signal (from FIG. 25, to be described below). The $\overline{DATA\ IN\ SR}$ signal is fed back to the second input of NAND gate 39.11d. The READ PULSE signal is also applied to a first input terminal of a NAND gate 39.11f. The second input terminal of NAND gate 39.11f is energized by the output signal appearing at the $\overline{Q}$ output terminal of flip-flop 39.6d of the Zero Detector network. The signal output from NAND gate 39.11f is applied by means of an inverter 39.11g to circuitry elsewhere within the Decoder Network 39 and is designated as $\overline{SR\ CLOCK}$. The output terminal of NAND gate 39.11f, also connected by means of a capacitor 39.11h to the reference bus 31.

Figures 25, 28:
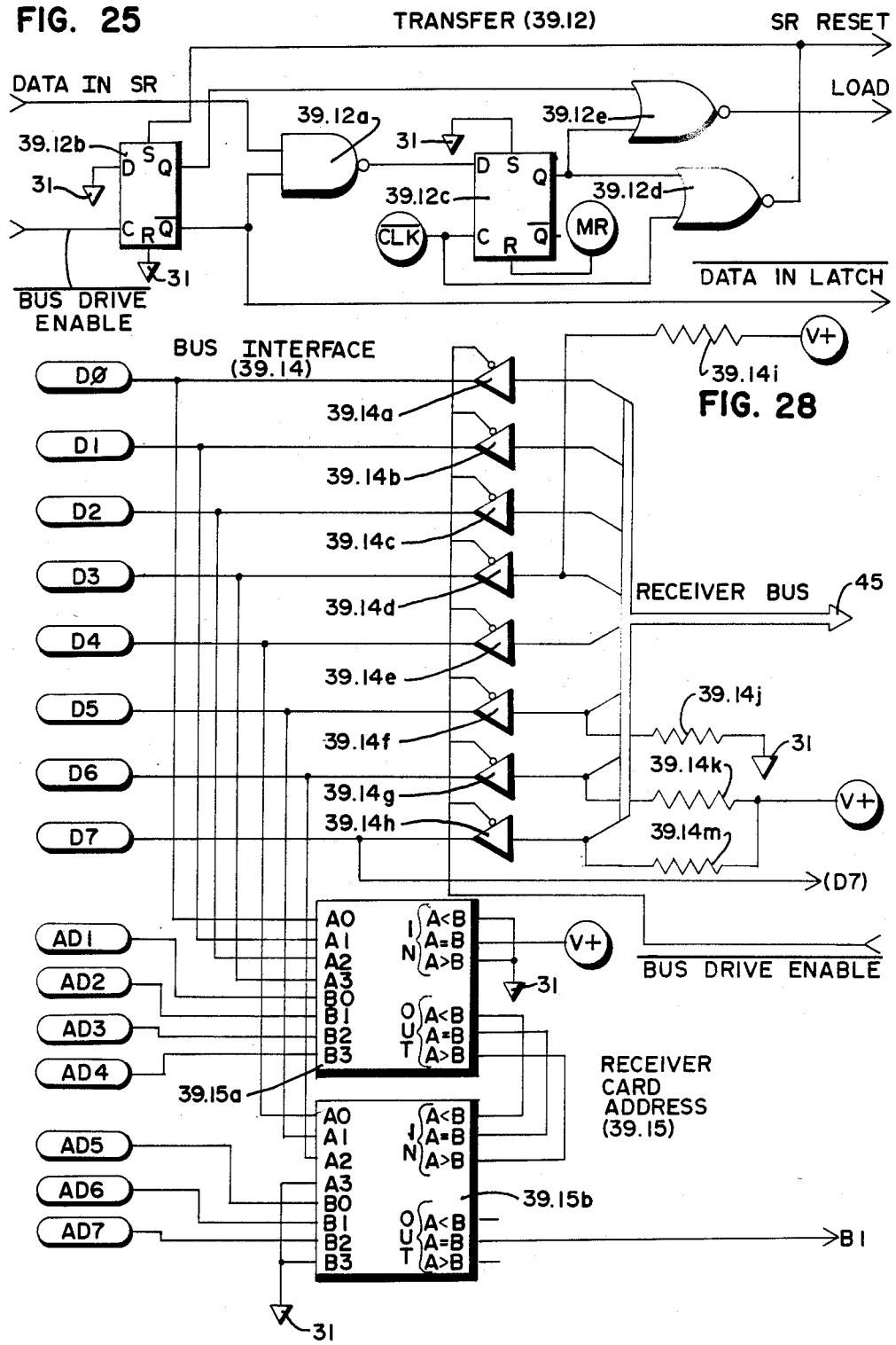
FIG. 25 is a schematic representation of the Transfer circuit portion of the Decoder Logic network of FIG. 21.
FIG. 28 is a schematic representation of the Bus Interface and Receiver Card Address circuit portion of the Decoder Logic network of FIG. 21.

Referring to FIG. 25, the DATA IN SR signal generated within the Bit Counter 39.11 circuit is applied to a first input terminal of a NAND gate 39.12a of the Transfer network 39.12. The second input terminal of NAND gate 39.12a is connected to the $\overline{Q}$ signal output terminal of a D-type flip-flop 39.12b. The data (D) and the reset (R) input terminals of flip-flop 39.12b are connected to the reference bus, and the clock (C) input terminal is connected to receive the $\overline{BUS\ DRIVE\ ENABLE}$ signal generated in the Handshaking network 39.13. The signal appearing at the $\overline{Q}$ output terminal of flip-flop 39.12b is used elsewhere in the circuitry and is identified $\overline{DATA\ IN\ LATCH}$. The signal output from NAND gate 39.12a is applied to the data (D) input terminal of a D-type flip-flop 39.12c. The set (S) input terminal of flip-flop 39.12c is connected to the reference bus 31 and the reset (R) terminal is connected to receive the master reset signal (MR). The clock (C) input terminal of flip-flop 39.12c is connected to receive the $\overline{CLK}$ timing signal, which is also applied to a first input terminal of a NOR gate 39.12d. The Q output terminal of flip-flop 39.12c is connected to the second input terminal of NOR gate 39.12d and is also connected to the first input terminal of NOR gate 39.12e. The Q output terminal of flip-flop 39.12b is connected to the second input terminal of NOR gate 39.12e. The output terminal of NOR gate 39.12d provides the SR RESET signal which is also applied to the set (S) input terminal of flip-flop 39.12b. The signal output from NOR gate 39.12e is designated as the LOAD signal.

Figure 26:
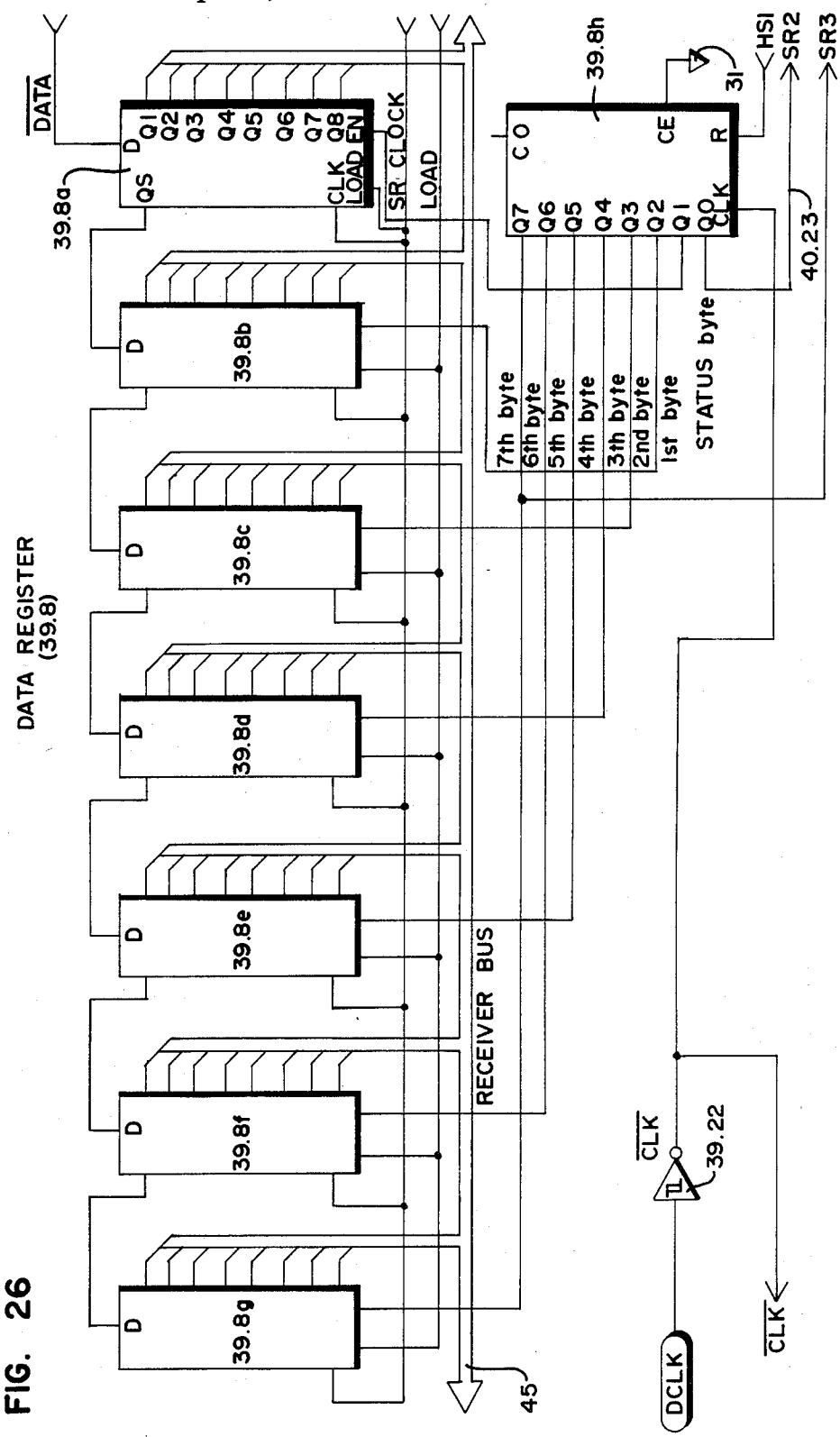
FIG. 26 is a schematic representation of the Data Register circuit portion of the Decoder Logic network of FIG. 21.

The Data Register network 39.8 is illustrated in FIG. 26. Referring thereto, the Data Register 39.8 comprises a bank of seven 8-stage shift and store registers 39.8a–39.8g. Each of the registers has a data (D) input, eight output terminals (Q1–Q8), a clock (CLK) input terminal, a Load input terminal and enable (EN) input terminal. The (D) input terminal of register 39.8a is connected to receive the $\overline{DATA}$ signal generated by the Digital Filter 39.3 network. The 39.8b–39.8g registers receive signals at their data (D) input terminals from the serial output (QS) terminal of the adjacent register, as illustrated. The clock (CLK) input terminals of all of the registers are connected to receive the $\overline{SR\ CLOCK}$ signal and the Load input terminals are connected to receive the LOAD signal. The Q1–Q8 parallel output terminals of all of the registers are directly connected to the Receiver Bus 45. The enable (EN) input terminals of the 39.8a–39.8g registers are connected respectively to the Q1–Q7 output terminals of a divide-by-eight Johnson Counter 39.8h. As illustrated in FIG. 26, the first counter 39.8a is associated with the first byte of information, the second counter 39.8b is associated with the second byte of information, etc. The Johnson Counter 39.8h also has a Q0 output terminal representing the "status" byte and is applied to the Status Register by means of the signal flow path 40.23 with the connector designation SR 2. The clock enable (CE) terminal of the Counter 39.8h is connected to the reference bus 31 and the reset (R) input terminal is connected to receive an HS1 signal from the Handshaking network 39.13. The Q7 output terminal of the counter 39.8h is also provided as an output signal for use in other circuits of the Decoder Logic network 39 and is identified as SR3.

An input clocking signal, received from the Receiver Controller network 10C designated as DCLK, is applied by means of a Schmitt trigger 39.22 to the clock (CLK) input terminal of the Johnson Counter 39.8h. The signal appearing at the output of the Schmitt trigger is identified as $\overline{CLK}$. The $\overline{CLK}$ signal is also used elsewhere in the Decode logic 39 circitry, as for example in the Transfer circuits 39.12. The DCLK clock governs all transfers on the Receiver bus. The Receiver Controller logic 10C operates to change the states of outputs only when CLK is "high" and reads data from the Receiver Bus 45 on the "low" to "high" transition. The Receiver Card 36 circuits change output states when CLK is "low" and read data from the Receiver Bus 45 on the "high" to "low" transition.

Figure 27:
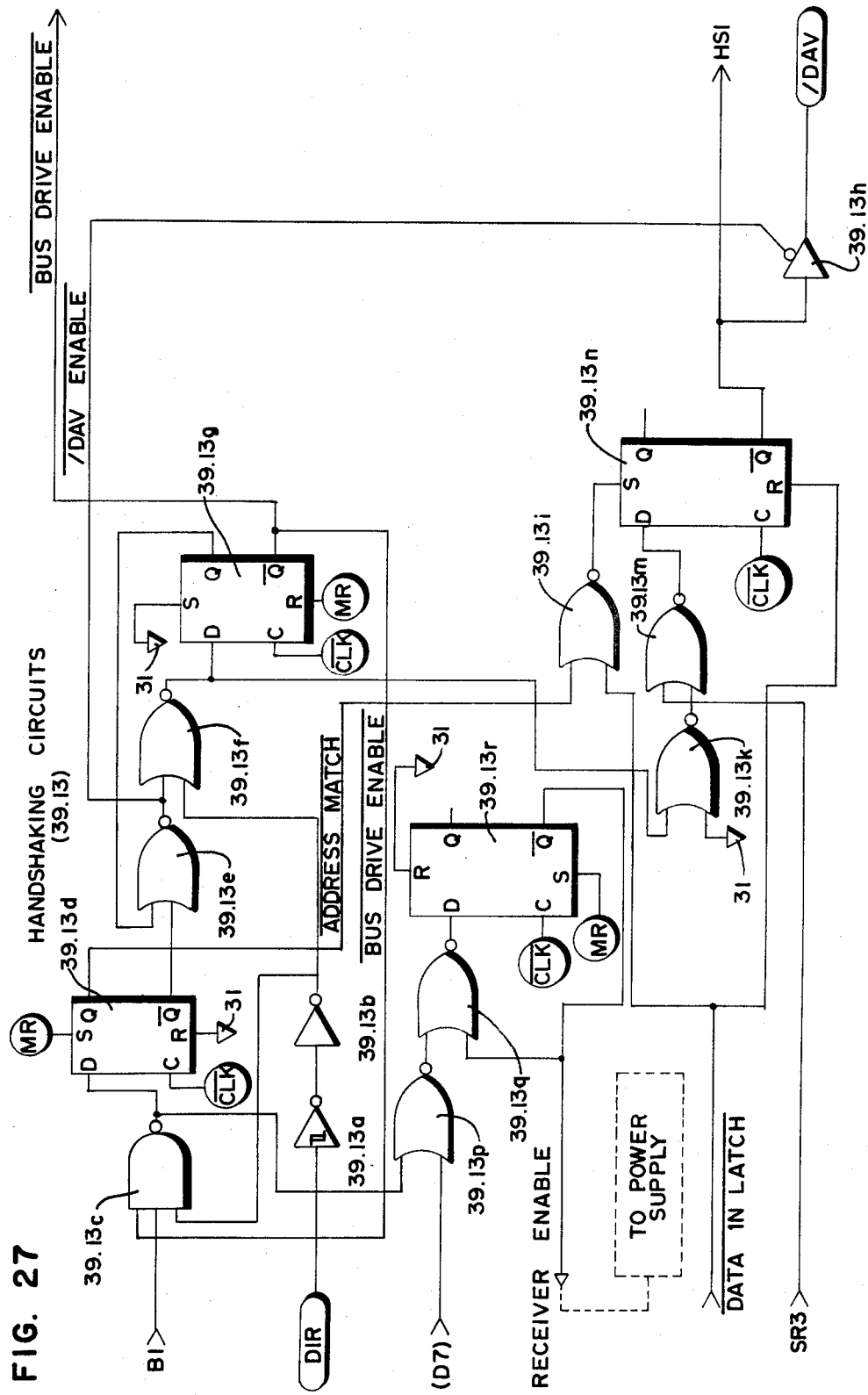
FIG. 27 is a schematic representation of the Handshaking Circuits portion of the Decoder Logic network of FIG. 21.

The Handshaking circuits 39.13 are illustrated in more detail in FIG. 27. Referring thereto, a DIR control signal from the Receiver Controller Logic 10C is provided as an input through the Receiver Bus 45, as described in more detail hereinafter. The DIR line is set "high" by the Receiver Controller 10C when the Controller is sending addressing and control information to the Receiver Cards 36 and is set "low" when data is being transmitted to the Receiver Cards 36 to the Controller C. The DIR signal is applied by means of a Schmitt trigger 39.13a and an inverter 39.13b to a first input terminal of a three input NAND gate 39.13c. The second input terminal of NAND gate 39.13c is connected to receive a signal from the Receiver Card Address circuits 39.15, designated as B1. The output terminal of NAND gate 39.13c is connected to the data (D) input terminal of a D-type flip-flop 39.13d. The clock (C) input terminal of flip-flop 39.13d is connected to receive the $\overline{\text{CLK}}$ signal, the reset (R) input terminal is connected to the reference bus 31, and the S input terminal is connected to receive the master reset (MR) reset signal. The $\overline{\text{Q}}$ output terminal of flip-flop 39.13d is connected to a first input terminal of a NOR gate 39.13e. The signal output terminal of NOR gate 39.13 is connected to a first input terminal of a NOR gate 39.13f. The second input terminal of gate 39.13f is connected to receive the $\overline{\text{DIR}}$ signal. The output terminal of NOR gate 39.13f is connected to the data (D) input terminal of a D-type flip-flop 39.13g. The set (S) input terminal of flip-flop 39.13g is connected to the reference bus 31, its clock (C) input terminal is connected to receive the $\overline{\text{CLK}}$ timing signal, its reset (R) input terminal is connected to receive the master reset (MR) signal, and its Q output terminal is fed back to the second input terminal of the NOR gate 39.13e. The output signal of the $\overline{\text{Q}}$ terminal of flip-flop 39.13g forms the $\overline{\text{BUS DRIVE ENABLE}}$ signal, which is fed back to apply an input to the third input terminal of NAND gate 39.13c. The signal output from NOR gate 39.13e forms the /DAV ENABLE signal, which is applied to enable the input terminal of a tri-state buffer 39.13h. The signal output from the tri-state buffer 39.13h forms the /DAV signal which is applied by means of the Receiver Bus 45 back to the Receiver Controller 10C. The /DAV signal is therefore, controlled by a currently addressed Receiver Card logic 36 to indicate to the Controller 10d that it has "data available".

The Q output terminal of flip-flop 39.13d forms the ADDRESS MATCH signal, which is applied to a first input terminal of a NOR gate 39.13i. The second input terminal of NOR gate 39.13i is connected to receive the $\overline{\text{DATA IN LATCH}}$ signal. The signal output from NOR gate 39.13f is applied to a first input terminal of a NOR gate 39.13k. The second input terminal of NOR gate 39.13k is connected to the reference bus 31. The output terminal of NOR gate 39.13k is connected a first input terminal of a NOR gate 39.13m. The second input terminal of NOR gate 39.13m is connected to receive the SR 3 signal from the seventh byte output terminal of the Johnson Counter 39.8h of the Data Register circuitry 39.8. The output signal from NOR gate 39.13m is applied to the data (D) input terminal of D-type flip-flop 39.13n. The signal output from NOR gate 39.13i is applied to the set (S) input terminal of flip-flop 39.13n. The clock (C) input terminal of flip-flop 39.13n is connected to receive the $\overline{\text{CLK}}$ timing signal, and the reset (R) input terminal of the flip-flop is connected to receive the $\overline{\text{DATA IN LATCH}}$ signal. The $\overline{\text{Q}}$ output terminal of flip-flop 39.13n forms the HS1 output signal and is applied through the input terminal of the tri-state buffer 39.13h to the /DAV terminal.

The signal output from NAND gate 39.13c is applied to a first input terminal of a NOR gate 39.13p. The second input terminal of NOR gate 39.13p is connected to the D7 bi-directional data line in the Bus Interface 39.14 network. The output terminal of NOR gate 39.13p is connected to a first input terminal of a NOR gate 39.13q. The output terminal NOR gate 39.13q is connected to a data (D) input terminal of a D-type flip-flop 39.13r. The reset (R) input terminal of flip-flop 39.13r is connected to the reference terminal 31, its clock (C) input terminal is connected to receive the $\overline{\text{CLK}}$ signal, its set (S) input terminal is connected to receive the master reset (MR) reset signal, and its $\overline{\text{Q}}$ output terminal is connected to the second input terminal of NOR 39.13q. The signal appearing at the $\overline{\text{Q}}$ output terminal of flip-flop 39.13r forms the RECEIVER ENABLE signal. The RECEIVER ENABLE signal is also applied to the Power Supply circuits, not illustrated, for the Decoder Logic network for enabling and disabling power to the circuits.

The Bus Interface 39.14 and Receiver Card Address 39.15 networks of the Decoder Logic network 39, as employed in the preferred embodiment, are illustrated in more detail, in FIG. 28. Referring thereto each Receiver Card network 36 is identified for communication with the Receiver Controller network 10C by a unique card address. This address is provided by means of the seven input terminals identified as AD1-AD7. The AD1-AD7 input terminals are connected to a wiring pattern on the Receiver Card 36 printed circuit board, which is hard-wired with that particular card's unique address. The AD1-AD4 address terminals are connected to the B0-B3 input terminals respectively of a four bit Magnitude Comparator network 39.15a. The A=B biasing input terminal of the Comparator 39.15a is connected to the supply (V+) and the "greater than" and "less than" biasing input terminals are connected to the reference bus 31. The AD5-AD7 address input terminals are connected to the B0-B2 input terminals respectively of a second four bit Magnitude Comparator network 39.15b. The A3 and B3 input terminals of the Comparator 39.15b are tied to the reference bus 31. The A=B output terminal of Comparator 39.15a is connected to the A=B input biasing terminal of Comparator 39.15b. The A (less than) B output terminal of Comparator 39.15a is connected to the A (less than) B input biasing terminal of Comparator 39.15b and the A (greater than) B output terminal of Comparator 39.15a is connected to the A (greater than) B input biasing terminal of Comparator 39.15b. The only connected output terminal of Comparator 39.15b is the A=B output terminal which provides the B1 signal for the Handshaking circuits 39.13.

The A0-A3 input terminals of Comparator 39.15a are directly connected to input bus terminals D0-D3 respectively of the Bus Interface network 39.14. The A0-A2 input terminals of Comparator 39.15b are directly respectively connected to receiver bus terminals D4-D6. The D7 bus terminal is connected to provide an input signal (D7) to the Status register 39.7 (hereinafter described) of FIG. 29. The D0-D7 bus lines are bidirectional data lines for communication of data and status information with the Receiver Controller network 10C. The Receiver Bus 45 is connected to the input terminal of eight tri-state buffer circuits 39.14a-39.14h respectively. The enable input terminals of the tri-state buffer circuits 39.14a-39.14h are each connected to receive the $\overline{\text{BUS DRIVE ENABLE}}$ from the Handshaking Circuit network 39.13. The output terminals of the tri-state buffer circuits 39.14a-39.14h are respectively connected to the bus data terminals D0-D7 respectively. The input line of tri-state buffer 39.14d is connected through a resistor 39.14i to the supply (V+). The input line of tri-state buffer 39.14f is connected by means of a resistor 39.14j to the reference bus 31. The input line of tri-state buffer 39.14g and the input line of buffer 39.14h respectively are connected by means of resistors 39.14k and 39.14m respectively to the supply (V+).

Figure 29:
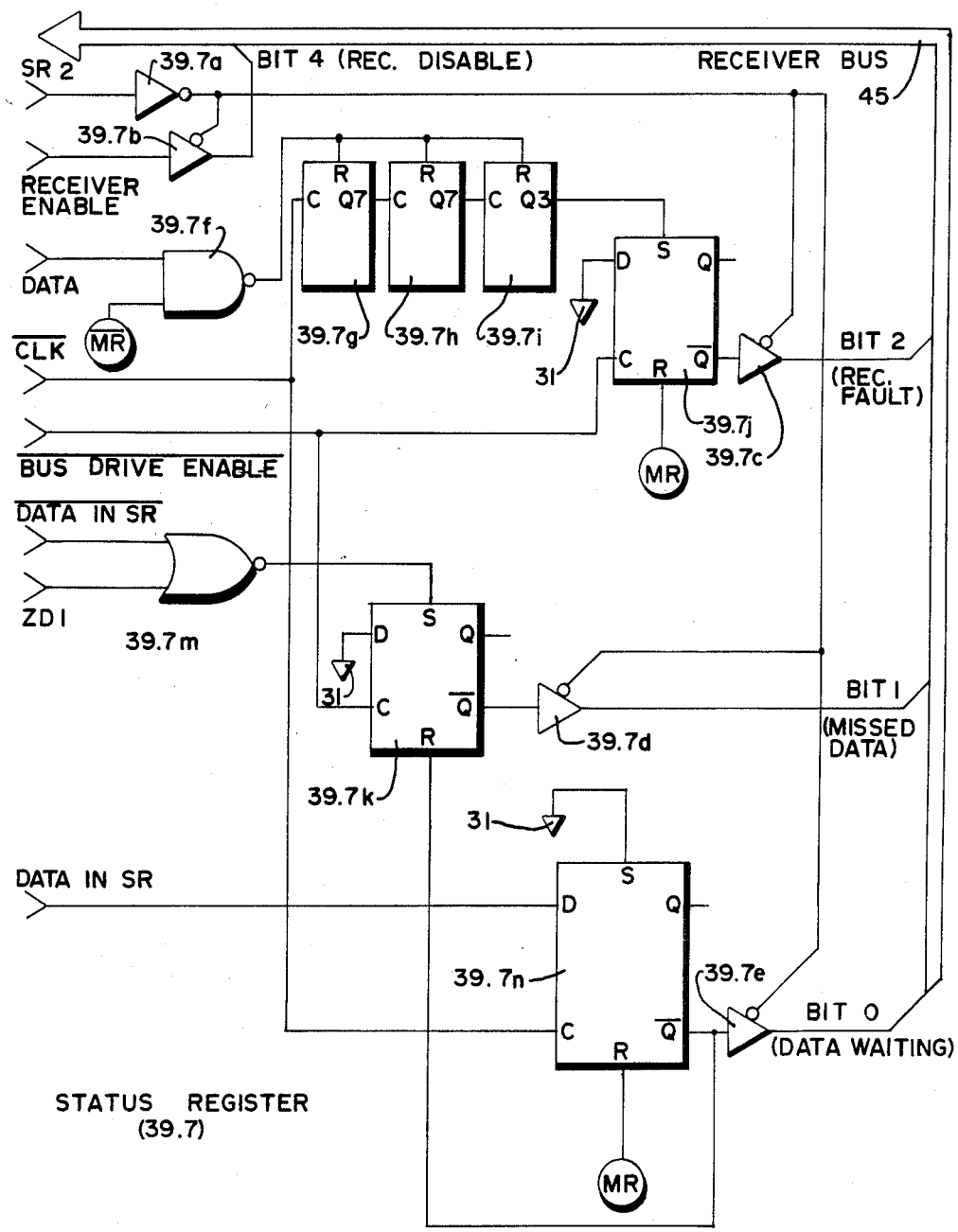
FIG. 29 is a schematic representation of the Status Register circuit portion of the Decoder Logic network of FIG. 21.

The circuits comprising the Status Register functional block 39.7 of FIG. 21 are illustrated in more detal in FIG. 29. The status byte output signal from the Johnson Counter 39.8h (i.e. SR2) is inverted by an inverter 39.7a and used to disable three tri-state buffer circuits 39.7b-39.7e respectively. The signal outputs of the buffer networks 39.7b-39.7e are respectively connected to the Receiver Bus 45. The output signal from buffer 39.7e forms the bit Ø input to the Receiver Bus 45, and represents a "data waiting" signal. Buffer 39.7d forms the "bit 1" input to the Receiver Bus 45, and represents a "missed data" input. Buffer 39.7c provides the "bit 2" input to Receiver Bus 45, which represents "receiver fault" information. The signal output from buffer 39.7b represents the bit 4 input signal to the Receiver Bus and represents "receiver disable" information. The signal input to buffer 39.7b is the RECEIVER ENABLE signal from the Handshaking Circuit network 39.13.

The DATA signal from the Digital Filter 39.3 and the Threshold Detector 39.5 network is applied to a first input terminal of a NAND gate 39.7f. The second input terminal of NAND gate 39.7f is connected to receive the $\overline{MR}$ reset signal. The output terminal of NAND gate 39.7f is connected to the reset (R) input terminals of three seven stage ripple counter networks 39.7g through 39.7i respectively. The clock (C) input terminal of counter 39.7g is connected to receive the $\overline{CLK}$ timing signal. The Q7 output terminal of counter 39.7g is connected to the clock input terminal of counter 39.7h. The Q7 output terminal of counter 39.7h is connected to the clock input terminal counter 39.7i. The Q3 output terminal of counter 39.7i is connected to the set (S) input terminal of a D-type flip-flop 39.7j. The data (D) input terminal of flip-flop 39.7j is connected to the reference bus 31, and the reset (R) input terminal of the flip-flop is connected to receive the master reset (MR) signal. The clock (C) input terminal of flip-flop 39.7j is connected to receive the $\overline{BUS\ DRIVE\ ENABLE}$ signal from the Handshaking Circuit network 39.13. The $\overline{Q}$ output terminal of flip-flop 39.7j is connected to the input terminal of the tristate buffer 39.7c for applying the receiver fault bit information to the Receiver Bus 45.

The $\overline{BUS\ DRIVE\ ENABLE}$ signal is also applied to the clock (C) input terminal of a D-type flip-flop 39.7k. The data (D) input terminal of flip-flop 39.7k is connected to the reference bus 31. The $\overline{DATA\ IN\ SR}$ signal from the Bit Counter network 39.11 is connected to a first input terminal of a NOR gate 39.7m. The ZD1 signal, generated in the Zero Detector network 39.6 is applied to the second input terminal of the NOR gate 39.7m. The signal output of NOR gate 39.7m is applied to the set (S) input terminal of flip-flop 39.7k. The $\overline{Q}$ output terminal of flip-flop 39.7k is connected to provide the signal input for the tri-state buffer 39.7d, which provides the "missed data" input information to the Receiver Bus 45. The DATA IN SR signal from the Bit Counter network 39.11 is applied to the data (D) input terminal of D-type flip-flop 39.7n. The set (S) input terminal of flip-flop 39.7n is connected to the reference terminal 31, and the reset (R) input terminal of the flip-flop is connected to receive the master reset (MR) signal. The clock (C) input terminal of flip-flop 39.7n is connected to receive the $\overline{CLK}$ timing signal. The $\overline{Q}$ signal output of flip-flop 39.7n is connected to provide the reset signal to flip-flop 39.7k, and also provides the input signal for the tri-state buffer 39.7e which provides "data waiting" information to the Receiver Bus 45.

The down converter 32 operates in typical superheterodyne fashion to receive all RF signals within its bandwidth. These signals will represent all of the transmissions received from activated remotely located ERT units. The incoming signals are down-converted to an output of approximately 115 MHz which is applied by means of the Power/Signal splitter 34 to the receiver circuitry on 48 different receiver cards (36.1-36.48). The receiver cards 36.1-36.48 represent 48 separate "receiver" units, each tuned to a slightly different frequency (see FIG. 19), preferably having overlapping bandwidths, and "listen" for incoming ERT transmissions over a 10 MHz bandwidth, in a manner such that the entire frequency band (typically 4 MHz) over which the ERT units are transmitting is covered. The 10 MHz "listening" bandwidth of individual receiver cards enables the convertor network 32 to receive transmissions from and to identify ERT units whose transmissions may have "drifted" from their initial design frequency. Therefore, an incoming ERT transmission within the 10 MHz band will most probably be simultaneously received (i.e. fall within the bandwidth of) by two receiver cards (36) at any one time. The receiver cards 36 operate independently so that incoming signals arriving simultaneously at different frequencies will be received without interference. If two transmissions from different ERT units are simultaneously received at the same frequency, they obviously will interfere with one another for that particular transmission of the entire transmission burst. However, as previously described, due to the varying time interval and frequency shift considerations associated with the ERT transmission, subsequent transmission bursts by the two ERT units will eventually separate from one another in either time, frequency, or both, such that they can each be identifiably detected before the end of the respective transmission cycles of the two ERT units.

Each of the 48 Receiver Cards 36 has logic for interpreting and buffering two complete ERT transmitted messages. The Receiver units take advantage of the fact that the oscillation frequency of the ERT units is very accurate (typically within 0.1%) of the 32.768 kHz oscillation frequency. Therefore, the logic circuits of the Decoder Logic and Data Buffer network 39 which initially processes the incoming transmission signal are synchronized to the incoming data. This timing is provided by the clock input signal RCLK, provided by the network of FIG. 30.

The incoming RF signal is processed by the Digital Filter network 39.3 which is set for processing of the incoming signal by the RCLK signal so as to process at a rate of one time frame for one bit of incoming Manchester Encoded data. That time frame is subdivided into 16 equal time sampling periods. In other words, each "time unit" of incoming signal is sampled 16 times. The sampling is performed by "shifting" the incoming signal through the shift registers 39.3c and 39.3d at the 16 sample period time rate. Adder 39.3e, gates 39.3g and 39.3h and flip-flop 39.3f form a counter that can count by $-2$, $-1$, 0, 1, or 2, depending on the data from the shift register 39.3c and 39.3d. The resulting "count" corresponds with the number of input samples that agree with a perfect Manchester encoded "1". If all of the samples agree, the count is +8. If none of the samples agree, the count is $-8$, which corresponds to a perfect Manchester encoded "0". As data or noise is received, the count varies between $-8$ and $+8$. The Threshold Detector 39.5 compares the absolute value of the samples against the "count" of the Digital Filter network. The Threshold Detector network provides a VALID output signal if the sampled signal is above the absolute value of the set threshold. The threshold level is set by means of the switching/jumper wire network

39.5b. The VALID signal is applied to the Peak Detector network 39.4 which looks for peaks in the "count" signal. The Peak Detector 39.4 compares the level of the present sample with that of the last sample, and provides the Sync Generator 39.9 with an activating Load signal only at the "highest" sample points. The Sync Generator signal then sets the timing reference for that circuitry which follows the Digital Filter, the Peak Detector, the Threshold Detector and the Zero Detector, as described in more detail hereinafter, to synchronize such circuitry in time with the incoming signal. The first incoming bits of a transmission from an ERT 20, will be the "preamble" bits (see FIG. 13). When a random input signal is received by the Digital Detector, an average "count" of input sample pulses will be zero, since there should be as many samples corresponding to a "high" count as those which correspond to a "low" count. Since the Digital Filter keeps a running count of the "highs" and "lows", the average for a random input signal or noise would be zero. However, when a transmitted signal is received, the Digital Filter will record all "highs" or "lows" during a sample time unit, which can then be used for further processing by the Preamble Detector network 39.10.

As previously stated, the input circuitry uses the first several incoming bits of the "preamble" message to set its synchronization to the incoming signal by means of the Peak Detector 39.4 and Sync Generator (39.9) networks. When the synchronization is set, the Preamble Detector network 39.10 and the Zero Detector network 39.6 look for the "end" of the preamble. The Preamble Detector network 39.10, disables the Zero Detector network 39.6 until it verifies that at least three valid "1" preamble bits have been received. In other words, the Preamble Detector 39.10 will not accept a valid "∅" (indicating the end of the transmitted "preamble") until it has accepted at least three valid preceding "1" preamble bits. When the Zero Detector 39.6 network determines a valid "∅" indicating receipt of the last bit of the "preamble".

The Decoder Network 39 begins recording subsequently received Manchester encoded information representing the 56 bits of information illustrated in FIG. 13. When the final "∅" preamble bit is received, the Sync Generator switches to a data collection mode and data collection processes are conducted in response to the clock signal input from RCLK. The data from the most significant output bit of the flip-flop 39.3f is clocked into the 56 bit Data Register 39.8. The Decoder Network assumes that once data begins clocking into the shift register 39.8, that it is in fact a received transmission from and ERT unit 20 (i.e. that there will be exactly 56 bits of received information). The Bit Counter network 39.11 counts the number of valid bits being clocked into the Data Register 39.8. The Bit Counter 39.11 acts as a "full message" detector. The output flip-flop 39.11e of the Bit Counter 39.11 is "set" only if exactly all 56 bits are received. When an invalid bit is received the Bit Counter checks to see that exactly 56 valid bits have been received. If exactly 56 bits have not been received the Bit Counter rejects the message and continues operation in the mode described below. When exactly 56 bits are received, the Bit Counter output flip-flop 39.11e toggles the Zero Detector network 39.6 through its NAND 39.6e to resume operation in the original non-synchronized mode, and provides a signal through its output NAND gate 39.11f to "stop" clocking of information into the Data Register 39.8.

Once the Bit Counter output flip-flop 39.11e is "set" the Digital Filter network 39.3 and associated decoding network returns to a state in which they are ready to accept new data, and the old data is held in the Data Register, until transferred by means of the Receiver Bus 45 to the Data Processing circuits 10D by means of the Receiver Controller 10C.

The 56 bits of data transferred from the Digital Filter network 39.3 into the Data Register 39.8 are clocked into the lowest register 39.8a of the Data Register. The registers of the Data Register are eight stage shift and store registers which can transfer data to an output latch, and a second message may then be shifted in. Therefore, each Decoder Logic network 39 can accept and process two successive messages before requiring transfer of data from the Data Register. The Transfer circuit 39.12, in response to the DATA IN SR signal from the Bit Counter network which indicates that a full message has been received, clocks the Data Register 39.8 to transfer the data from the register to its latch, and then resets.

The data bus, comprising output lines D0–D7 is an 8-bit bi-directional bus, common to all 48 Receiver Cards 36.1–36.48. Each of the Receiver Cards 36 has a unique hard-wired number determined by the address terminals AD1–AD7 (FIG. 28). The Controller network 10C interrogates the Receiver Cards by sending a card identification number to the cards by means of the Data Bus. The comparator networks 39.15a and 39.15b compare the address applied to the Data bus terminals with the hard-wired card address. When they match, comparator 39.15b drives the /DAV output terminal through the Handshaking Circuit network 39.13, if data is available in the Latch, indicating to the Controller Network 10C that data is available for transmission from the Receiver Card. The Controller Network circuits 10C then sets the DIR input line (FIG. 27) "low" to initiate transfer of data from the respective Receiver Card 36. Transfer of data from the Data Register 39.8 to the Data Processing circuits 10D is done in a synchronous mode under control of the DCLK clocking signal at approximately a 10 kHz rate. The Johnson Counter 39.8h (FIG. 26) is enabled by the signal output from flip-flop 39.13n, and the next clock signal received by the counter 39.8h causes the Johnson Counter to output one line (one byte of eight bits) at a time in serial manner. The information passes through the tri-state buffers 39.14a–39.14h to the data output bus lines. After the seventh byte of information has been transferred, the Johnson Counter rolls around to the "status byte" (Q0) which turns on the enable inputs of the tri-state buffers 39.7b–39.7e of the Status Register 39.7 to output the "status byte" information to the bus. Therefore, a complete data transfer comprises seven bytes of data and one byte of status information.

In the preferred embodiment the Controller Network 10C can disable an individual Receiver Card 36 through the D7 (FIG. 28) input terminal. The (D7) signal is applied through logic in the Handshaking Circuits 39.13 network to the RECEIVER ENABLE signal to deenergize the Power Supply of that Receiver Card. The status byte information, in the preferred embodiment is as follows:

Bit 0—indicates that the Receiver Card has data available and backed-up (i.e. in both the Data Shift Register and the latch).

Bit 1—is used to indicate that data has been missed (that SYNC was detected while waiting for the Controller polling signal).

Bit 2—indicates a Receiver Card fault, indicating that the input to the receiver has been continuously "high" or "low" for a significant amount of time such as eight seconds. Normally, the receiver, in the absence of a receipt of a transmitted signal, will hear random noise, which will provide a "neutral" designation.

Bit 3—receiver fault (no data was received from this receiver out of 1,992 messages. This bit is set and cleared by the Controller 10C).

Bit 14—indicates that the Receiver Card has been disabled.

Bit 5—not illustrated in the figures, is used to indicate that a Receiver Card is actually present in its designated connector slot.

Bit 6—unused.

Bit 7—unused.

Each Receiver Card 36 has a unique binary number, set by means of the Address hard-wired terminals AD-1-AD7 (FIG. 28), which is that Receiver Card's address. A Receiver Card 36 never outputs any data unless the Receiver Controller 10C has first sent that Receiver Card's address on the data lines of the Receiver Bus. When the Mobile Unit 10 is not receiving any ERT messages, the Controller unit 10C normally sequentially outputs each Receiver Card Address and examines the /DAV line on the following positive transition of Clock DCLK. If the Controller detects a "low" /DAV signal, it reverses the direction of the D lines (i.e. D0-D7), and sets DIR "low". On the negative transition of DCLK, the last Receiver Card 36 addressed outputs its first byte of data, which is read by the Controller on the next positive transition of clock (DCLK). At the same time that the Receiver Card outputs its last data byte, it sets /DAV "high". The Controller reads the last byte, and sets DIR "high". On the following cycle of DCLK, the Controller resumes polling of the Receiver Cards 36. The Controller may request a Receiver Card's (36) status byte by outputting the Receiver Card's address, and on the next clock (DCLK) cycle, setting DIR "low". The Controller may also ignore data from a Receiver Card 36 by not addressing it or by not setting DIR low when the addressed Receiver Card sets /DAV "low".

For ease of reference, the Receiver Bus 45 protocol is set forth below. The Receiver Bus 45 has two power lines, eight data lines, four control and handshake lines, and a timing line as follows:

GND—Negative power supply and logic common or reference.

VCC—Positive 18 volt supply.

D0-D7—Bi-directional data lines (negative logic).

DCLK—The clock governing all transfers from the bus. The Controller 10C changes the states of outputs only when DCLK is "high" and reads data from the bus, from the low to high transitions. The Receiver Cards 36 change output states when DCLK is "low", and read data from the bus on the high to low transition.

/DAV—This line is controlled by a currently addressed Receiver Card, to indicate to the Controller unit it has data available.

DIR—The Controller sets this line high when it is sending addressing and control information from the Receiver Cards, and sets this line "low" for receiving data from the Receiver Cards.

/RST—The Controller unit forces this line "low" in order to put all Receiver Cards into a known initial state.

RCLK—262.144 mHz timing pulses are applied to this line and used in synchronizing the Receiver Card units to the received data.

Figures 30, 36:
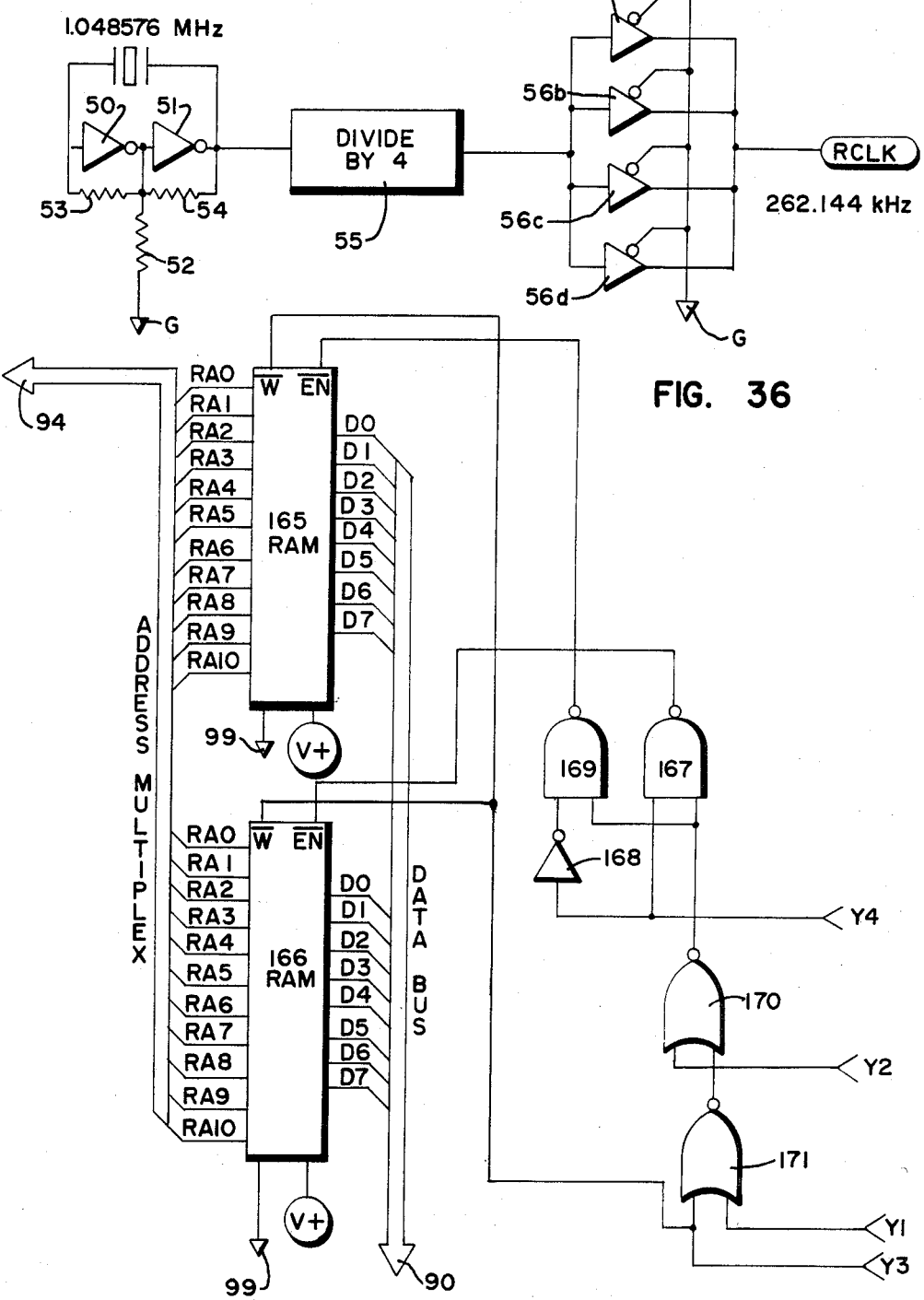
FIG. 30 is a schematic representation of an oscillator circuit used to generate the RCLK timing signal.
FIG. 36 is a schematic representation of the static RAM circuit portion of the Receiver Controller network of FIG. 15.

The RCLK timing signal is generated by simple cystal oscillator circuits illustrated in FIG. 30. A crystal oscillator, oscillating at 1.048576 MHz in the preferred embodiment, is connected across a pair of inverters 50 and 51 having their center tap connected to a reference (G) terminal through a resistor 52. The terminals of the crystal are also connected to the center tap by means of a pair of resistors 53 and 54. The output signal from the crystal oscillator is passed through a divide-by-4 circuit 55 and is applied by means of four tri-state buffer circuits 56a-56d to the RCLK output terminal at a frequency of 262.144 kHz. The enable input terminals of the tri-state buffers 56 is connected to a reference voltage (G).

Those circuits comprising a preferred embodiment configuration of the Receiver Controller network 10C of FIG. 15, are collectively illustrated in FIGS. 30-37. While the oscillator circuit of FIG. 30 is, in the preferred embodiment, located on the Receiver Controller function network, it in effect functions as a timing circuit for the Decoder Logic network circuitry 39 of the Receiver Cards 36. However, by locating this oscillator circuit with the Receiver Controller network, only one oscillator circuit is required for communicating with all of the Receiver Cards 36.

It will be understood, that while one particular configuration of a Receiver Controller network 10C will be described, that any number of alternate designs can be conceived by those skilled in the art, to accomplish the control functions previously described for controlling, polling and handling information with the Receiver Cards.

Figure 31:
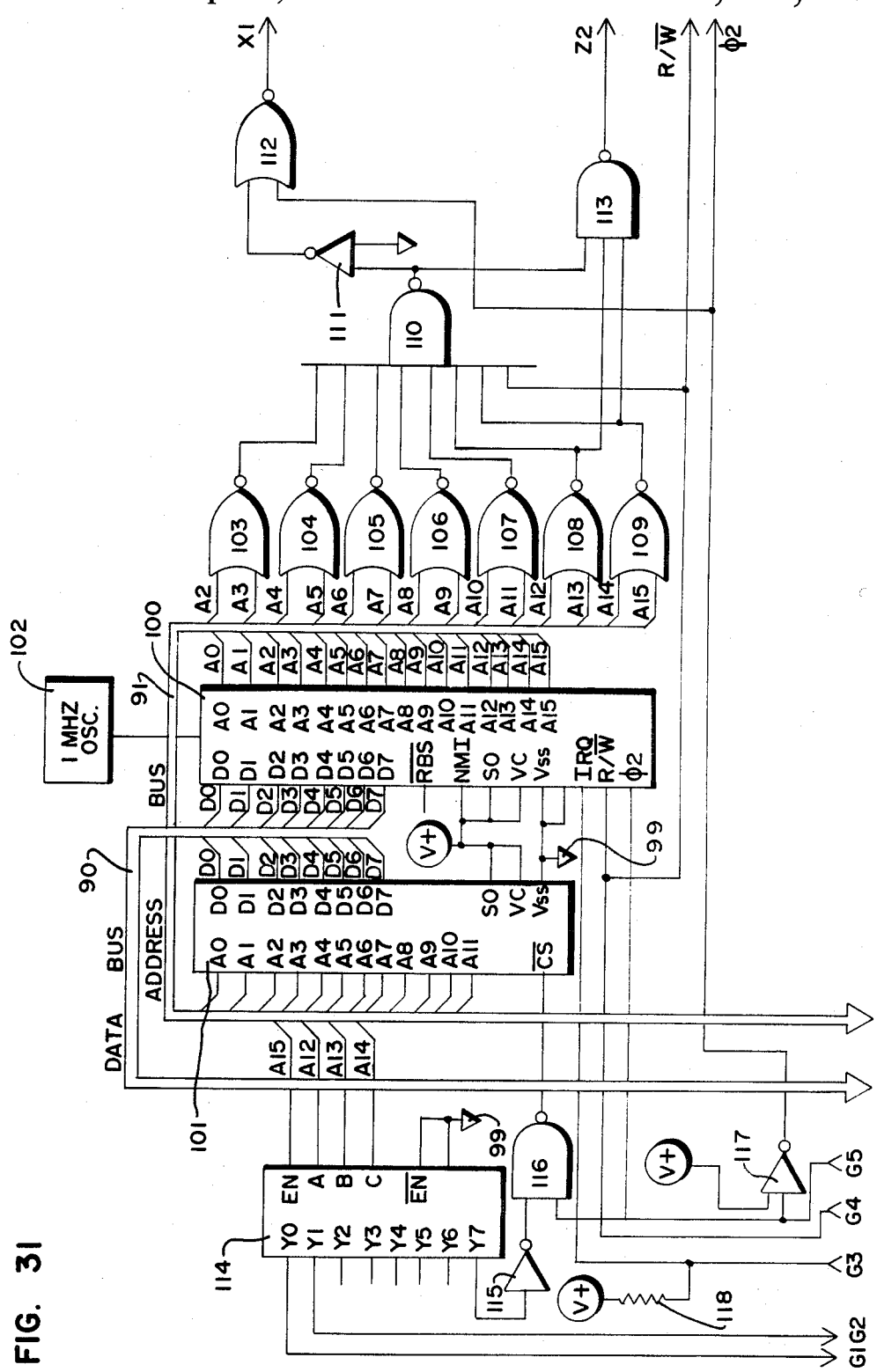
FIG. 31 is a schematic representation of the microprocessor, EPROM and chip select portions of the Receiver Controller of FIG. 15.

Referring to FIG. 31, a Microprocessor type 6502 chip manufactured by Rockwell is illustrated at 100, and its associated Type 2532 EPROM is illustrated at 101. The Microprocessor 100 and the EPROM 101 each communicate with a DATA BUS 90 respectively by means of terminals D0-D7 that are respectively connected with DATA BUS lines D0-D7. The microprocessor 100 communicates with an ADDRESS BUS 91 by means of sixteen signal ports A0-A15, respectively connected with ADDRESS BUS lines A0-A15. The EPROM 101 communicates by means of 12 signal ports designated A0-A11 respectively connected with ADDRESS BUS lines A0-A15. A 1 MHz Oscillator 102 provides a timing input signal to the Microprocessor 100. The $\overline{\text{NMI}}$, the SO and the VC input terminals of the Microprocessor 100 are connected to the supply (V+) and its VSS terminal is connected to the network ground 99. As before, it will be understood that appropriate voltage supply and ground connections are made to all circuits herein described, even though they may not specifically be illustrated in the Figures.

The logic gate components illustrated to the right of the Microprocessor 100 in FIG. 31 comprise the data selector chip enable function of the Controller Network. The signal inputs of NOR gates 103-109 are connected for communication with the A2 through A15 lines of Address Bus 91 respectively. The signal outputs of the NOR gates 103-109 respectively are connected to form seven input signals to an 8-input NAND gate 110. The signal output of NAND gate 110 is applied by means of an inverter 111 to a first input terminal of a NOR gate 112. The signal output from NAND gate 110 is also connected to a first input terminal of a 3 input NAND gate 113. The signal output from NOR gate 109 provides a signal input to the second terminal of NAND gate 113, and the signal output from NOR gate 109 is connected to provide an input to the third input terminal of NAND gate 113. The output of NAND gate 113 is used to drive circuitry elsewhere in the Controller network and is designated as Z2. Similarly, the signal output from NOR gate 112 is connected elsewhere in the Controller network and is designated as X$_1$. A 3–8 Line Decoder network (Type 74LS138) 114 is used for a chip select function and is operable to take a three bit binary input signal and to provide an output signal at one of its eight outputs ports (Y0–Y7). The EN, A, B and C terminals of the Decoder 114 are connected for communication respectively with the A15, A12, A13, A14 lines of the Address Bus 91. The $\overline{\text{EN}}$ terminal of decoder 114 is connected to the system reference 99. The Y0 and Y1 output terminals of decoder 114 are provided as output signals designated as G1 and G2 for use elsewhere in the Controller circuitry. The Y7 output terminal is connected by means of an inverter 115 to a first input terminal of a NAND gate 116. The signal output from NAND gate 116 is connected to the $\overline{\text{CS}}$ input terminal of the EPROM 101. The SO, VC and VSS terminals of the EPROM 101 are connected to the supply (V+).

The second input terminal of NAND gate 116 is connected to receive a signal from line G5, as hereinafter described, which signal is also applied to the $\phi$2 input terminal of Microprocessor 100 and is applied by means of an inverter 117 to the second input terminal of NOR gate 112 and as an output $\emptyset$2 signal for use elsewhere in the circuitry. An externally generated signal applied to the line G4 is connected to the R/$\overline{\text{W}}$ input terminal of the Microprocessor 100, is applied to the eighth input terminal of NAND gate 110 and is provided as an output signal on the line designated R/$\overline{\text{W}}$. An externally generated signal appearing on the line identified as G3 is applied to the $\overline{\text{IRQ}}$ input terminal of Microprocessor 100. The supply (V+) is connected by means of a resistor 118 to the G3 line.

Figure 32:
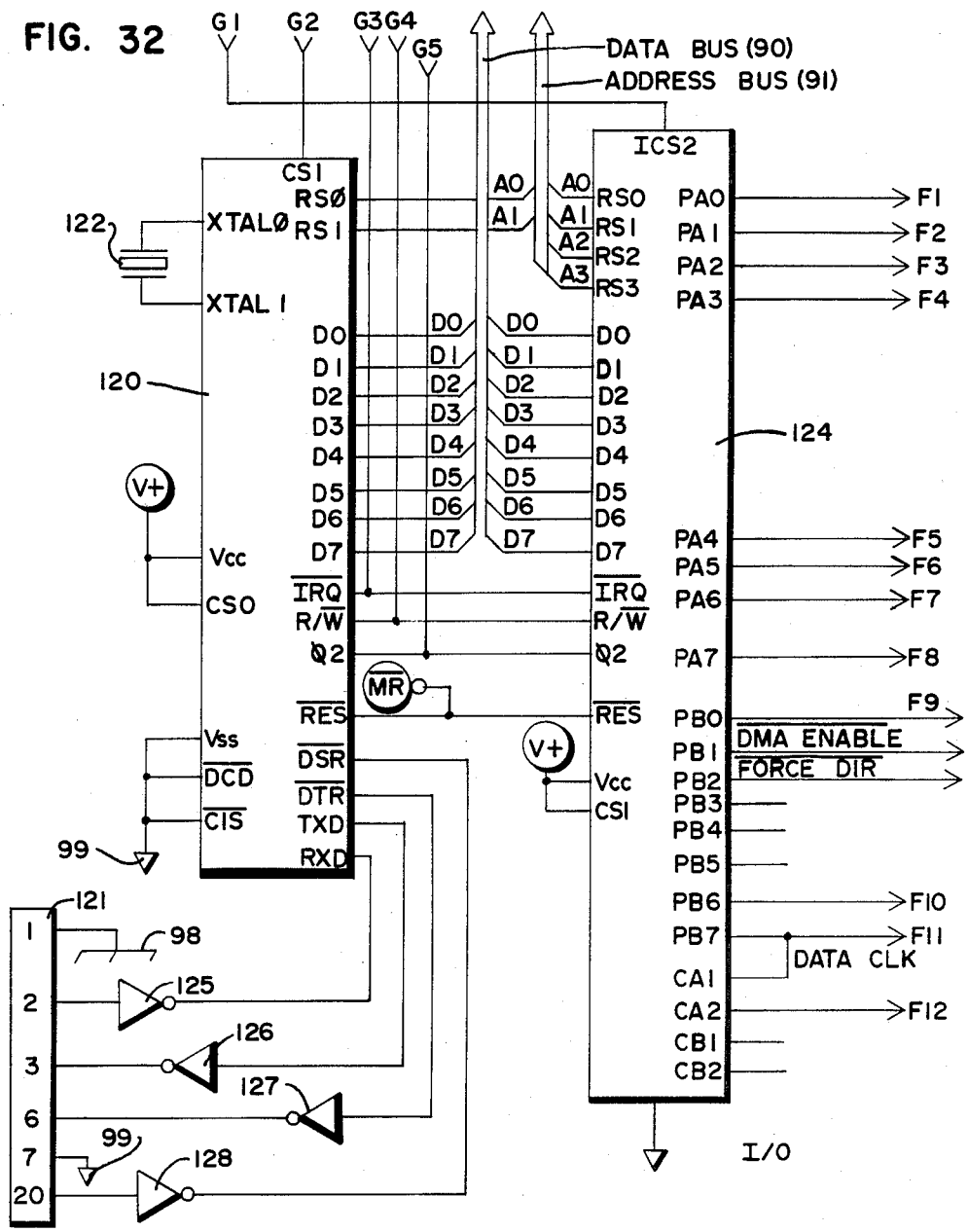
FIG. 32 is a schematic representation of the Input/Output and Interface Adapter portions of the Receiver Controller circuit of FIG. 15.

The circuit of FIG. 31 directly communicates with the circuit of FIG. 32. Referring thereto, an Asynchronous Communication Interface Adapter network (R6551) as illustrated at 120. The Interface Adapter 120 provides the communication link for the Control network 10C with the Data Processing computer 47 through a standard RS232C connector illustrated at 121. The Interface Adaptor 120 communicates with lines A0 and A1 of the Address Bus 91 by means of its RS$\emptyset$ and RS1 ports respectively, and also communicates with the lines D0–D7 of Data Bus 90 through its D0–D7 ports respectively. A crystal oscillator 122 is connected between its XTAL$\emptyset$ and XTAL1 input terminals. Its $\overline{\text{CSI}}$ input terminal is connected to the G2 line for communication with the Decoder 114. The VCC and CS0 terminals of the Interface Adaptor 120 are connected to the supply (V+) and its VSS, $\overline{\text{DCD}}$ and $\overline{\text{CIS}}$ terminals are connected to the reference 99. The $\overline{\text{IRQ}}$ output terminal is connected to the G3 output line and is also connected to the $\overline{\text{IRQ}}$ port of a second Interface Adaptor network (Type 6522 manufactured by Rockwell) 124. The R/$\overline{\text{W}}$ output port of Interface network 120 is connected to the G4 signal line and is also connected to the R/$\overline{\text{W}}$ input port of Interface network 124. The $\emptyset$2 output port of Interface network 120 is connected to the G5 signal line and is also connected to the $\emptyset$2 input port of the Interface network 124. The $\overline{\text{RES}}$ input terminal of Interface network 120 is connected to receive the master reset signal ($\overline{\text{MR}}$) and is also connected to the reset ($\overline{\text{RES}}$) input terminal of the Interface network 124.

As stated above, the Interface Network 120 provides the link for communication with external Data Processing computer circuits 47 through the standard connector 121. Pin 1 of connector 121 is connected to the chassis ground 98. Pin 2 of connector 121 is connected by means of an inverter 125 to the RXD port of Interface Network 120. The TXD port of the Interface Network 120 is connected through an inverter 126 to pin 3 of the connector 121. The $\overline{\text{DTR}}$ output port of Interface Network 120 is connected through an inverter 127 to pin 6 of the standard connector 121. Pin 7 of connector 121 is connected to the control circuit reference 99, and pin 20 of connector 121 is connected by means of an inverter 128 to the $\overline{\text{DSR}}$ input port of Interface Network 120. All communication of the network 10C with the external processing equipment is performed through the connector 121 by means of the four above-described output ports of Interface Network 120.

The Interface Adaptor circuit 124 provides the main intercommunication link between the Microprocessor 100 and the remaining logic of the Controller Network 10C. The Interface Adaptor 124 communicates with lines A0–A3 respectively of the ADDRESS BUS 91 by means of its ports RS0–RS3, and with lines D0–D7 respectively of the DATA BUS 90 by means of its ports D0–D7. Its chips select input terminal ICS2 is connected to the G1 line leading to the Decoder network 114. The PA0–PA7 ports of the Interface Adaptor 124 are connected to provide signal communication to those lines identified in the figure as F1–F8 respectively. The PB0, PB6 and PB7 ports of the Interface Adaptor 124 are connected to provide signal communications on lines F9–F11 respectively. The PB1 port provides output communication on the line designated as $\overline{\text{DMA ENABLE}}$, and the PB2 port provides output communication on the line designated as $\overline{\text{FORCE DIR}}$. The PB3, PB4 and PB5 ports are unconnected. The CA1 output port is also connected to the F11 signal line which provides data clock signals as hereinafter described in more detail. The CA2 port is connected to provide signal communication with line F12. The VCC and CS1 terminal of Interface Adaptor 124 are connected to the supply (V+).

Figure 33:
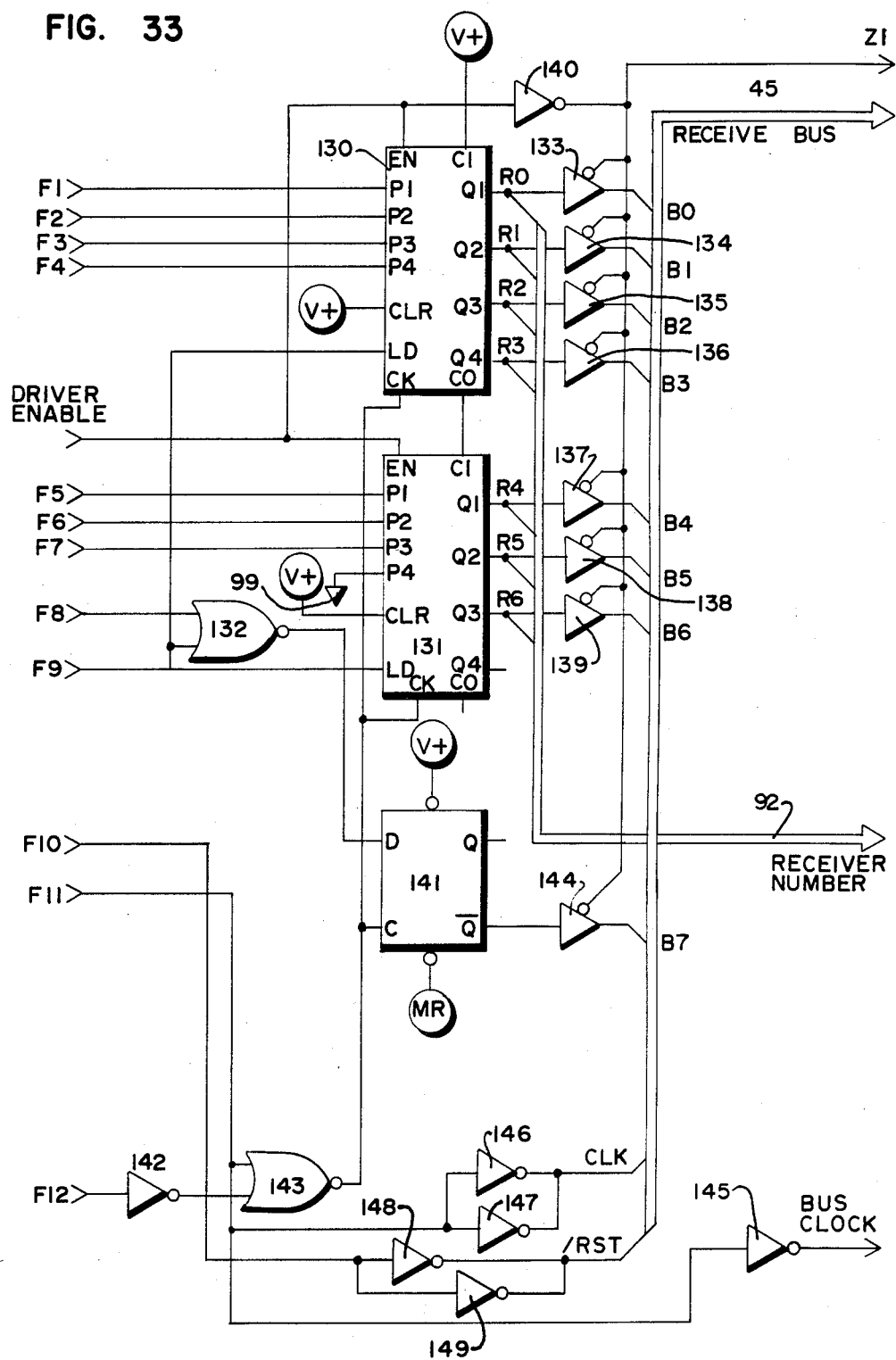
FIG. 33 is a schematic representation of the counter and interface circuit portion of the Receiver Controller network of FIG. 15, which addresses the Receiver Cards of the Decoder Logic.

Referring to FIG. 33, the F1–F4 signal input lines from the circuits of FIG. 32 are directly applied to the P1–P4 input terminals respectively of a 4-bit binary counter (Type 74LS161) 130. The F5–F7 signal input lines are connected respectively to the P1–P3 input terminals of a second 4-bit binary counter 131 of like configuration to counter 13B. The P4 input terminal of counter 131 is connected to the system reference 199. The clear (CLR) input terminals of counters 130 and 131 are connected to the supply (V+). The F9 signal input line is connected to load (LD) input terminals of counters 130 and 131 and is also connected to a first input terminal of a NOR gate 132. The F8 signal input line is connected to the second input terminal of NOR gate 132. Counters 130 and 131 communicate directly with the RECEIVER NUMBER Bus 92 by means of output terminals Q1-Q4 of counter 130 which are respectively connected to the R0-R3 lines of RECEIVER NUMBER Bus 92, and by means of output terminals Q1-Q3 of counter 131, which are respectively connected to the R4-R6 lines of RECEIVER NUMBER Bus 92. The output terminals Q1-Q4 of counter 130 are also connected respectively by means of tri-state buffers 133-136 to the B0-B3 lines respectively of the RECEIVE BUS 45. The Q1-Q3 output terminals of counter 131 are also connected respectively by means of tri-state buffers 137-139 to the B4-B6 lines respectively of the RECEIVE BUS 45. The DRIVER ENABLE LINE (hereinafter described) provides an input signal to the enable (EN) input terminals of counters 130 and 131 and is also connected by means of an inverter 140 to the enable input terminals of the tri-state buffers 133-139. The enable terminals of the tri-state buffers 133-139 are connected to a signal line identified as Z1.

The signal output from NOR gate 132 is applied to the data (D) input terminal of D-type flip-flop 141. The F12 signal input line is connected by means of an inverter 142 to a first input terminal of a NOR gate 143. The second input terminal of NOR gate 143 is connected to receive signals from the line F11. The signal output of NOR gate 143 is connected to the clock (C) input terminal of flip-flop 141 and is also connected to the clock (CK) input terminals of counters 130 and 131. The $\overline{Q}$ signal output terminal of flip-flop 141 is connected by means of a tri-state buffer 144 to the B7 line of the RECEIVER BUS 45. The enable input terminal of buffer 144 is connected to the Z1 line. Tri-state buffers 133-139 and 144 comprise respectively the B0-B7 designated lines of the RECEIVER BUS 45. The F11 signal input line is also connected through an inverter 145 to the BUS CLOCK line, used elsewhere within the controller circuitry. The F11 line is further connected by means of a pair of inverters 146 and 147 to the clock (CLK) line of the RECEIVER BUS 45. The F10 signal input line is connected by means of a pair of inverters 148 and 149 to the /RST signal line of the RECEIVER BUS 45. The Counters 130 and 131 of FIG. 33 apply the Receiver Card 36 numbers to the RECEIVER BUS 45 for polling the Receiver Cards 36.

Figure 34:
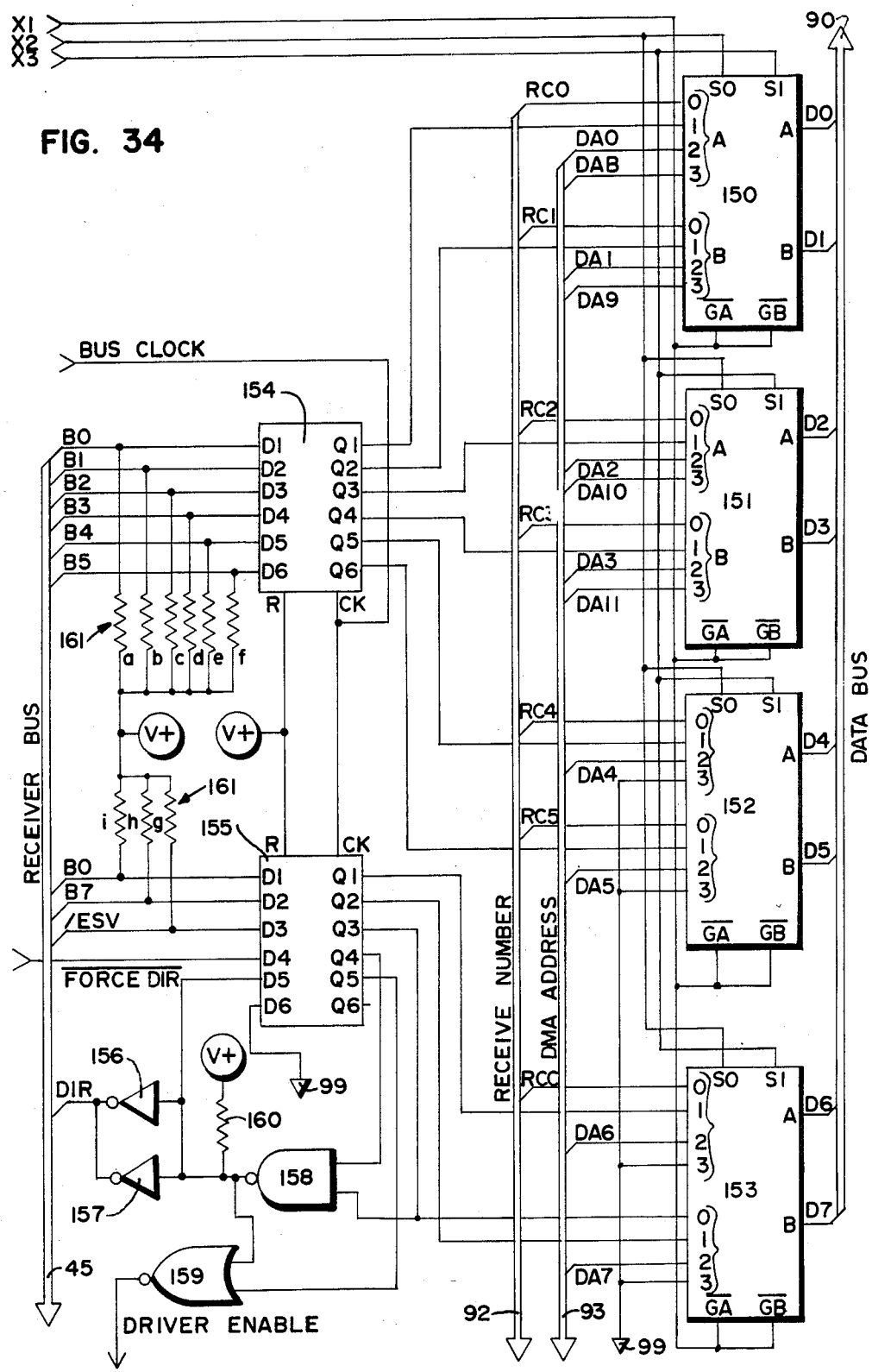
FIG. 34 is a schematic representation of the Address and Receiver Bus Interface circuits of the Receiver Controller circuit of FIG. 15.

Referring to FIG. 34 the RECEIVER NUMBER Bus 92 communicates with four 4-input multiplexor networks (Type 74LS253) 150-153. The RC0 and RC1 lines of the RECEIVER NUMBER Bus 92 are connected to the A0 and B0 input terminals respectively of multiplexor 150. The RC2 and RC3 lines of Bus 92 are respectively connected to the A0 and B0 input terminals of multiplexor 151. The RC4 and RC5 lines of Bus 92 are respectively connected to the A0 and B0 input terminals of multiplexor 152. The RC6 line of Bus 92 is connected to the A0 input terminal of multiplexor 153. The multiplexor units 150-153 also communicate with a DMA ADDRESS bus 93 through the DA0-DA11 bus connection points, as follows. Lines DA0, DA8, DA1 and DA9 of Bus 93 are respectively connected to input terminals A2, A3, B2 and B3 of multiplexor 151. Lines DA4 and DA5 of Bus 93 are respectively connected to input terminals A2 and B2 of multiplexor 152. Lines DA6 and DA7 of Bus 93 are respectively connected to input terminals A2 and B2 of multiplexor 153.

The multiplexor networks 150-153 further communicate with the DATA BUS 90 through their A and B output ports to form the D0-D7 connections to the DATA BUS 90 as follows. Output terminals A and B of multiplexor 150 are respectively connected to the D0 and D1 lines of Bus 90. Output terminals A and B of multiplexor 151 are respectively connected to the D2 and D3 lines of Bus 90. Output terminals A and B of multiplexor 152 are respectively connected to the D4 and D5 lines of Bus 90. Output terminals A and B of multiplexor 153 are respectively connected to the D6 and D7 lines of Bus 90. The S0 ports of the multiplexors 150-153 are connected to receive signals applied to the X2 line, and the S1 ports of the multiplexor are connected to receive signals appearing on the X3 line. The $\overline{GA}$ and $\overline{GB}$ ports of the multiplexors 150-153 are connected to receive signals applied to the X1 line.

A pair of Hex D flip-flops (Type 40174) 154 and 155 provide communication between the RECEIVER BUS 45 and the multiplexor circuits 150-153. The D1-D6 input terminals of flip-flop 154 are respectively connected to lines B0-B5 of RECEIVER BUS 45, and the D1-D2 input terminals of flip-flop 155 are respectively connected to the B6 and B7 lines of the RECEIVER BUS 45. The D3 input terminal of flip-flop 155 is connected to the /ESV line of the RECEIVER BUS. The D4 input terminal of flip-flop 155 is connected to the $\overline{FORCE\ DIR}$ line and is not directly connected to the RECEIVER BUS 45. The D5 input terminal of flip-flop 155 is connected by means of a pair of inverters 156 and 157 to the DIR line of the RECEIVER BUS 45. The reset (R) terminals of flip-flops 154 and 155 are tied to the supply (V+), and the clock (CK) terminals of flip-flops 154 and 155 are connected to the BUS CLOCK signal line. The Q1-Q6 output ports of flip-flop 154 are directly connected to input ports of the Multiplexors 150, 151 and 152 as follows. Output terminals Q1 and Q2 of flip-flop 154 are connected respectively to the A1 and B1 input terminals of multiplexor 150. Output terminals Q3 and Q4 of flip-flop 154 are connected respectively to the A1 and B1 input terminals of multiplexor 151. Output terminals Q5 and Q6 of flip-flop 154 are connected respectively to the A1 and B1 input terminals of multiplexor 152. The Q1-Q3 output ports of flip-flop 155 are respectively connected to the A1, B1 and B0 input ports of multiplexor 153. The Q4 output terminal of flip-flop 155 is connected to a first input terminal of a NAND gate 158, and the second input of NAND gate 158, is connected to receive the signal appearing at the Q3 output terminal of flip-flop 155. The signal output of NAND gate 158 is applied to a first input terminal of a NOR gate 159 and is also connected through a resistor 160 to the supply (V+). The Q5 output terminal of flip-flop 155 is connected to the second input terminal of NOR gate 159. The signal output of NAND gate 158 is also connected to the D5 input terminal of flip-flop 155. The signal output of NOR gate 159 forms the DRIVER ENABLE signal. The D6 terminal of flip-flop 155 is connected to the reference potential 99. Each of the data input terminals of flip-flops 154 and 155 which are directly connected to the RECEIVER BUS 45 are also connected by means of resistors (denoted at 161a-161g) to the supply (V+). The A3 and B3 input terminals of multiplexor 152 and the A3 and B3 of multiplexor 153 are connected to the reference potential 99.

Referring to FIG. 36, lines D0-D7 of the DATA BUS 90 are dierctly connected to two chips of CMOS Static RAM 165 and 166 through their respective ports D0-D7 of each RAM chip. The RAM chips 165 and 166 also have I/O terminals RA0-RA10 respectively connected for communication with lines RA0-RA10 respectively of an ADDRESS MULTIPLEX bus 94. A signal line designated Y1 is connected to a first input terminal of NOR gate 171. A second input terminal of NOR gate 171 is connected to the signal line designated Y3. The Y3 signal line is also directly connected to the $\overline{W}$ terminals of the RAM circuits 165 and 166. A signal line designated Y4 is connected to a first input terminal of a NAND gate 167 and by means of an inverter 168 to a first input terminal of a NAND gate 169. A signal line designated as Y2 is connected to a first input terminal of a NOR gate 170. The output signal from NOR gate 171 is applied to the second input terminal of NOR gate 170. The signal output from NOR gate 170 is applied to the second input terminal of NAND gate 167 and also to the second input terminal of NAND gate 169. The output signal from NAND gate 167 is applied to the $\overline{EN}$ terminal of RAM circuit 166, and the signal ouptut from NAND gate 169 is connected to the $\overline{EN}$ terminal of the RAM chip 165.

Figure 35:
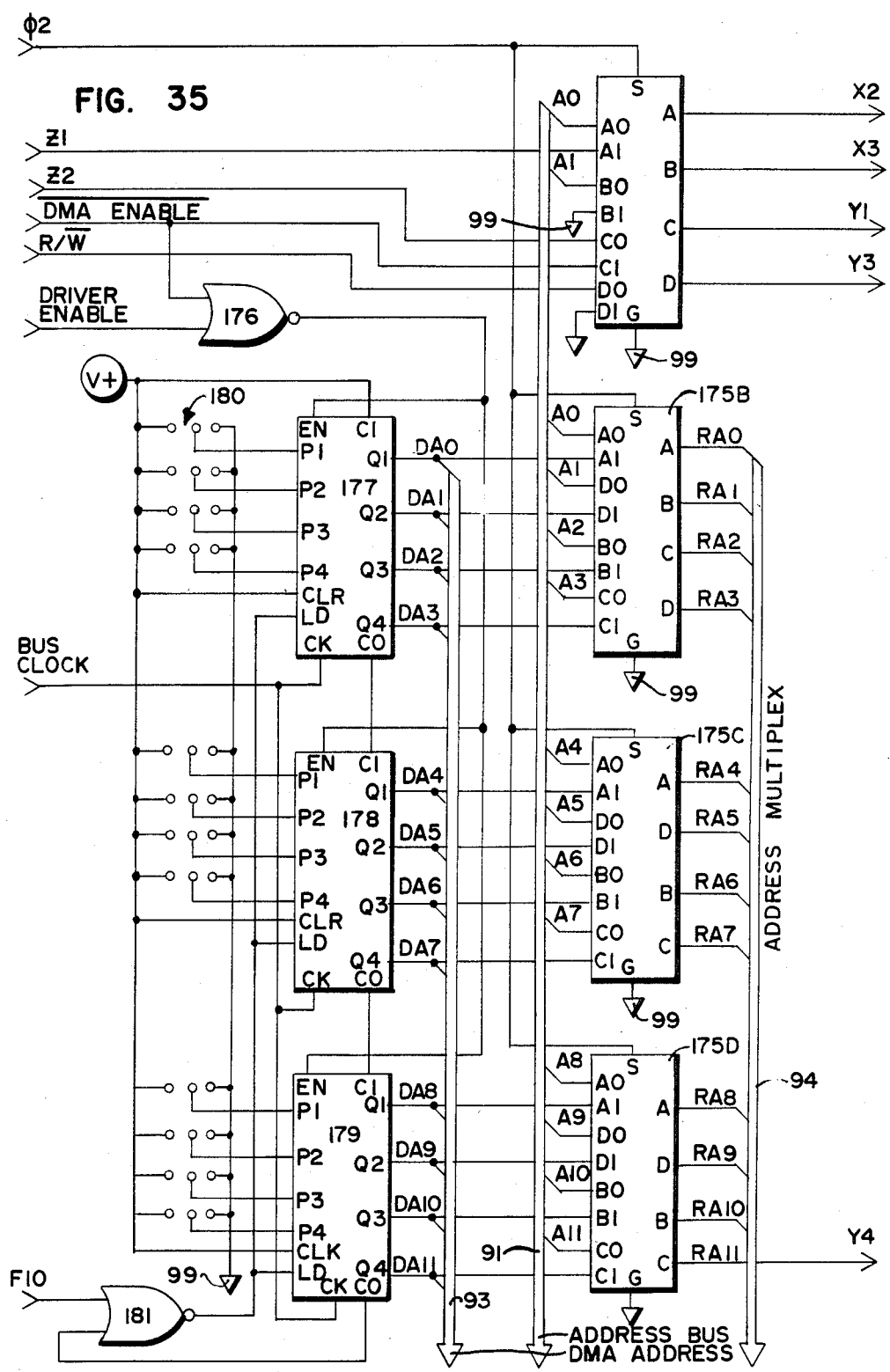
FIG. 35 is a schematic representation of the RAM addressing and Address Multiplexor circuits of the Controller Receiver network of FIG. 15.

Referring to FIG. 35, the ADDRESS MULTIPLEX Bus 94 is connected to three gates of a quad 21-input multiplexor network 175. The ADDRESS MULTIPLEX BUS 94 connections are made to the 175B-175D portions of the quad chip, as follows. The A, D, B and C output terminals of multiplexor 175B are respectively connected to the RA0-RA3 lines of Bus 94. The A, D, B and C output terminls of multiplexor 175C are respectively connected to the RA4-RA7 lines of Bus 94. The A, D and B output terminals of multiplexor 175D are respectively connected to the RA8-RA10 lines of Bus 94. The A, B, C and D output terminals of multiplexor chip 175A respectively form the X2, X3, Y1 and Y3 signal lines. The C output terminal of multiplexor 175D forms the Y4 signal line. The G terminals of multiplexor chips 175A-175D are tied to the common reference 99.

The multiplexor chips 175A-175D communicate with the ADDRESS BUS 91 as follows. Terminals A0 and B0 of multiplexor 175A are respectively connected to the A0 and A1 lines of Bus 91. Terminals A0, D0, B0 and C0 of multiplexor 175B are respectively connected to the A0-A3 lines of Bus 91. Terminals A0., D0, B0 and C0 of multiplexor 175C are respectively connected to the A4-A7 lines of Bus 91. Terminals A0, D0, B0 and C0 of multiplexor 175D are respectively connected to the A8-A11 lines of Bus 91. The B1 port of multiplexor chip 175A is tied to the reference potential 99. The A1 port of multiplexor chip 175A is connected to the Z1 line, and its C0 port is connected to the Z2 line. The C1 port is connected to receive the $\overline{DMA\ ENABLE}$ signal which is also applied to a first input terminal of a NOR gate 176. The D0 port of multiplexor chip 175A is connected to receive the R/$\overline{W}$ signal. The $\emptyset$2 signal line is connected to the S input terminals of each of the multiplexor chips 175A-175D. The second input terminal of NOR gate 176 is connected to receive the DRIVER ENABLE signal.

The signal output from NOR gate 176 is connected to the enable (EN) input terminals of three 4-bit binary counters with asynchronous clear (Type 74LS161) 177-179. The counters 177-179 multiplex such signals as "write", "enable", etc. for the RAM circuits 165 and 166. The counters 177-179 directly communicate with the DMA ADDRESS Bus 93 through their respective output ports as follows. The Q1-Q4 output terminals of counter 177 are respectively connected to the DA0-DA3 lines of Bus 93. The Q1-Q4 output terminals of counter 178 are respectively connected to the DA4-DA7 lines of Bus 93. The Q1-Q4 output terminals of counter 179 are respectively connected to the DA8-DA11 lines of Bus 93. The Q1, Q2, Q3 and Q4 output terminals of counters 177-179 are respectively connected to the A1, D1, B1 and C1 ports of the multiplexor chips 175B-175D respectively. The input ports P1-P4 of the counters 177-179 are connected to a hardwired jumper matrix, generally designated at 180. The P1-P4 ports of the counters 177-179 are connected to a the jumper matrix 180, be connected either to the positive supply (V+) or to the reference potential 99. The CI and CLR terminals of counter 177 are connected to the positive supply, as well as the CLR input terminals of counters 178 and 179. The CO terminal of counter 177 is connected to the CI input terminal of counter 178. The CO output terminal of counter 178 is connected to the CI input terminal of counter 179. The CO output terminal of counter 179 is connected to a first input terminal of a NOR gate 181. The second input terminal of NOR gate 181 is connected to the F10 line. The signal output from NOR gate 181 is connected to the load (LD) input terminals of counters 177-179. The clock (CK) input terminals of counters 177-179 are connected to receive signals from the BUS CLOCK line.

Figure 37:
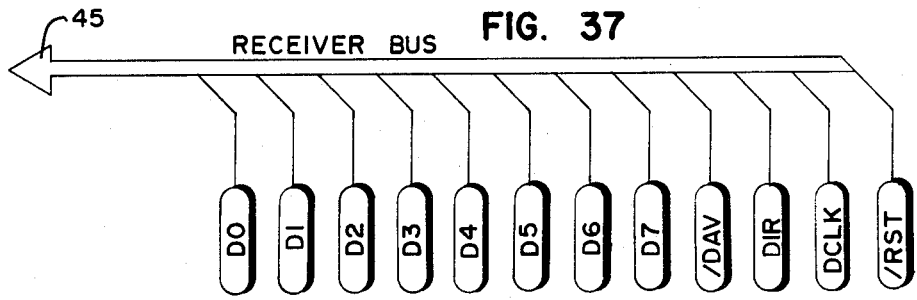
FIG. 37 is a schematic representation of the Receiver Bus output portion of the Receiver Controller network of FIG. 15.

The RECEIVER BUS 45 output connections from the Receiver Controller 10C, which corresponds with that Receiver Bus connection previously described with respect to the Decoder Logic 39, are illustrated in FIG. 37. Referring to FIG. 37, the D0-D7, /DAV, DIR, DCLK and /RST lines of the RECEIVER BUS 45 are illustrated as well as their respective connections fo the Decoder Logic 39 circuitry.

In the preferred embodiment, the Receiver Controller circuitry communicates with a computer (i.e. Data Processing Computer 47 of FIG. 15) by means of the standard RS-232 serial interface 121 in manner well-known in the art. The Data Processing Computer 47 analyzes, sorts and the stores the information received from the Receiver Cards 36 by means of the Controller Network 10C in any manner desired by a user. The non-volatile Data Storage 50 can be used to store such record keeping data as meter reading information as well as customer and equipment information, or other data and information as desired by the user and the use to which the system is being put. Since the computer is not an integral portion of the present invention, further reference thereto will not be made herein. As previously stated, the data processing function could be entirely replaced by a simple print-out function.

Those skilled in the art of microprocessor design will recognize the Receiver Controller circuitry above described as being of typical configuration for control circuits of the type using direct memory access logic. However, other microprocessor based, or even non-microprocessor control circuit configurations that practice the principles of this invention can readily be envisioned by those skilled in the art. Accordingly, only a brief description of the Receiver Controller circuitry will be set forth herein. The DCLK signal appearing on the RECEIVER BUS 45 (i.e. the Data Clock) is, in the preferred embodiment, a 10 kHz signal that clocks all bus transfers, and runs continuously. This signal originates from the interface network 124 and is applied to the F11 line (FIG. 32) which is buffered by the circuits of FIG. 33 and is applied to the RECEIVER BUS at the DCLK terminal. The Receiver Controller outputs Receiver Card 36 numbers on the RECEIVER BUS 45 by means of the Counters 130, 131 and 141, which apply the Receiver Card number by means of the B0-B7 connections, to the Receiver Bus 45. In the preferred embodiment, the Counters of FIG. 33 can handle up to 128 possible receivers. The B7 output bit of flip-flop 141 (FIG. 33) is under control of the Microprocessor 100 to disable the Receiver Cards being addressed, if desired by the Microprocessor 100. The Receiver Card 36 identification provided by the FIG. 33 counters is applied through the RECEIVER BUS 45 and brought out to the Input/Output multiplexor networks 150-153 and on through to the DATA BUS 90 for feedback to the Microprocessor 100, so that the Microprocessor can see which Receiver Card is being polled.

Data received on the RECEIVER BUS 45 from the Receiver Cards 36 passes through the flip-flops 154 and 155 which function as latches to clean up the signal following transmission. The data applied through flip-flops 154 and 155 is then applied by means of the multiplexor circuits 150-153 to the DATA BUS 90. The data appearing on the DATA BUS 90 can go directly to the static RAM chips 165 and 166, without microprocessor intervention. However, since the data does appear on the DATA BUS to which the microprocessor has access, the microprocessor can look at the data being transferred if it wishes. Normally, however, data received from the Receiver Cards 36 is loaded into the RAM chips 165 and 166 without microprocessor involvement. The counters 177-179 establish the address at which data is written into RAM. The multiplexor networks 175B-175D multiplex the Address lines of RAM so that they can be addressed either by the Counters 177-179 or by the Microprocessor 100. The 175A multiplexor chip, as previously described, multiplexes such functions as "write", "enable", etc. for the RAM.

The main system line for the microprocessor (via oscillator 102) switches at a 1 MHz rate between the counter and microprocessor control. The "∅2" line selects which address will be used. The input select switches (switch matrix 180) of counters 177-179 set the bottom address at which wrap-around occurs. The Data Selector circuits (see FIG. 31) form enable circuits which allow the Microprocessor 100 to enable the output multiplexors 150-153. The D5 input signal from flip-flop 155 and associated buffer circuits monitor the DAV line. When the DAV line goes "low" the DIR bit is set at a logical "low" with appropriate timing and with the assistance of flip-flop 155. The $\overline{\text{FORCE DIR}}$ line originating from the Microprocessor also is applied to flip-flop 155 which forces DIR to a logical low even though DAV did not drop to a "low" level. This enables the Microprocessor 100 to force DIR "low" (i.e. to ask a Receiver Card if it is functioning properly). When a message is received from a Receiver Card 36, consisting of eight bytes, the number of the card and the message enter the Controller Circuitry automatically without microprocessor intervention. Accordingly, the Controller network 10C is referred to as a Direct Memory Access (DMA) controller type of network.

Other modifications of the invention will be apparent to those skilled in the art in light of the foregoing description. This description is intended to provide specific examples of circuits which form a preferred embodiment of the invention and which clearly disclose the present invention. Accordingly, the invention is not limited to implementation thereof according to this embodiment or to use of the specific elements or circuits described herein. Similarly, the invention is not limited to the specific meter reading application with which the invention was described. All alternative modifications and variations of the present invention which fall within the broad scope of the appended claims are covered.

We claim:

1. An RF transponder suitable for use with an automatic/remote instrument monitoring system wherein the transponder is one of a pluarality of such transponders configured to operate with at least one of a plurality of instruments remotely located from an interrogate/receiver means which transmits an RF energizing signal to said transponders and which receives and processes RF signals from the transponders, said transponder comprising:
   (a) means suitable for operative connection with a parameter sensing instrument for providing a sensed instrument signal responsive to a condition of a parameter being sensed by said instrument;
   (b) encoding means operatively connected to receive said sensed instrument signal for providing an encoded data signal in response thereto;
   (c) RF receiving means for receiving an RF energizing signal and for providing a transponder enable signal in response thereto;
   (d) RF transmitter means operatively connected to receive said transponder enable and said encoded data signals for transmitting in response thereto an RF transponder signal, said RF transponder signal comprising a plurality of spaced RF transmission bursts each containing encoded information from said encoded data signal; and
   (e) means operatively connected with said transmitter means for varying the frequency of said RF transponder signal according to a predetermined function such that said transmission bursts thereof may occur at different frequencies within a predetermined frequency bandwidth.

2. An RF transponder as recited in claim 1, wherein said parameter sensing instrument is a meter and wherein said sensed instrument signal corresponds to a commodity consumption parameter of said meter.

3. An RF transponder as recited in claim 2, wherein said encoding means includes memory means for accumulating and storing a record of said commodity consumption parameter over time.

4. An RF transponder as recited in claim 2, wherein said RF transmitter transmits said encoded information in said RF transmission bursts in Manchester Code format.

5. An RF transponder as recited in claim 1, wherein the time intervals between successive ones of said spaced RF transmission bursts are generally constant.

6. An RF transponder as recited in claim 1, wherein said frequency varying means in operable to vary the frequency of said RF transponder signal as a function of time, whereby the frequency of said RF transponder signal during any one RF transmission burst is a function of the time at which such bursts occurs.

7. An RF transponder as recited in Claim 1, wherein the frequency of said RF transponder signal during any one RF transmission burst is relatively constant.

8. An RF transponder as recited in claim 7, wherein the total change in frequency of said transponder signal within one said RF transmission burst is less than about one percent.

9. An RF transponder as recited in claim 7, wherein the total change in frequency of said transponder signal within one said RF transmission burst is less than about one-half of a percent.

10. An RF transponder as recited in claim 1, wherein said RF transponder has an identifier code that distinguishes it from other RF transponders in an automatic/remote instrument monitoring system having a plurality of such RF transponders, and wherein said frequency varying means includes for means for varying said RF transponder signal as a function of said identifier code.

11. An RF transponder as recited in claim 1, wherein said RF receiving means is operable to produce said transponder enable signal only upon receipt of an RF energizing signal; wherein said RF transmitter is operable to provide said RF transponder signal only upon receipt of said transponder enable signal; and wherein said RF transponder signal comprises a predetermined fixed number of said spaced RF transmission bursts.

12. An RF transponder as recited in claim 11, wherein said RF transmitter is tuned to transmit said RF transponder signal about a center frequency and wherein said fixed number of spaced RF transmission bursts occur within a bandwidth of about less than 0.5 percent of said center frequency.

13. An RF transponder as recited in claim 12, wherein said fixed number of spaced RF transmission bursts occur within a bandwidth of less than 10 MHz.

14. An RF transponder as recited in claim 12, wherein said fixed number of spaced RF transmission bursts occur within a bandwidth of less than about 5 MHz.

15. An RF transponder as recited in claim 1, wherein said RF receiving means comprises:
 (a) an antenna for receiving said RF energizing signal;
 (b) superregenerative receiver means with external squelch, operatively connected with said antenna for receiving and processing said RF energizing signal; and
 (c) means operatively connected with said external squelch for sampling said RF energizing signal at a low duty cycle.

16. An RF transponder as recited in claim 15, wherein said duty cycle is less than about 0.5%.

17. An RF transponder as recited in claim 15, wherein sensitivity of said RF receiver means to said RF energizing signal is better than about −90 dbm.

18. An automatic/remote instrument monitoring system for monitoring a plurality of instruments and for simultaneously transmitting data from the monitored instruments when energized by an RF wake-up signal to a remotely located interrogate receiver means, comprising:
 (a) interrogate transmitter means for providing an RF wake-up signal, for initiating simultaneous readout from a plurality of remotely located RF transponders;
 (b) a plurality of RF transponders each configured for operative connection with at least one of the instruments to be monitored, each transponder comprising:
  (i) data collection means operatively connected to collect parameter data from at least one of said instruments being monitored;
  (ii) transponder receiver means for receiving said RF wake-up signal and for enabling and initiating transmission of said collected parameter data from said transponder in response thereto;
  (iii) transponder transmitter means operatively connected with said data collection means and said transponder receiver means for transmitting an RF transponder signal to an interrogate receiver, said RF transponder signal being characterized by active time and frequency parameters and comprising a plurality of RF transmission bursts, each containing said collected parameter data; and
  (iv) means operatively connected with said transponder transmitter for determining at least one of said active parameters of said RF transponder signal in a manner such that the RF transponder signal of each said transponder differs from that of other said transponders in a manner that enables said plurality of RF transponder signals to be distinguished from one another during simultaneous transmissions by said plurality of transponders; and
 (c) interrogate receiver means remotely located from said transponders and cooperatively operable with said interrogate transmitter means for receiving and processing said plurality of simultaneously transmitted RF transponder signals from said remotely located transponders.

19. An automatic/remote instrument monitoring system as recited in claim 18, wherein said instruments comprise meters, and wherein said parameter data collected by said data collection means represents a commodity consumption parameter of said meter.

20. An automatic/remote instrument monitoring system as recited in claim 18, wherein said transponder receiver means includes means for verifying that a received RF signal has predetermined properties corresponding to those of said RF wake-up signal transmitted by said interrogate transmitter means.

21. An automatic/remote instrument monitoring system as recited in claim 18, wherein each said RF transponder has identification means for uniquely distinguishing it from others of said plurality of transponders, and wherein said RF transponder signal of each said transponder further includes data corresponding to such unique transponder identification.

22. An automatic/remote instrument monitoring system as recited in claim 21, wherein said means for determining said active parameters of said RF transponder signal includes means for setting of at least one of said active parameters according to said unique transponder identification.

23. An automatic/remote instrument monitoring system as recited in claim 21, wherein said means for determining said active parameters of said RF transponder signal includes means for determining both said active time and frequency parameters as a function of said unique transponder identification.

24. An automatic/remote instrument monitoring system as recited in claim 18, wherein said RF transponder signal is further characterized by a predetermined number of said transmission bursts, which number is the same for each of said plurality of transponders.

25. An automatic/remote instrument monitoring system as recited in claim 18, wherein said RF transponder signal is further characterized by a serial sequence of said RF transmission bursts each spaced in time from one another by a space time interval, and wherein said means for determining said active parameters of said RF transponder signal includes means for randomly setting said space time interval such that said space time interval remains the same during any particular transmission by an RF transponder.

26. An automatic/remote instrument monitoring system as recited in claim 18, wherein each said transponder has means for establishing a unique identification code therefore which identifies it from others of said plurality of RF transponders; wherein said RF transponder signal is further characterized by a serial sequence of said RF transmission bursts each spaced in time from one another by a space time interval; and wherein said means for determining said active parameters of said RF transponder signal includes means for setting said space time interval as a function of said unique identification code; whereby the respective space time intervals between said transmission bursts of said plurality of RF transponders differs according to their respective unique identification codes.

27. An automatic/remote instrument monitoring system as recited in claim 18, wherein said means for determining said active parameters of said RF transponder signal includes means for varying the frequency of said RF transponder signal according to a predetermined function of time, such that each said transmission burst of a transponder transmission may occur at a different frequency within a predetermined frequency bandwidth.

28. An automatic/remote instrument monitoring system as recited in claim 27, wherein each said transponder has means for establishing a unique identification code for that transponder, and wherein said means for varying the frequency of said RF transponder signal includes means for varying said frequency as a function of said unique identification code for that transponder unit; whereby the frequencies of transmission of simultaneously transmitted said RF bursts by different ones of said plurality of transponders, differ.

29. An automatic/remote instrument monitoring system as recited in claim 18, wherein said interrogate receiver means comprises:
(a) input means for receiving said plurality of RF transponder signals simultaneously received from said plurality of RF transponders; and
(b) means for separating and identifying at least one of said transmission bursts of each said RF transponder received during a transmission sequence by that transponder from those of other transponder signals simultaneously received.

30. An automatic/remote instrument monitoring system as recited in claim 29, wherein said interrogate receiver means further includes means for extracting said collected parameter data from said identified transmission burst.

31. An automatic/remote instrument monitoring system as recited in claim 30, wherein said interrogate receiver means further includes control means for transferring said collected parameter data and said identification information parameters to data processing means.

32. An automatic/remote instrument monitoring system as recited in claim 29, wherein said input means of said interrogate receiver means includes means for verifying that an RF signal received by said input receiver means has predetermined properties corresponding to those of said RF transponder signals.

33. An automatic/remote instrument monitoring system as recited in claim 32, wherein said verification means includes circuit means operably synchronized with that RF signal being received by said receiver input means.

34. An automatic/remote instrument monitoring system as recited in claim 32, wherein said verifying means includes digital filter circuit means.

35. An automatic/remote instrument monitoring system as recited in claim 18, wherein said means for determining said active parameters of said RF transponder signal includes means for varying the frequency of said RF transponder signal as a function of time within a predetermined transmission bandwidth, and wherein said interrogate receiver means includes a plurality of input receiver means tuned so as to subdivide said predetermined frequency transmission bandwidth into plurality of sub-bandwidths extending across the entire said predetermined frequency transmission bandwidth; whereby a received RF transmission burst from an RF transponder will selectively activate one or more of said plurality of receiver means, as determined by the frequency of said RF received transmission burst.

36. An automatic/remote instrument monitoring system as recited in claim 35, wherein said plurality of input receiver means are tuned such that said sub-bandwidths overlap each other; whereby more than one of said input receiver means is likely to be simultaneously activated by any one said received RF transmission burst.

37. An automatic/remote instrument monitoring system as recited in claim 36, wherein adjacent ones of said sub-bandwidths overlap one another by about more than 25 percent.

38. An automatic/remote instrument monitoring system as recited in claim 18, wherein said transponder receiver means includes superregenerative receiver means with external squelch, for receiving and sampling said RF wake-up signal at a low duty cycle.

39. An automatic/remote instrument monitoring system as recited in claim 38, wherein said duty cycle is less than about 0.5%.

40. An automatic/remote instrument monitoring system as recited in claim 39, wherein sensitivity of said transponder receiver means to said RF wake-up signal is better than −90 dbm.

41. In an instrument monitoring system of the type having a plurality of RF transponders operatively connected to automatically monitor parameters of instruments and which transmit such monitored parameter information to a remotely located interrogate/receiver in reply to an RF interrogate signal from said interrogate/receiver, a method of providing communication between said interrogate/receiver and said remotely located RF transponders, comprising:
(a) transmitting an RF interrogate signal from an interrogate/receiver to simultaneously activate a plurality of remotely located RF transponders;
(b) simultaneously transmitting signals from each said activated RF transponder in serial, spaced RF transmission bursts, said transmitted signals characterizing at least in part the monitored parameter information from the instruments which said transponders are operatively connected; and
(c) varying said spacing between successive transmission bursts of a transponder such that said spacings of at least two simultaneously activated transponders differ.

42. The method as recited in claim 41, wherein the step of varying the spacings between successive transmission bursts includes varying said transmission burst spacing of a respective transponder in accordance with a unique identification code of that transponder.

43. The method as recited in claim 41 further including the step of varying the frequency of transmission of said respective transponders such that the frequency at which a transponder transmits varies as a function of time.

44. The method as recited in claim 43, further including the step of varying the frequency of transmission of said respective transponders during transmission such that each successive serial transmission burst of a transponder occurs at a different frequency.

45. The method as recited in claim 43, wherein the frequency of said transmission of a respective said transponder is varied according to a unique identification code of that transponder.

46. The method as recited in claim 45, further including the step of varying said spacing between successive RF transmission bursts of a respective said transponder in accordance with said unique identification code of that transponder.

47. The method as recited in claim 43, wherein the transmission frequencies of the plurality of simultaneously activated RF transponders are within a predetermined transmission bandwidth, and further including the step of simultaneously receiving said plurality of RF signals transmitted by said activated transponders by means of a plurality of RF receivers each tuned to a different center frequency within said predetermined transmission bandwidth.

48. The method as recited in claim 47, including the step of setting said center frequencies of said plurality of RF receivers and their associated reception bandwidths such that said reception bandwidths overlap one another across said transponder transmission bandwidth.

49. An RF transponder suitable for use with an automatic/remote instrument monitoring system wherein the transponder is one of a plurality of such transponders configured to operate with at least one of a plurality of instruments remotely located from an interrogate/receiver means which transmits an RF energizing signal to said transponders and which receives and processes RF signals from the transponders, said transponder comprising:
(a) means suitable for operative connection with a parameter sensing instrument for providing a sensed instrument signal responsive to a condition of a parameter being sensed by said instrument;
(b) encoding means operatively connected to receive said sensed instrument signal for providing an encoded data signal in response thereto;
(c) RF receiving means for receiving an RF energizing signal and for providing a transponder enable signal in response thereto;
(d) RF transmitter means operatively connected to receive said transponder enable and said encoded data signals for transmitting in response thereto an RF transponder signal, said RF transponder signal comprising a plurality of spaced RF transmission bursts each containing encoded information from said encoded data signal; and
(e) means operatively connected with said transmitter means for actively varying a frequency of said RF transponder signal such that said transmission burst thereof may occur at different frequencies within a predetermined frequency bandwidth.

50. An RF transponder as recited in claim 49, wherein said parameter sensing instrument is a meter and wherein said sensed instrument signal corresponds to a commodity consumption parameter of said meter.

51. An RF transponder as recited in claim 50 wherein said means for actively varying the frequency of the RF transponder signal varies the frequency of said RF transponder signal according to a predetermined function.

52. An RF transponder as recited in claim 51 wherein said RF receiving means is operable to produce said transponder enable signal only upon receipt of an RF energizing signal; wherein said RF transmitter is operable to provide said RF transponder signal only upon receipt of said transponder enable signal; and wherein said RF transponder signal comprises a predetermined fixed number of said spaced RF transmission bursts.

53. An RF transponder as recited in claim 52, wherein said RF receiving means comprises:
(a) an antenna for receiving said RF energizing signal;
(b) superregenerative receiver means with external squelch, operatively connected with said antenna for receiving and processing said RF energizing signal; and
(c) means operatively connected with said external squelch for sampling said RF energizing signal at a low duty cycle.

54. An automatic/remote instrument monitoring system for monitoring a plurality of instruments and for simultaneously transmitting data from the monitored instruments when energized by an RF wake-up signal to a remotely located interrogate receiver means, comprising:
(a) interrogate transmitter means for providing an RF wake-up signal, for initiating simultaneous readout from a plurality of remotely located RF transponders;
(b) a plurality of RF transponders each configured for operative connection with at least one of the instruments to be monitored, each transponder comprising:
(i) data collection means operatively connected to collect parameter data from at least one of said instruments being monitored;
(ii) transponder receiver means for receiving said RF wake-up signal and for enabling and initiating transmission of said collected parameter data from said transponder in response thereto;
(iii) transponder transmitter means operatively connected with said data collection means and said transponder receiver means for transmitting an RF transponder signal to an interrogate receiver, said RF transponder signal being characterized by an active frequency parameter and comprising a plurality of RF transmission bursts, each containing said collected parameter data; and
(iv) means operatively connected with said transponder transmitter for determining said active frequency parameter of said RF transponder signal in a manner that enables said plurality of RF transponder signals to be distinguished from one another during simultaneous transmissions by said plurality of transponders; and
(c) interrogate receiver means remotely located from said transponders and cooperatively operable with said interrogate transmitter means for receiving and processing said plurality of simultaneously transmitted RF transponder signals from said remotely located transponders.

55. An automatic/remote instrument monitoring system as recited in claim 54, wherein said instruments comprise meters, and wherein said parameter data collected by said data collection means represents a commodity consumption parameter of said meter.

56. An automatic/remote instrument monitoring system as recited in claim 55, wherein said transponder receiver means includes means for verifying that a received RF signal has predetermined properties corresponding to those of said RF wake-up signal transmitted by said interrogate transmitter means.

57. An automatic/remote instrument monitoring system as recited in claim 55, wherein said means for determining said active frequency parameter of said RF transponder signal includes means for varying the frequency of said RF transponder signal according to a predetermined function such that each said transmission burst of a transponder transmission can occur at a different frequency within a predetermined frequency bandwidth.

58. An automatic/remote instrument monitoring system as recited in claim 54, wherein said interrogate receiver means comprises:
  (a) input means for receiving said plurality of RF transponder signals simultaneously received from said plurality of RF transponders; and
  (b) means for separating and identifying at least one of said transmission bursts of each said RF transponder received during a transmission sequence by that transponder from those of other transponder signals simultaneously received.

59. An automatic/remote instrument monitoring system as recited in claim 54, wherein said means for determining said active frequency parameter of said RF transponder signal includes means for varying the frequency of said RF transponder signal within a predetermined transmission bandwidth, in accordance with a predetermined function, and wherein said interrogate receiver means includes a plurality of input receiver means tuned so as to subdivide said predetermined frequency transmission bandwidth into a plurality of sub-bandwidths extending across the entire said predetermined frequency transmission bandwidth; whereby a received RF transmission burst from an RF transponder will selectively activate one or more of said plurality of receiver means, as determined by the frequency of said RF received transmission burst.

60. In an instrument monitoring system of the type having a plurality of RF transponders operatively connected to automatically monitor parameters of instruments and which transmit such monitored parameter information to a remotely located interrogate/receiver in reply to an RF interrogate signal from said interrogate/receiver, a method of providing communication between said interrogate/receiver and said remotely located RF transponders, comprising:
  (a) transmitting an RF interrogate signal from an interrogate/receiver to simultaneously activate a plurality of remotely located RF transponders;
  (b) simultaneously transmitting signals from each said activated RF transponder in serial, spaced RF transmission bursts at burst transmission frequencies, said transmitted signals characterizing at least in part the monitored parameter information from the instruments to which said transponders are operatively connected; and
  (c) actively varying said burst transmission frequency of successive transmission bursts of a transponder such that said burst transmission frequency of at least two simultaneously activated transponders differ.

61. The method as recited in claim 60, further including the step of varying the burst transmission frequency of said transponders during transmission such that each successive serial transmission burst of a transponder occurs at a different burst transmission frequency.

62. The method as recited in claim 61, further including the step of varying the burst transmission frequency of said transponders in accordance with a predetermined function.

63. The method as recited in claim 62, wherein the transmission frequencies of the plurality of simultaneously activated RF transponders are within a predetermined transmission bandwidth, and further including the step of simultaneously receiving said plurality of RF signals transmitted by said activated transponders by means of a plurality of RF receivers each tuned to a different center frequency within said predetermined transmission bandwidth.

64. The method as recited in claim 63, including the step of setting said center frequencies of said plurality of RF receivers and their associated reception bandwidths such that said reception bandwidths overlap one another across said transponder transmission bandwidth.

* * * * *